(12) United States Patent
Adams et al.

(10) Patent No.: US 6,581,781 B1
(45) Date of Patent: Jun. 24, 2003

(54) VIBRATOR SEPARATOR SCREENS

(75) Inventors: Thomas C. Adams, Hockley, TX (US); David L. Schulte, Jr., Broussard, LA (US); Kenneth W. Seyffert, Houston, TX (US); David W. Largent, Cleveland, TX (US); Guy L. McClung, III, Spring, TX (US)

(73) Assignee: Tuboscope I/P, Inc., Houston, TX (US)

( * ) Notice: Subject to any disclaimer, the term of this patent is extended or adjusted under 35 U.S.C. 154(b) by 270 days.

(21) Appl. No.: 09/707,277

(22) Filed: Nov. 6, 2000

Related U.S. Application Data

(63) Continuation-in-part of application No. 09/696,662, filed on Oct. 25, 2000, which is a continuation-in-part of application No. 09/634,610, filed on Aug. 5, 2000, and a continuation-in-part of application No. 09/228,572, filed on Jan. 11, 1999, now Pat. No. 6,152,307, which is a continuation-in-part of application No. 09/183,005, filed on Oct. 30, 1998, now abandoned, which is a continuation-in-part of application No. 09/090,554, filed on Jun. 4, 1998, now Pat. No. 6,267,247, which is a continuation-in-part of application No. 08/895,976, filed on Jul. 17, 1997, now Pat. No. 5,988,397, which is a continuation-in-part of application No. 08/786,515, filed on Jan. 21, 1997, now Pat. No. 5,971,159, and a continuation-in-part of application No. 08/598,566, filed on Feb. 12, 1996, now abandoned, which is a continuation-in-part of application No. 29/048,575, filed on Jan. 4, 1996, now Pat. No. Des. 377,656, which is a continuation of application No. 29/014,571, filed on Oct. 25, 1993, now Pat. No. Des. 366,040, which is a continuation-in-part of application No. 08/056,123, filed on Apr. 30, 1993, now Pat. No. 5,385,669, said application No. 08/786,515, is a continuation-in-part of application No. 08/504,495, filed on Jul. 20, 1995, and a continuation-in-part of application No. 08/105,696, filed on Aug. 12, 1993, now Pat. No. 5,385,669, said application No. 08/598,566, is a continuation-in-part of application No. 08/220,101, filed on Mar. 30, 1994, now Pat. No. 5,490,598, application No. 09/707,277, which is a continuation-in-part of application No. 09/544,572, filed on Apr. 6, 2000, and a continuation-in-part of application No. 09/517,212, filed on Mar. 2, 2000, and a continuation-in-part of application No. 09/228,572, filed on Jan. 11, 1999, and a continuation-in-part of application No. 09/183,003, filed on Oct. 30, 1998, application No. 09/707,277, which is a continuation-in-part of application No. 09/090,554, which is a continuation-in-part of application No. 08/895,976, which is a continuation-in-part of application No. 08/786,515, and a continuation-in-part of application No. 08/598,566, said application No. 08/786,515, is a continuation-in-part of application No. 29/048,575, which is a continuation of application No. 29/014,571, which is a continuation-in-part of application No. 08/056,123, said application No. 08/786,515, is a continuation-in-part of application No. 08/504,495, and a continuation-in-part of application No. 08/105,696, and a continuation-in-part of application No. 08/598,566, which is a continuation-in-part of application No. 08/220,101, application No. 09/707,277, which is a continuation-in-part of application No. 09/183,004.

(51) Int. Cl.$^7$ .................................................. B07B 1/49
(52) U.S. Cl. ....................... 209/403; 209/309; 209/399; 210/488
(58) Field of Search ................................. 209/309, 325, 209/ 326, 399, 403, 405; 210/331, 346, 486, 488

(56) References Cited

U.S. PATENT DOCUMENTS

| | | | |
|---|---|---|---|
| 235,851 A | 12/1880 | Bourne | |
| 236,416 A | 1/1881 | Bourne | |
| 3,929,642 A | 12/1975 | Ennis et al. ................. | 210/113 |
| 3,970,549 A | 7/1976 | Ennis et al. ................. | 209/341 |
| 4,028,230 A * | 6/1977 | Rosenblum ................. | 209/403 |
| 4,033,865 A | 7/1977 | Stamer ....................... | 209/275 |
| 4,065,382 A | 12/1977 | Derrick, Jr. ................. | 209/313 |
| 4,224,146 A | 9/1980 | Kent et al. .................. | 209/243 |
| 4,306,974 A | 12/1981 | Harry .......................... | 210/388 |
| 4,375,199 A | 3/1983 | Graeme-Barber et al. .. | 144/222 |
| 4,446,022 A | 5/1984 | Harry .......................... | 210/388 |
| 4,457,839 A | 7/1984 | Bailey ......................... | 209/234 |
| 4,575,421 A | 3/1986 | Derrick et al. .............. | 209/397 |
| 4,603,653 A | 8/1986 | Bews .......................... | 116/209 |
| 4,728,422 A | 3/1988 | Bailey ......................... | 210/314 |
| 4,744,898 A | 5/1988 | Bailey ......................... | 210/236 |
| 4,819,809 A | 4/1989 | Derrick ....................... | 209/275 |
| 4,846,352 A | 7/1989 | Bailey ......................... | 209/399 |
| 4,857,176 A | 8/1989 | Derrick et al. .............. | 209/392 |
| 4,882,054 A | 11/1989 | Derrick et al. .............. | 210/389 |
| 5,084,174 A * | 1/1992 | Perala et al. ................ | 210/331 |
| 5,137,622 A | 8/1992 | Souter ........................ | 209/403 |

| | | | |
|---|---|---|---|
| 5,221,008 A | 6/1993 | Derrick, Jr. et al. | 209/269 |
| 5,330,057 A | 7/1994 | Schiller et al. | 209/392 |
| 5,417,793 A | 5/1995 | Bakula | 156/308.2 |
| 5,417,858 A | 5/1995 | Derrick et al. | 210/388 |
| 5,417,859 A | 5/1995 | Bakula | 210/388 |
| 5,626,234 A | 5/1997 | Cook et al. | 209/315 |
| 5,636,749 A | 6/1997 | Wojciechowdki | 209/403 |
| 5,667,661 A | 9/1997 | Hughes | 205/138 |
| 5,720,881 A | 2/1998 | Derrick et al. | 210/308 |
| 5,783,077 A | 7/1998 | Bakula | 210/388 |
| 5,819,952 A | 10/1998 | Cook et al. | 209/400 |
| 5,868,929 A | 2/1999 | Derrick et al. | 210/388 |
| 5,876,552 A | 3/1999 | Bakula | 156/308.2 |
| 5,921,399 A | 7/1999 | Bakula et al. | 209/272 |
| 5,927,511 A | 7/1999 | Riddle et al. | 209/405 |
| 5,944,197 A | 8/1999 | Baltzer et al. | 209/400 |
| 5,944,993 A | 8/1999 | Derrick et al. | 210/388 |
| 5,958,236 A | 9/1999 | Bakula | 210/388 |
| 5,967,336 A | 10/1999 | Baltzer et al. | 209/403 |
| 6,053,332 A | 4/2000 | Bakula | 210/388 |
| 6,269,954 B1 | 8/2001 | Baltzer | 209/405 |
| 6,431,368 B1 | 8/2002 | Carr | 209/403 |
| 6,439,392 B1 | 8/2002 | Baltzer | 209/405 |

FOREIGN PATENT DOCUMENTS

| | | | |
|---|---|---|---|
| CH | 603207 | 8/1978 | 210/499 |
| EP | 0 169698 | 1/1986 | |
| GB | 1561802 | 9/1975 | |
| GB | 1575312 | 9/1980 | |
| GB | 1578948 | 11/1980 | |
| GB | 2085744 | 5/1982 | |
| GB | 2161715 | 1/1986 | |
| GB | 2162091 | 1/1986 | |
| GB | 2175222 | 11/1986 | |
| GB | 2206501 | 1/1989 | |
| GB | 2312858 | 11/1997 | |

OTHER PUBLICATIONS

"The Derrick LP Sandwich Shaker," Derrick Equipment Co., 1981.
"The Future of Fine Screening," Derrick Equipment Co. 1993.
"Derrick Pyramid Screens," Derrick Corp., 1994.
"Derrick Pyramid Screens," Derrick Equipment Co., 1993.
"Layered Shale Shaker Screens Improve Mud Solids Control," Cagle et al, World Oil, 1978.
Pending U.S. patent application Ser. No. 09/634,610 filed Aug. 5, 2000.

* cited by examiner

*Primary Examiner*—Tuan N. Nguyen
(74) *Attorney, Agent, or Firm*—Guy McClung

(57) ABSTRACT

A screen assembly for a vibratory shaker, the screen assembly including at least two screening members, and the at least two screening members connected by sewing material. In one aspect of such a screen assembly the sewing material is thread in a stitch pattern across the at least two screening members, a pattern of expandable material on and corresponding to the stitch pattern, and the thread passing through holes in the pattern of expandable material, the expandable material expanded within the holes following extraction of a needle therefrom, the needle used to apply the sewing material, to inhibit tearing of either of the at least two screening members between holes.

21 Claims, 51 Drawing Sheets

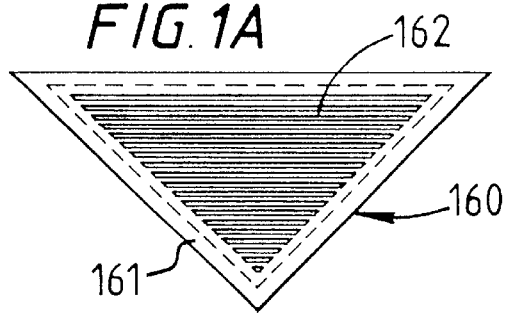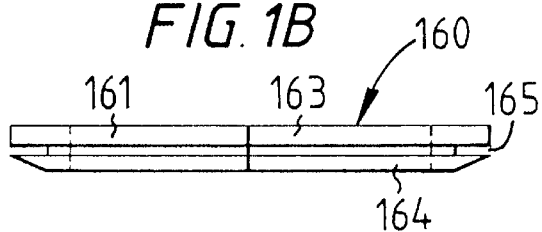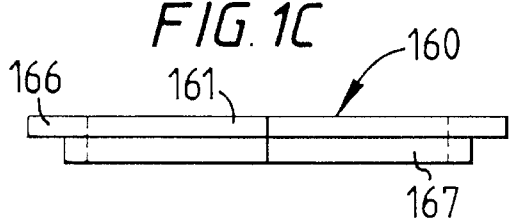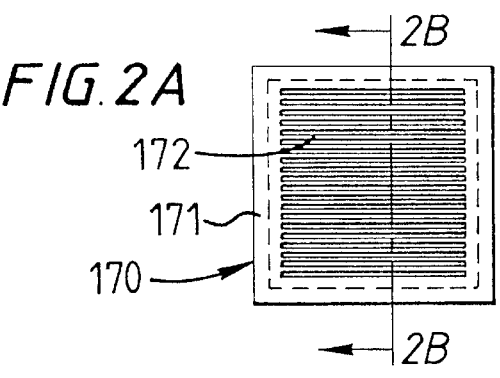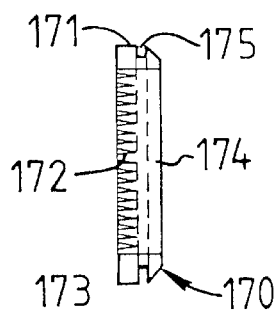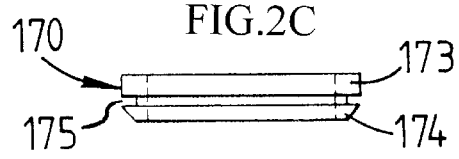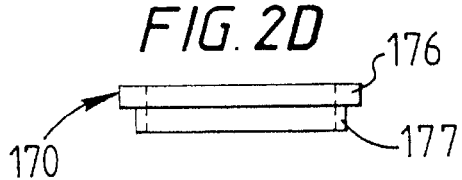

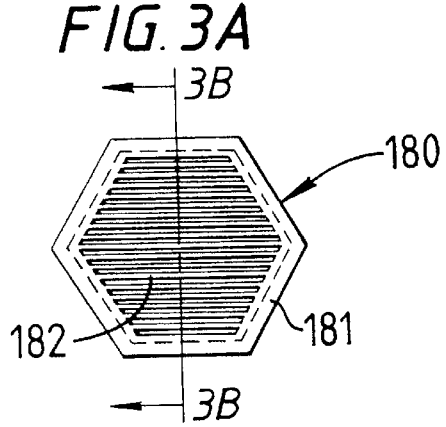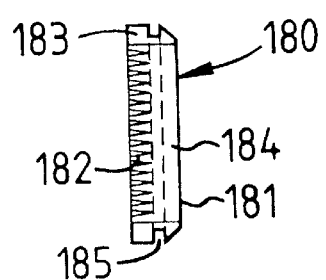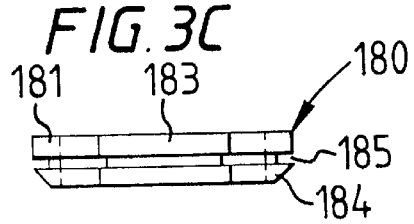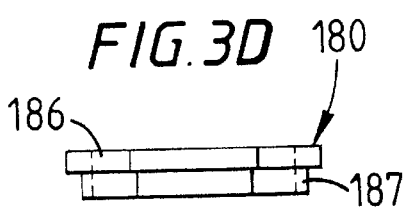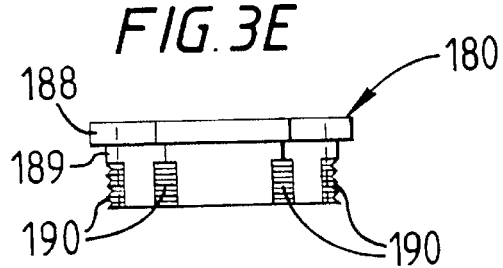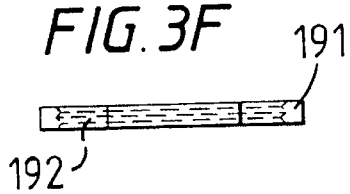

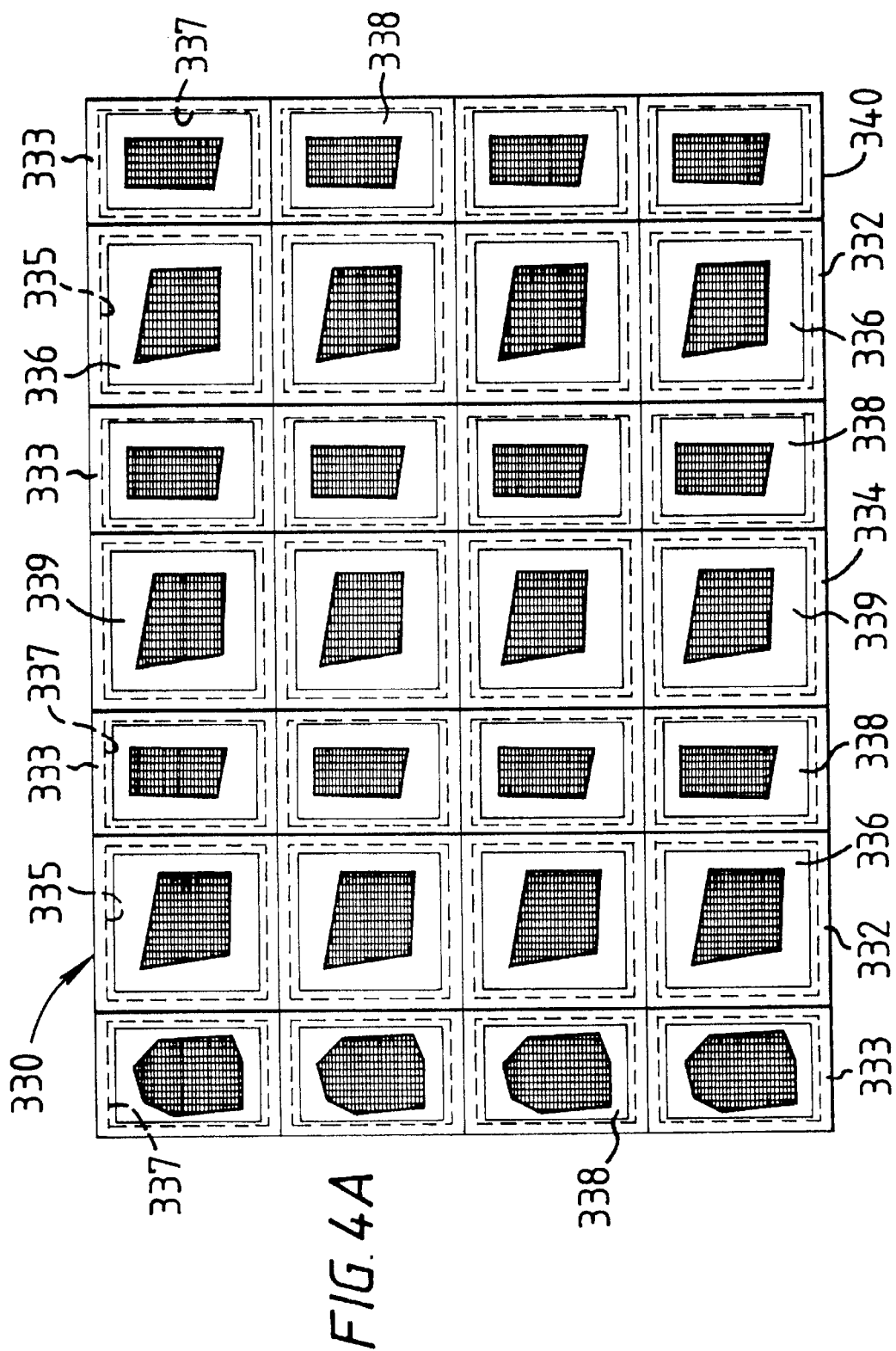

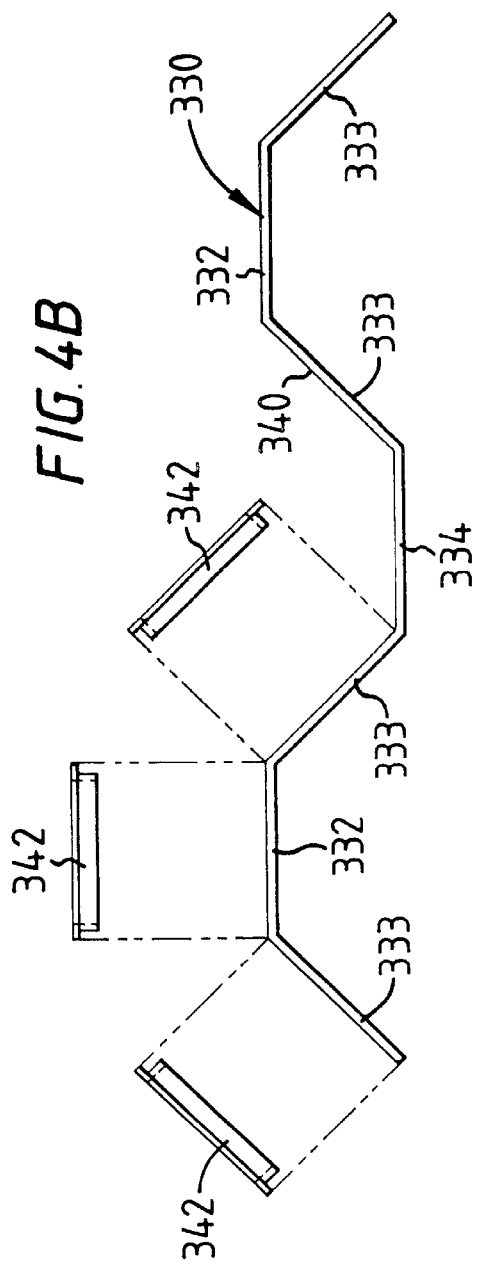
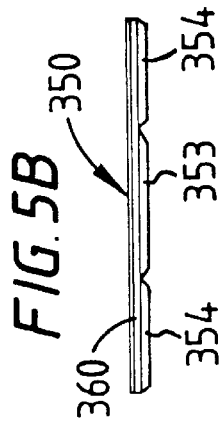
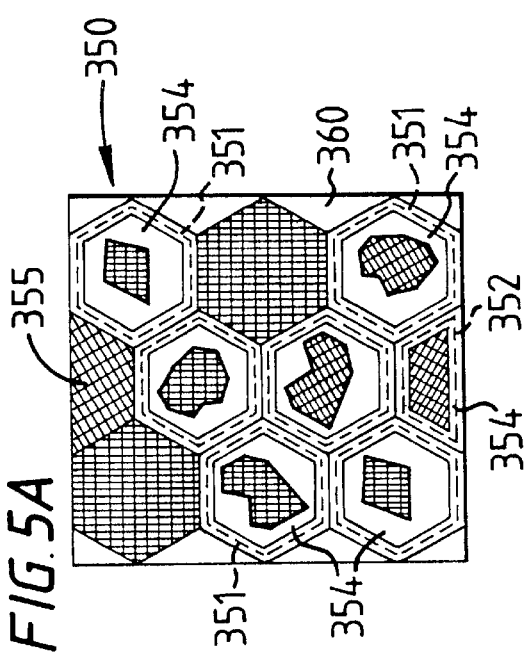

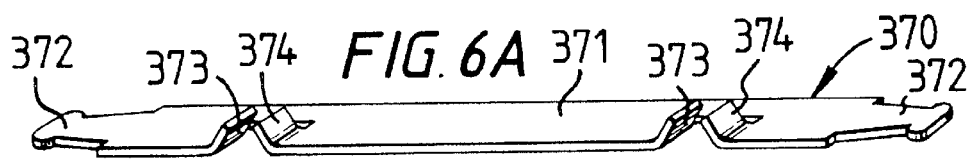
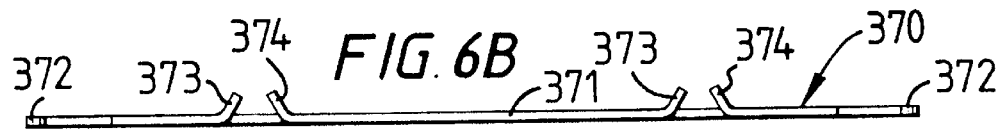
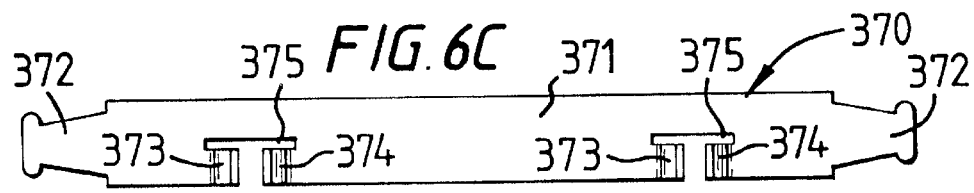
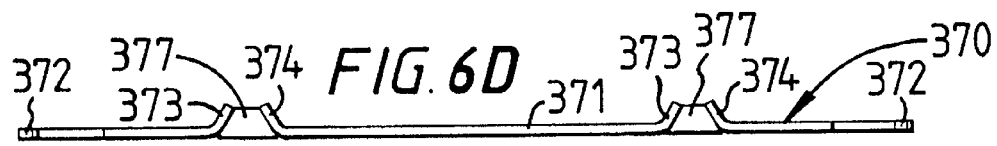
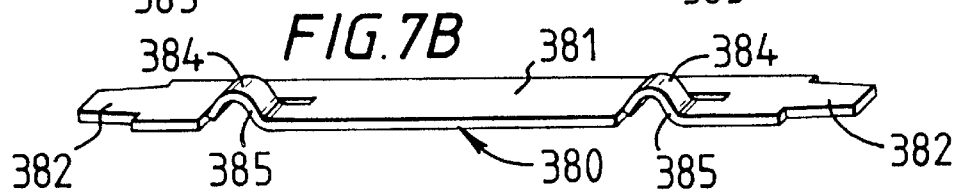
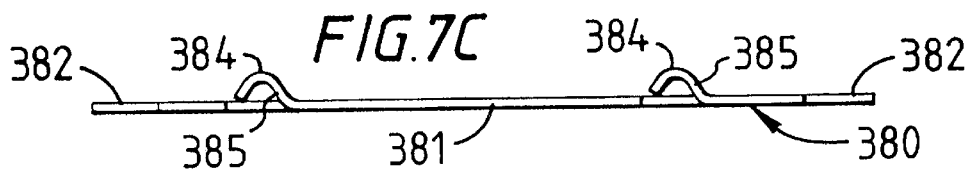
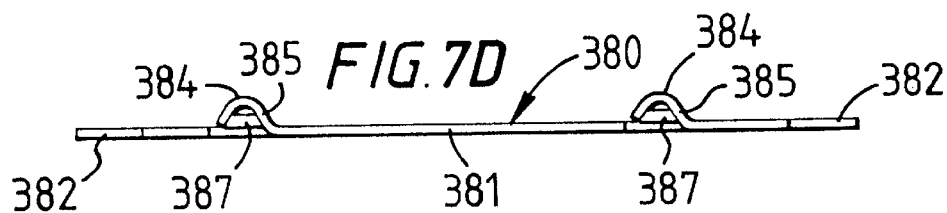

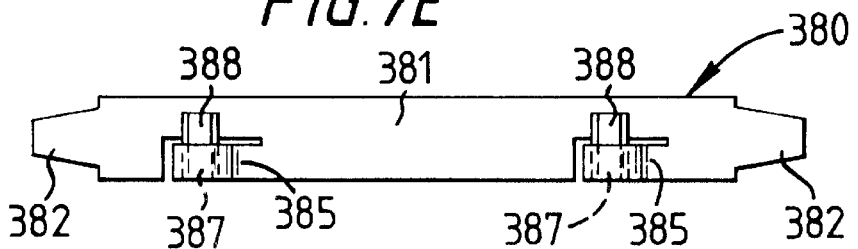
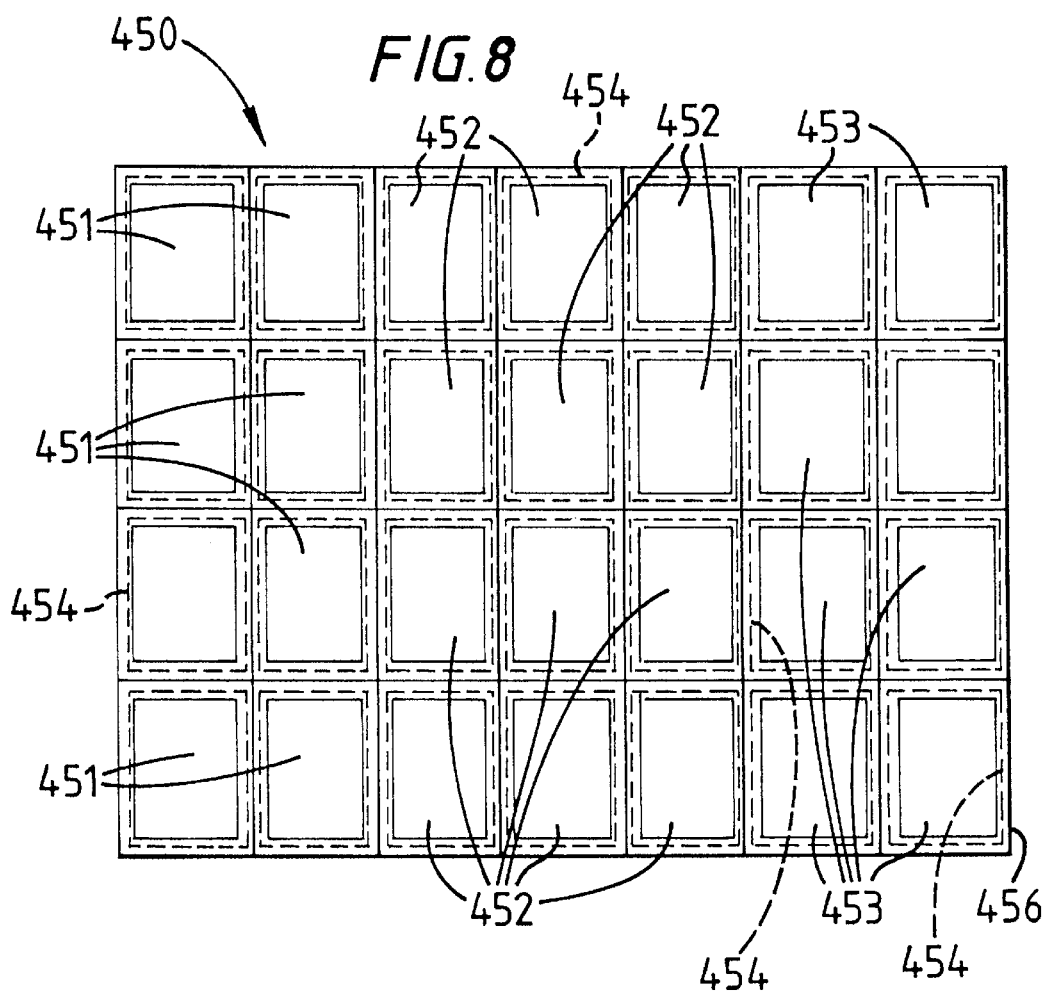

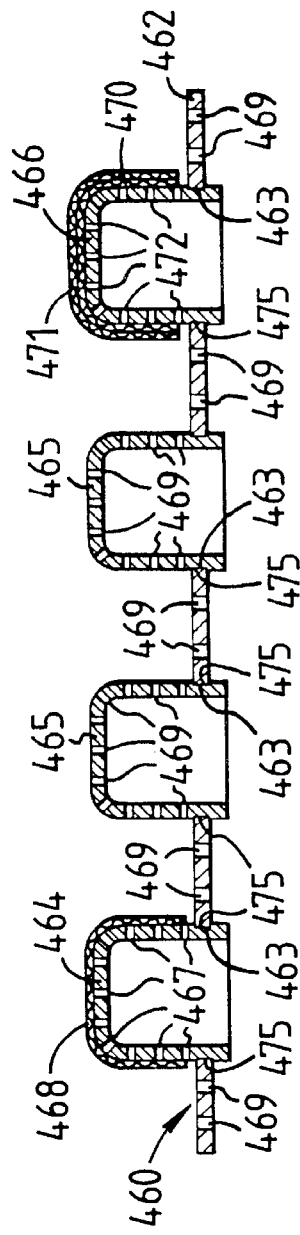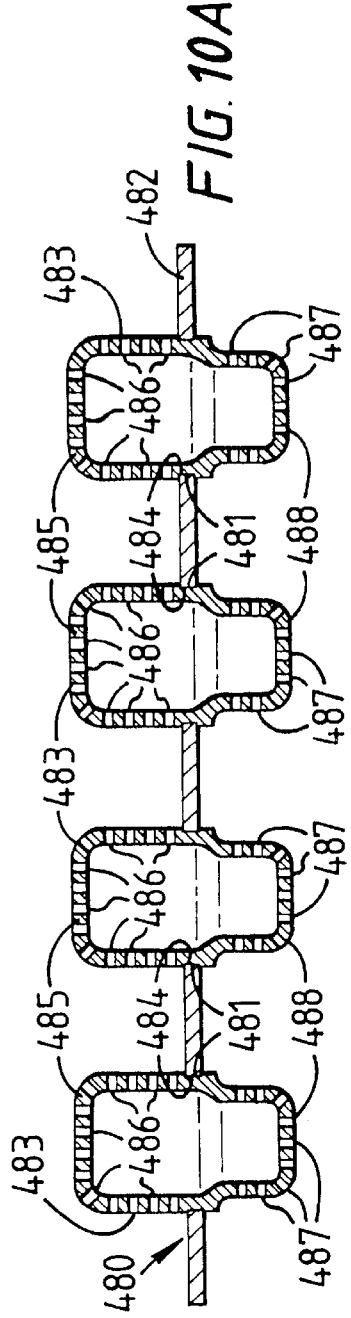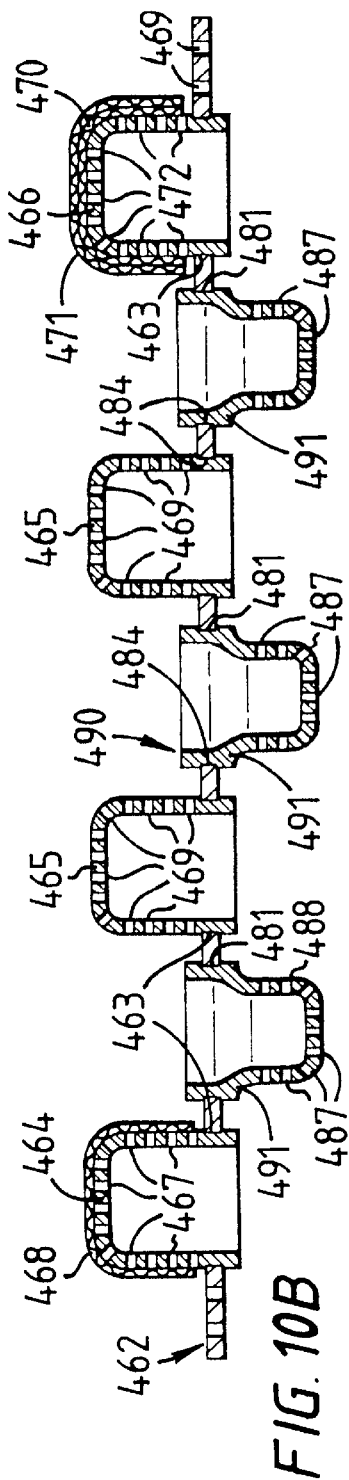

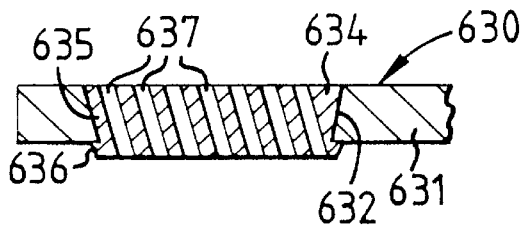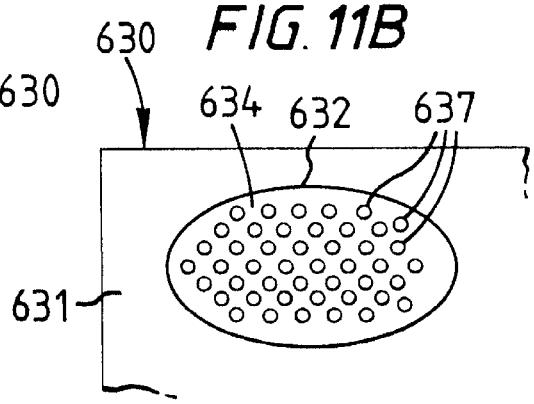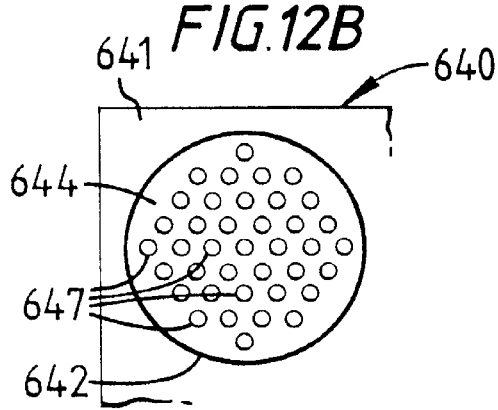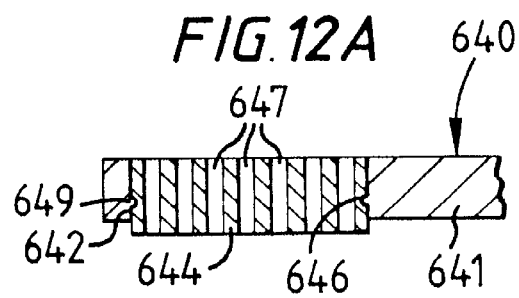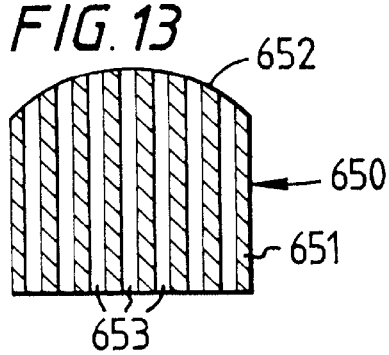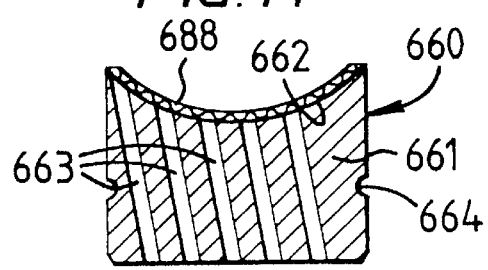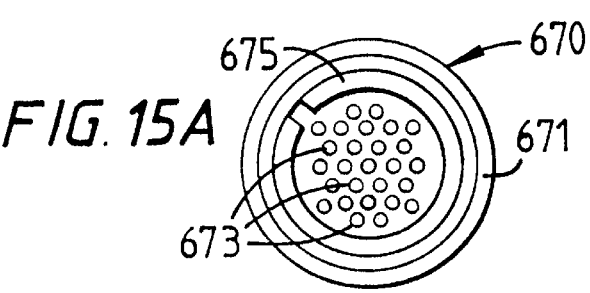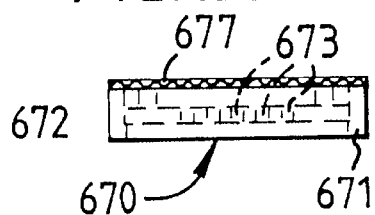

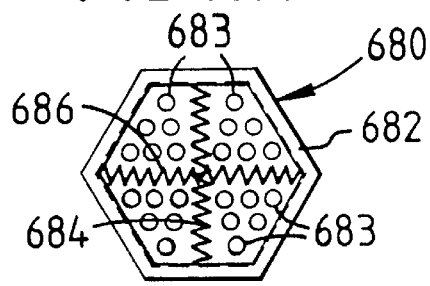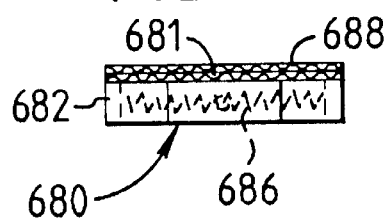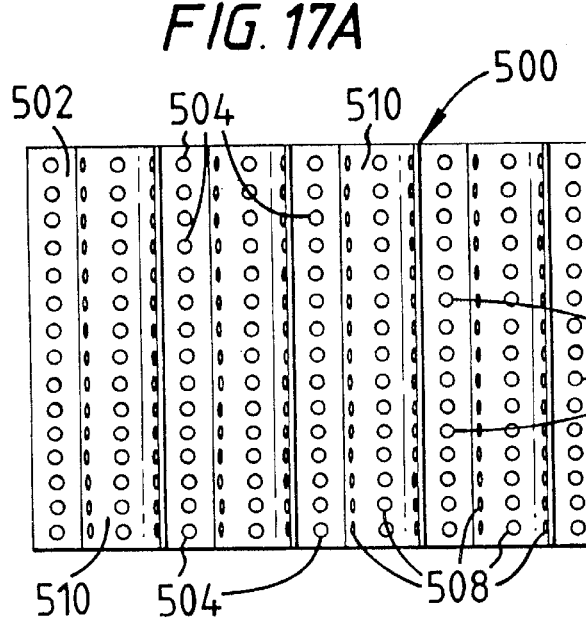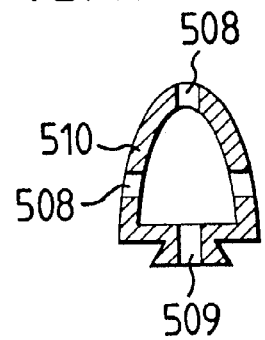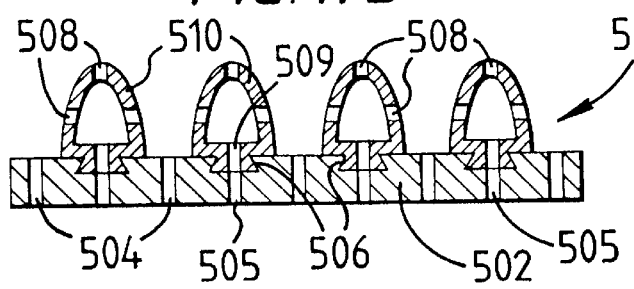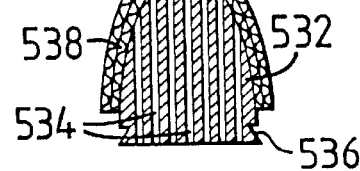

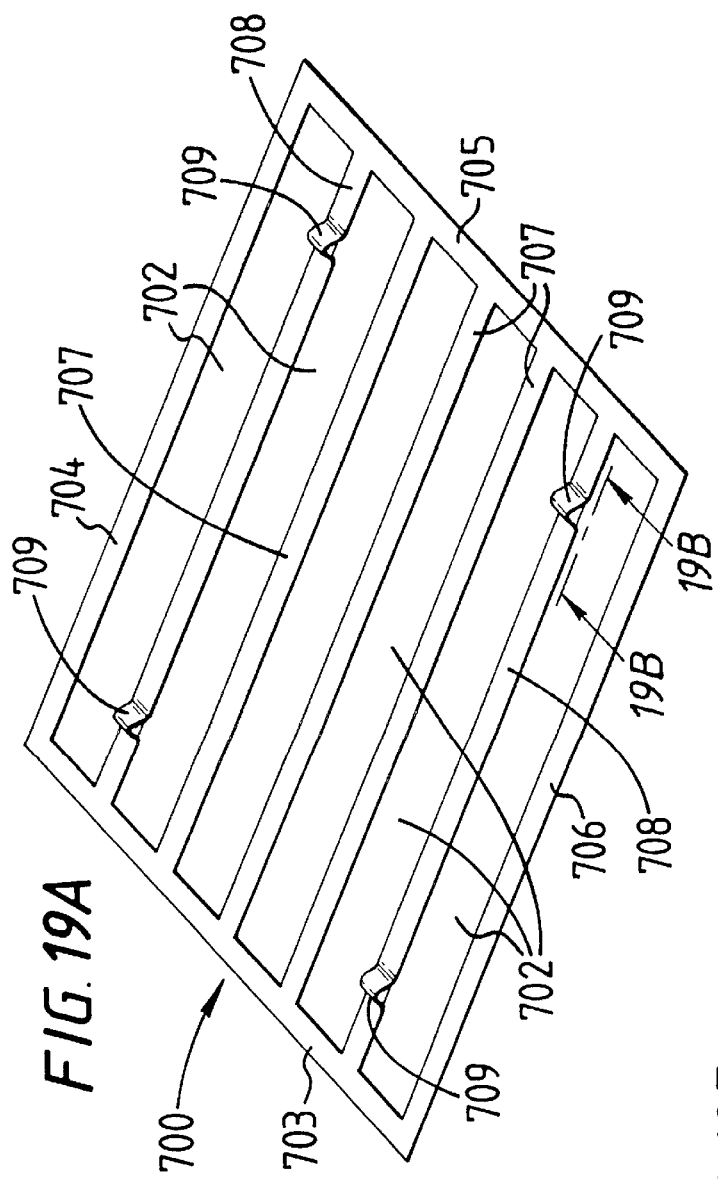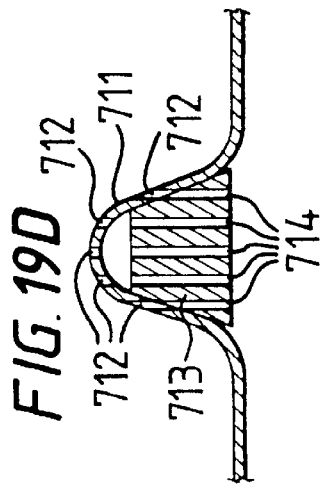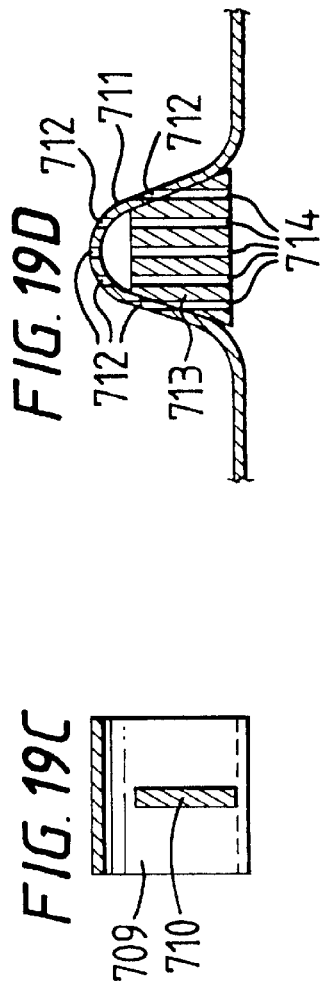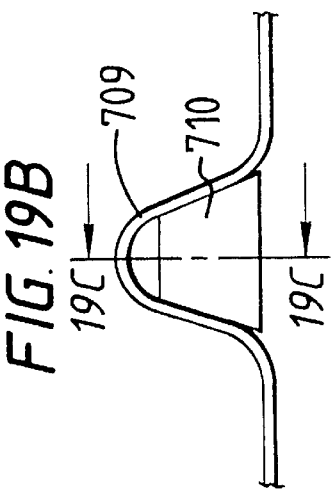

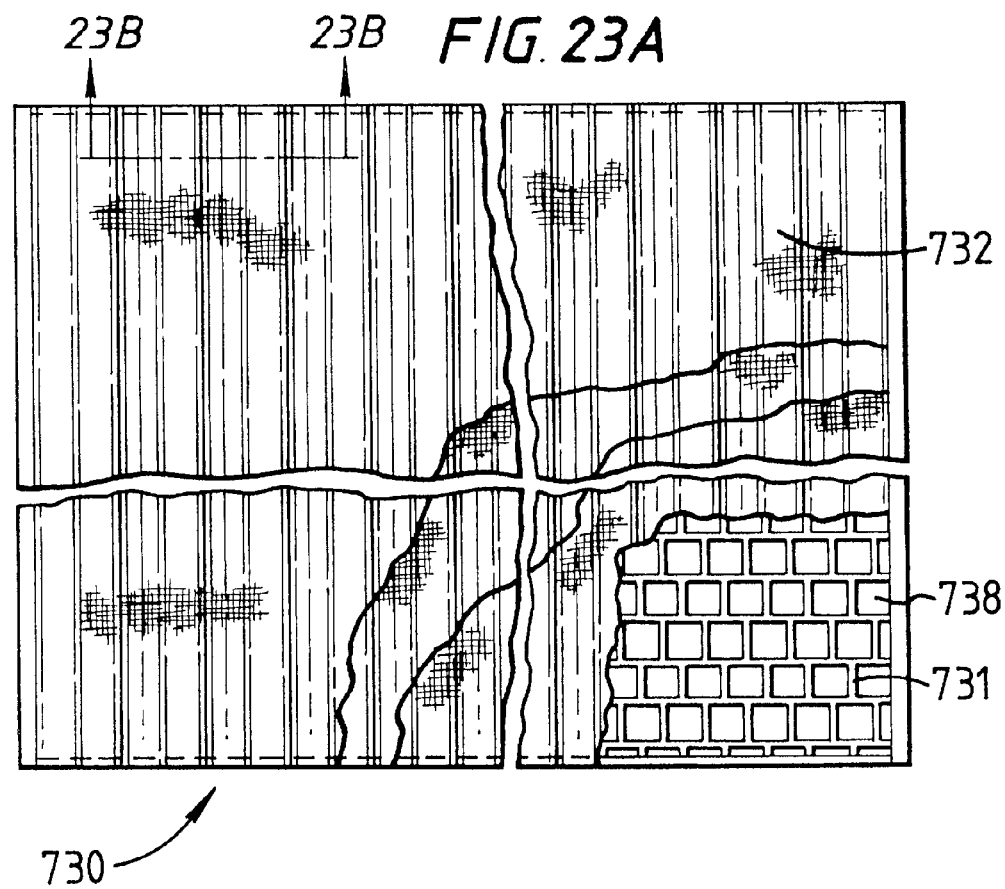
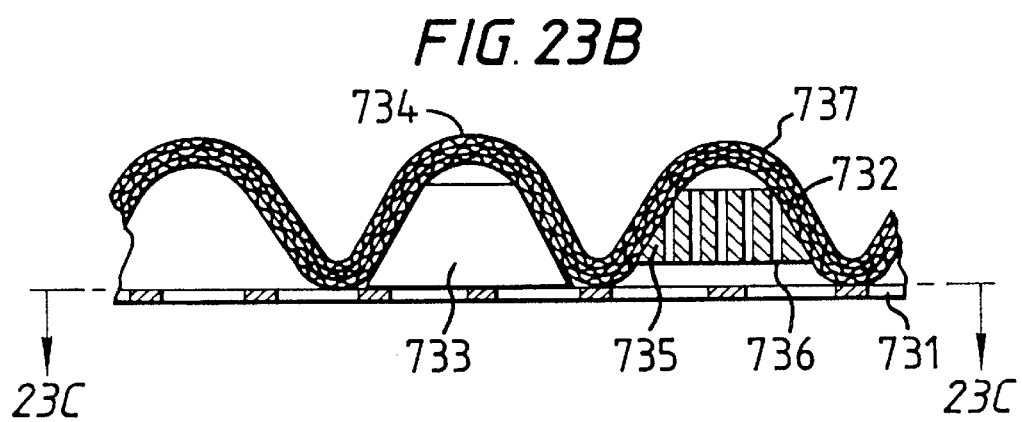

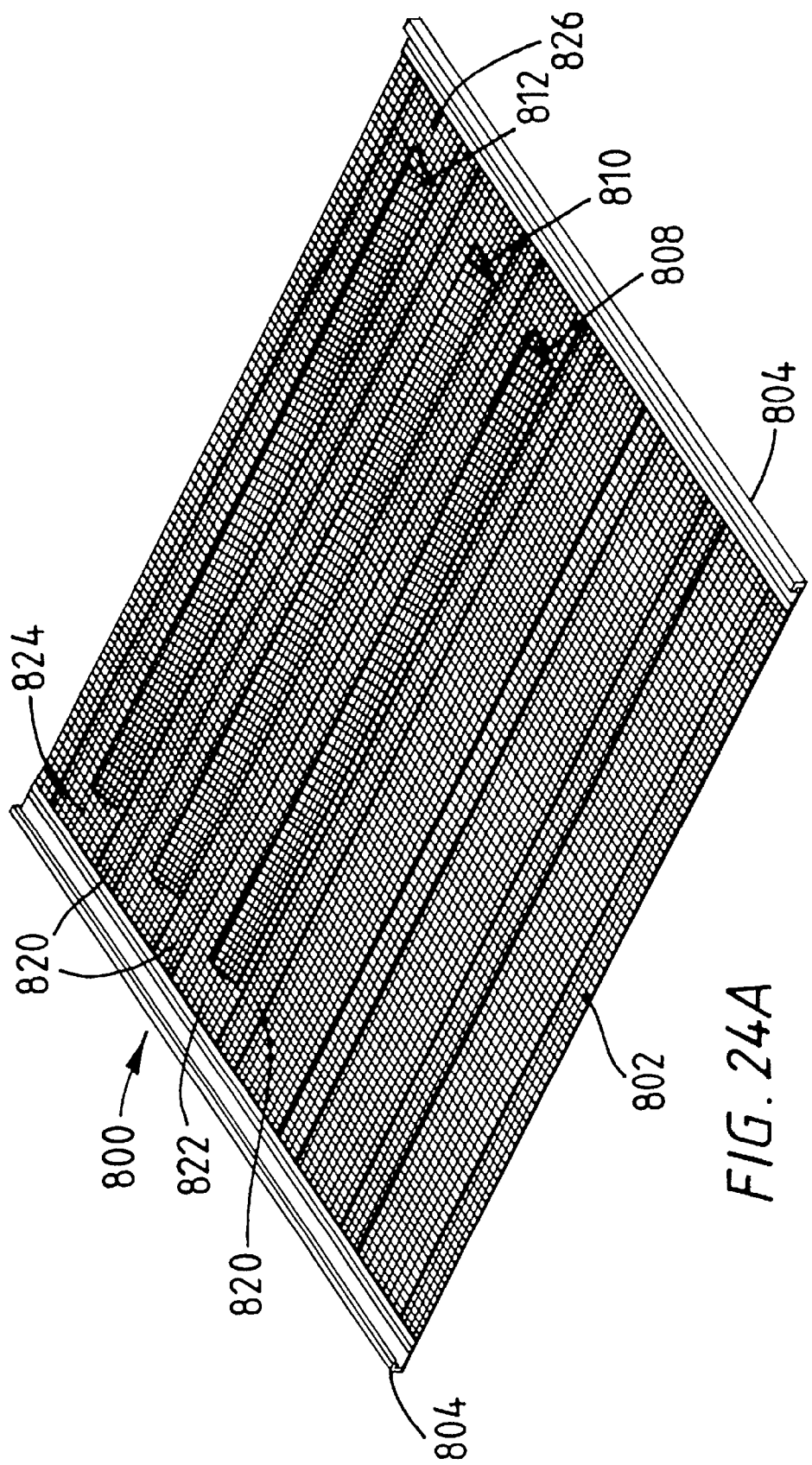

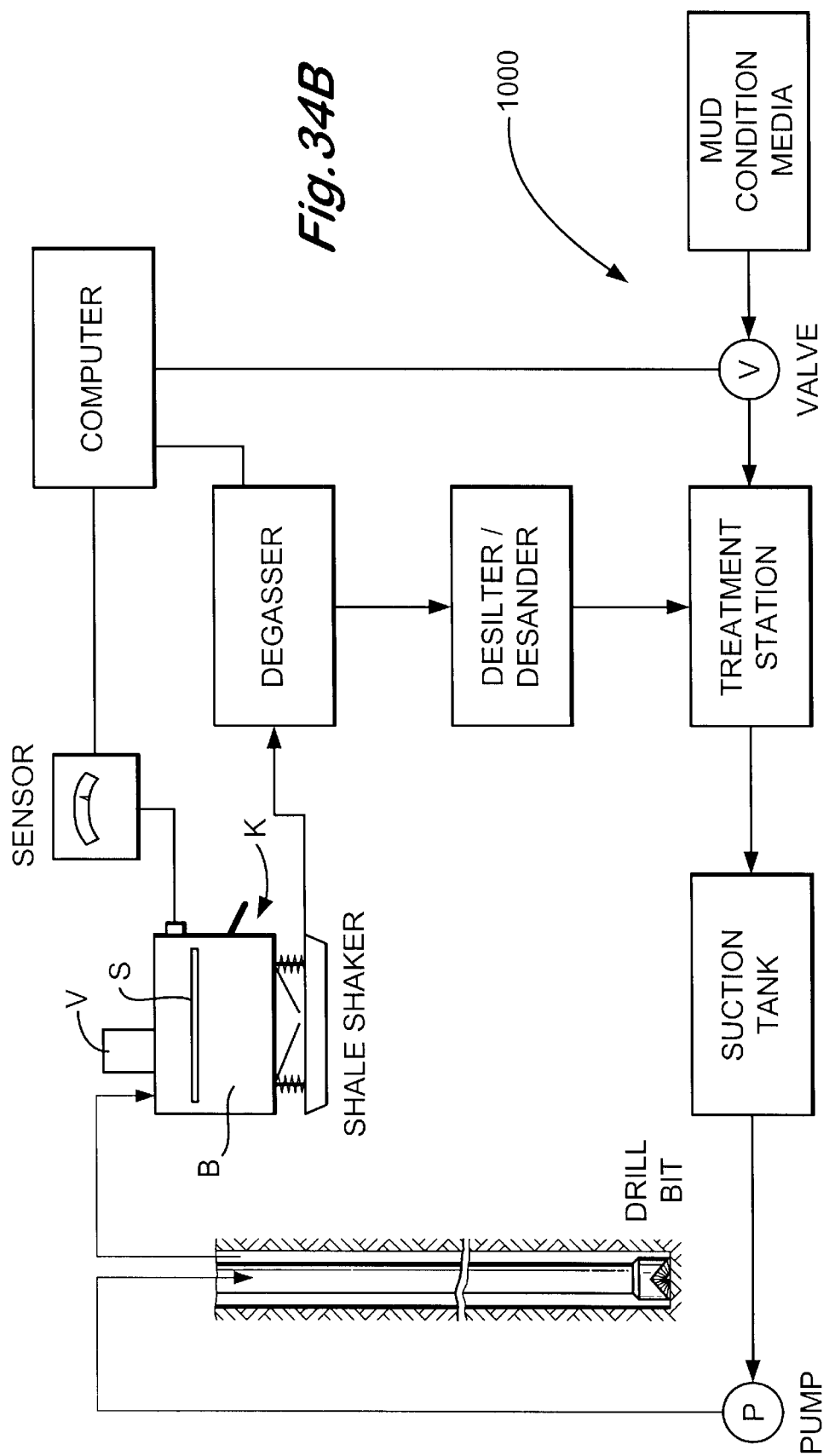

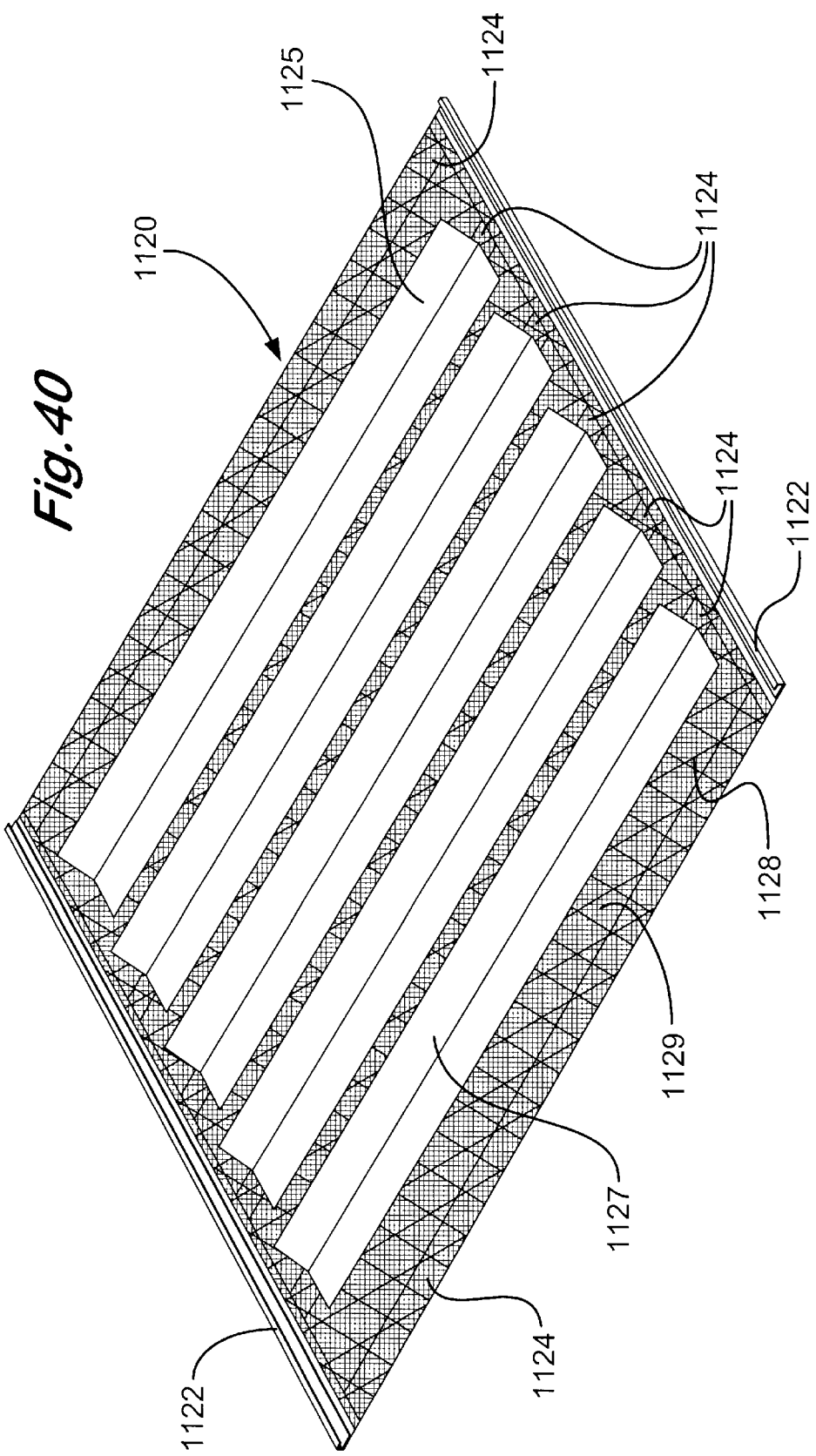

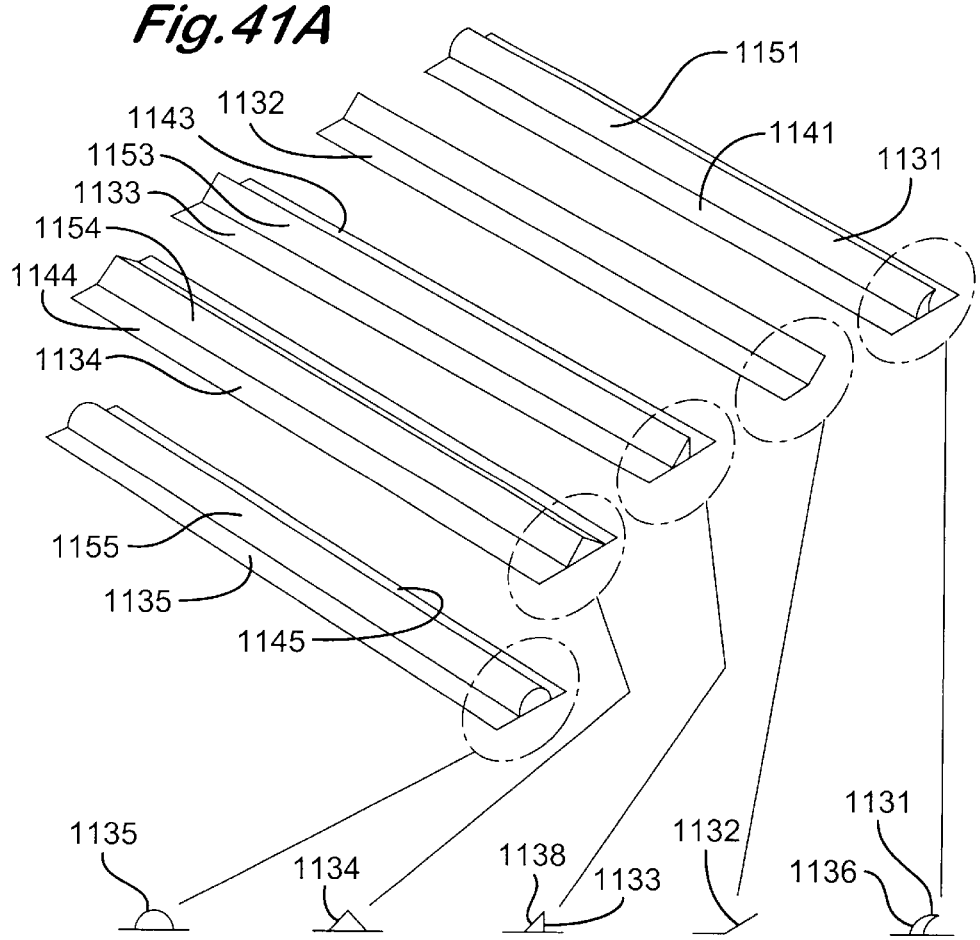
Fig.41A
Fig.41B
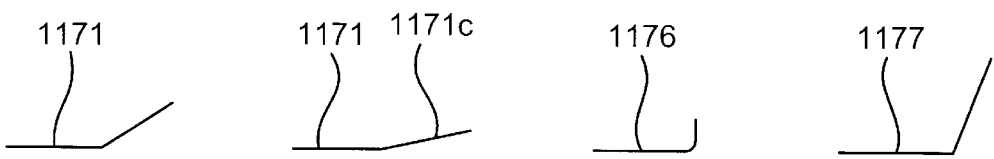
Fig.42B    Fig.42C    Fig.42D    Fig.42E

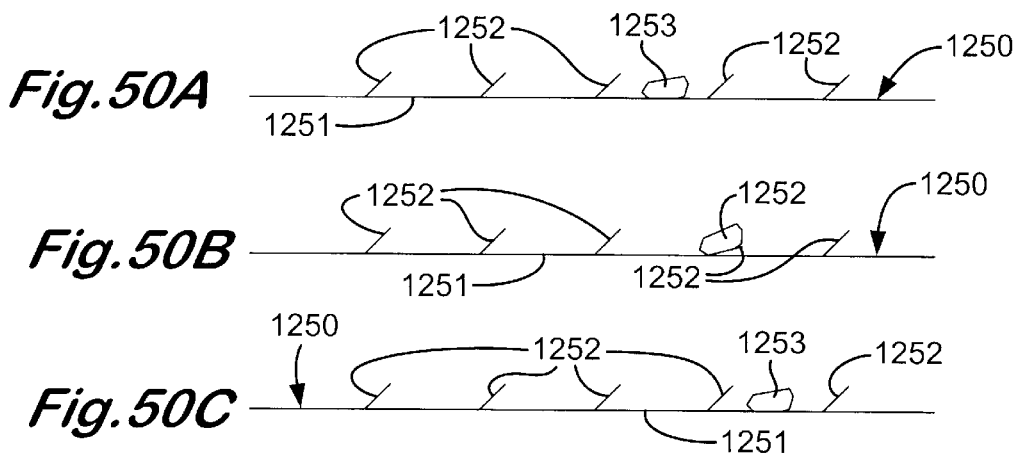
Fig.50A
Fig.50B
Fig.50C
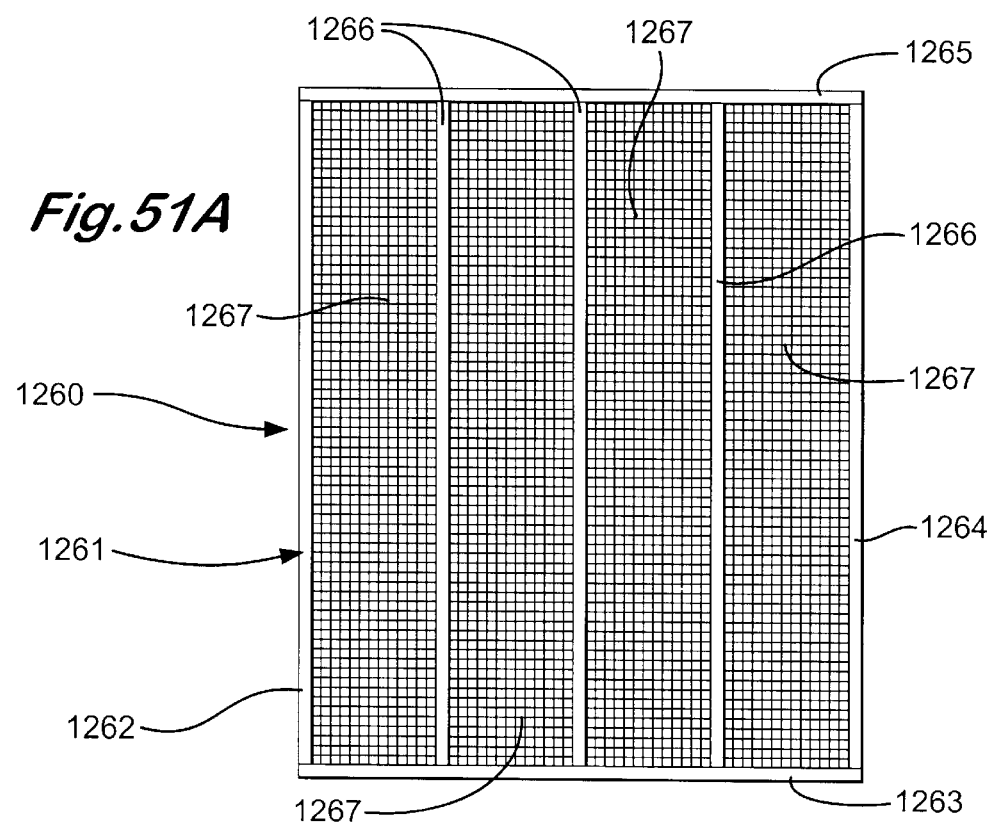
Fig.51A
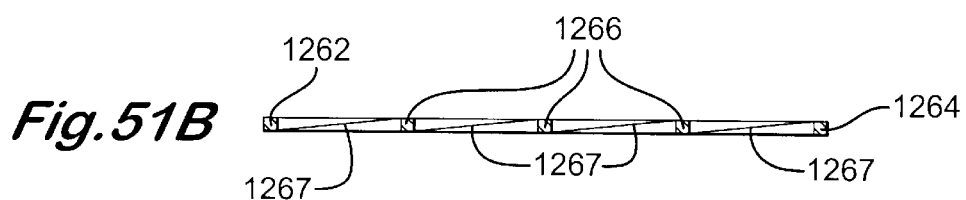
Fig.51B

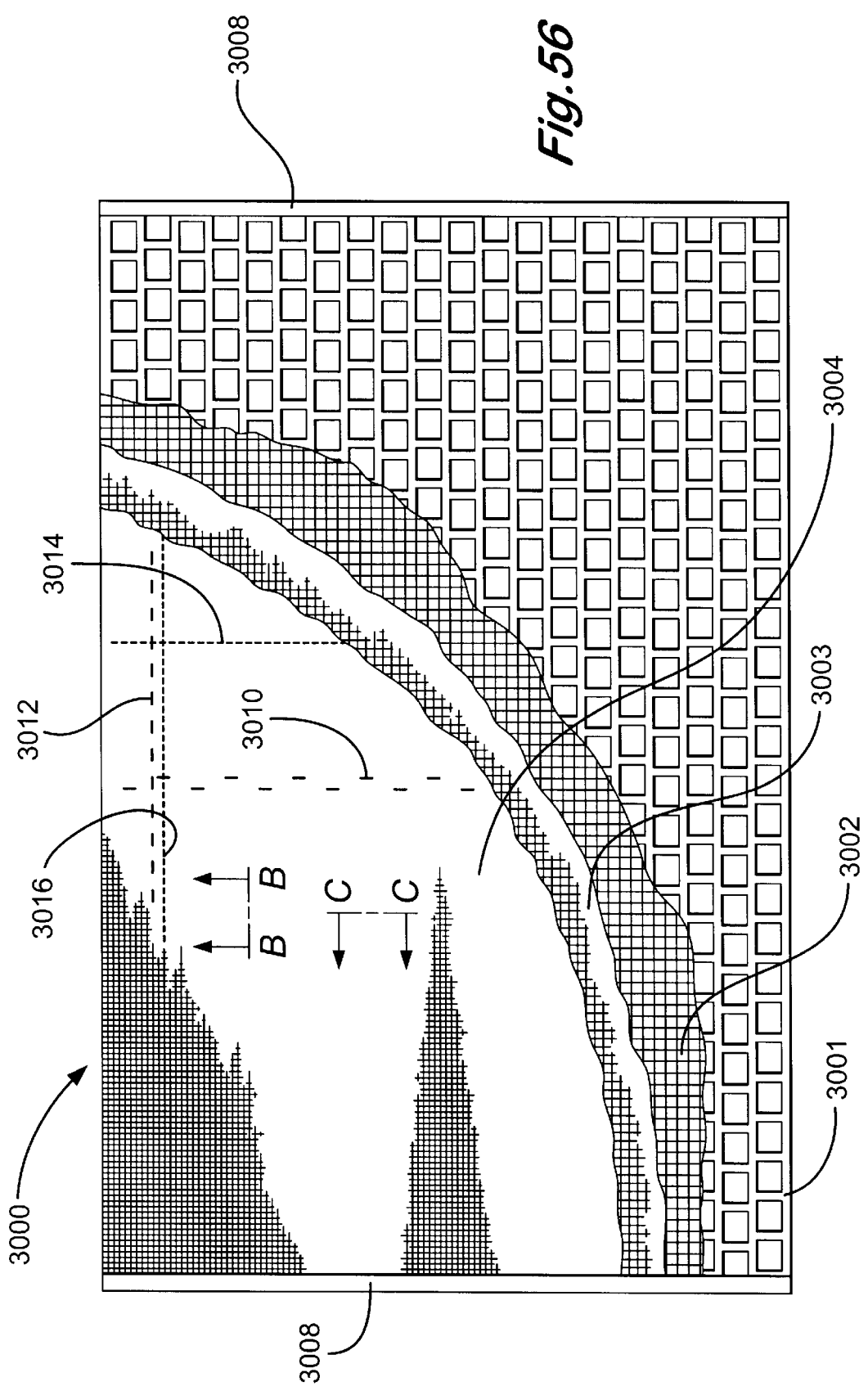

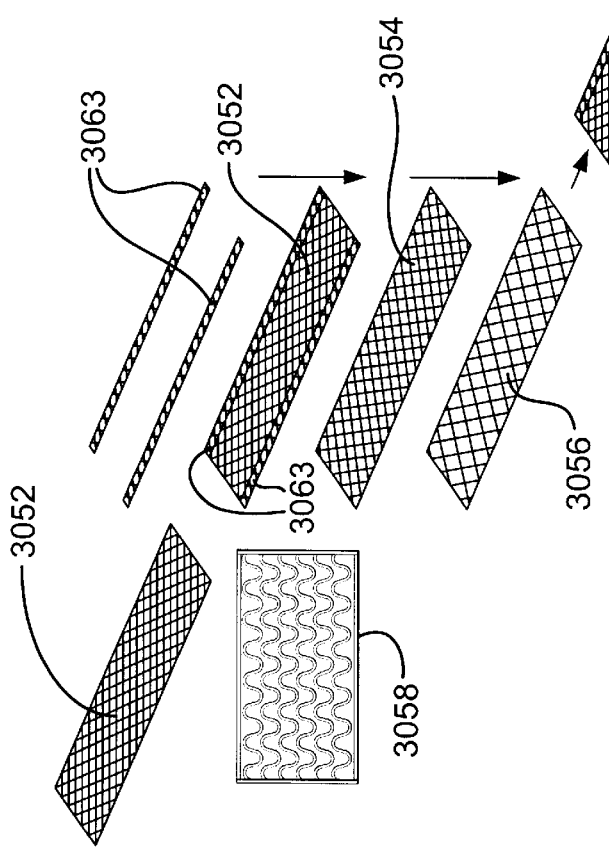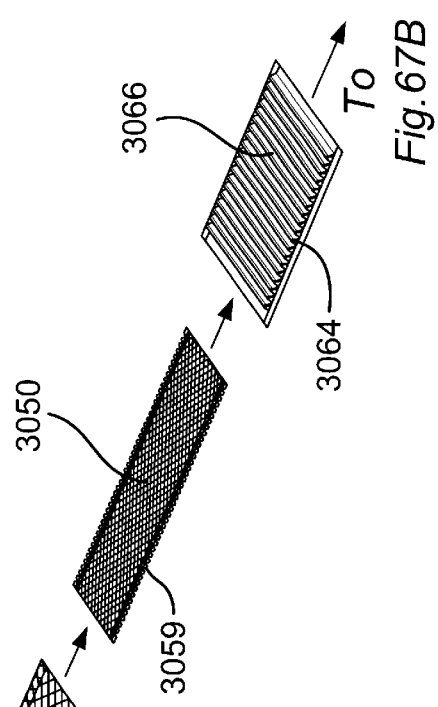

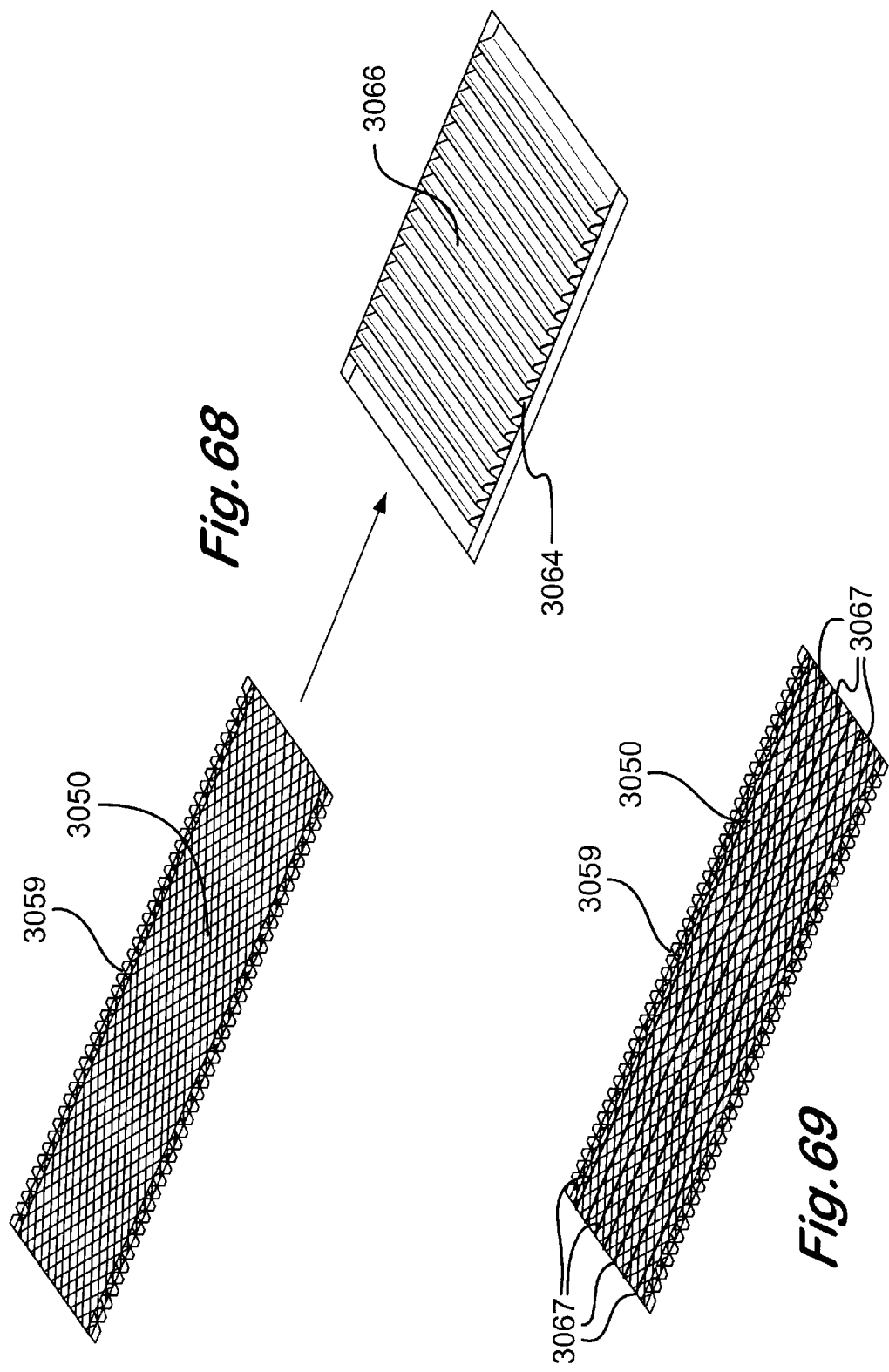

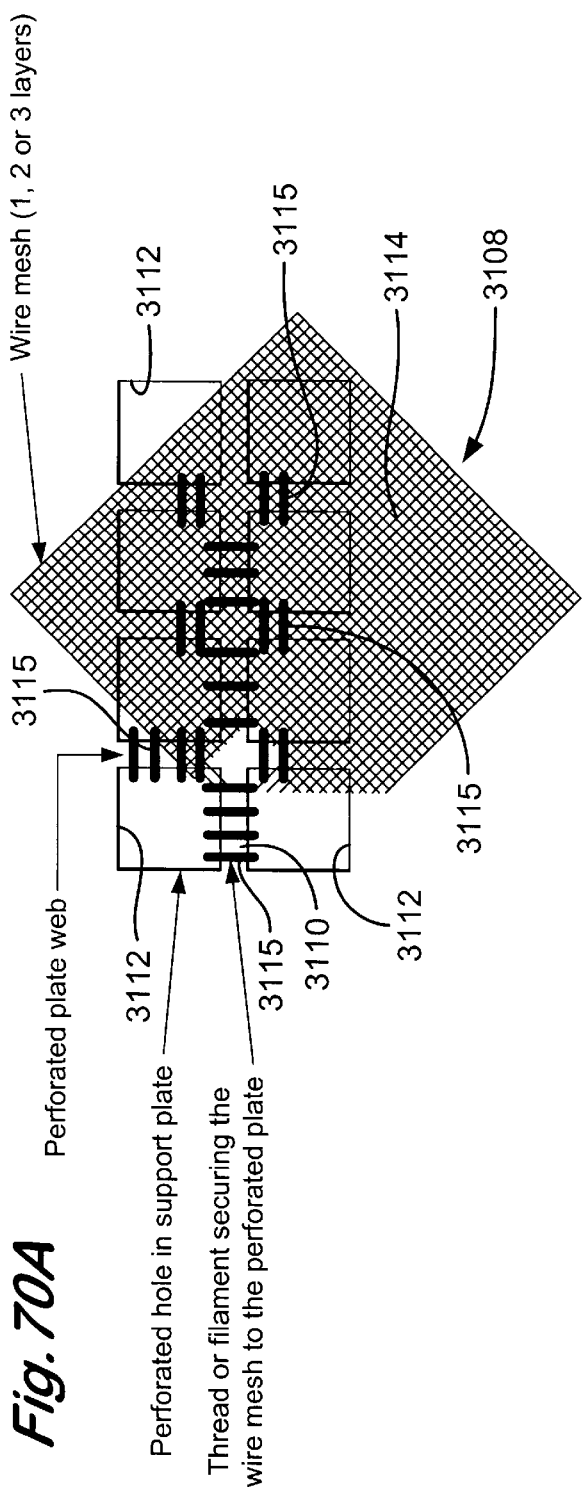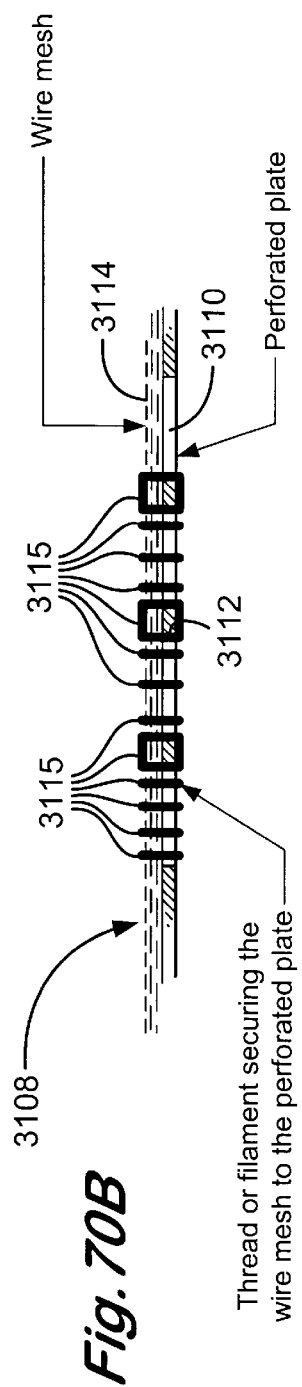

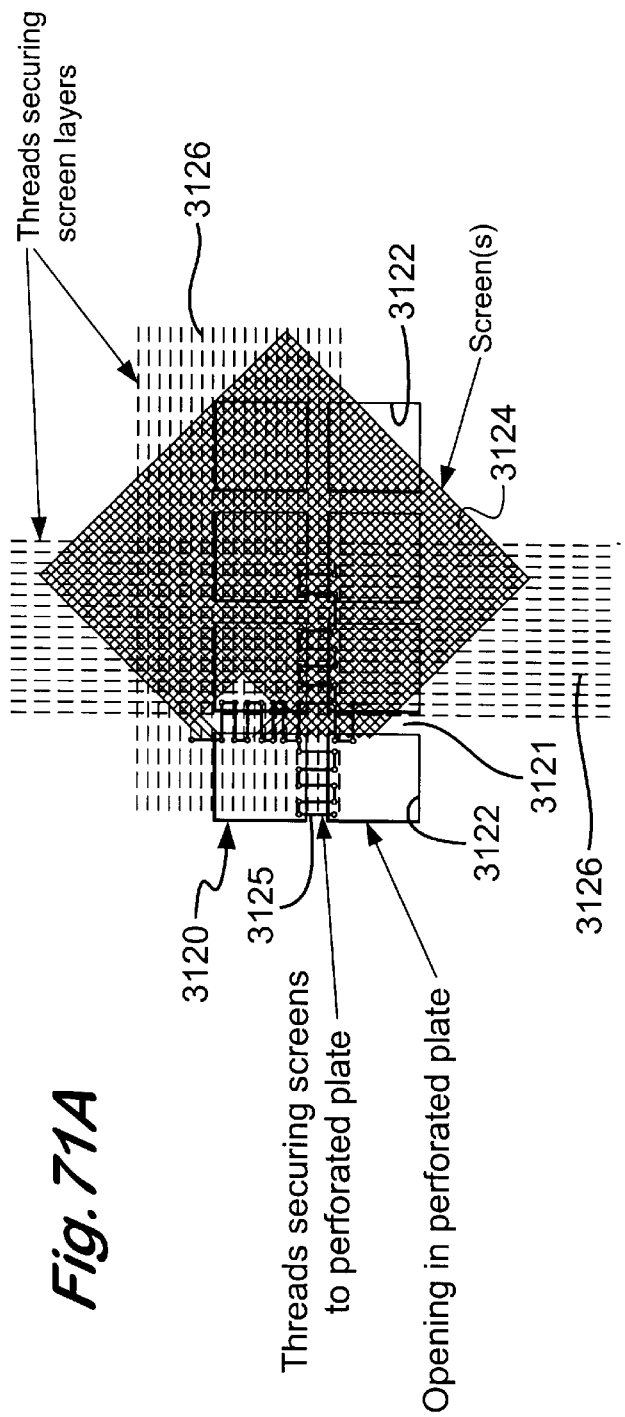
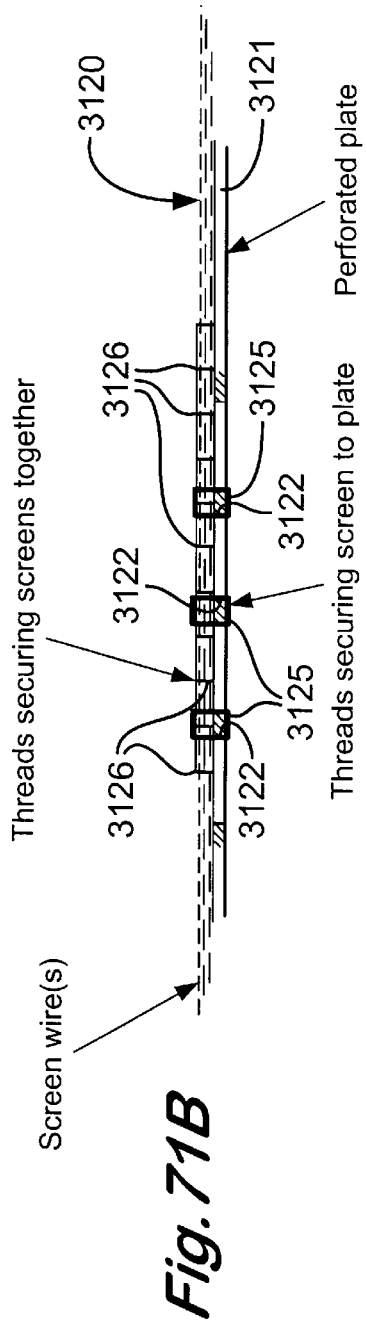
Fig. 71A
Fig. 71B

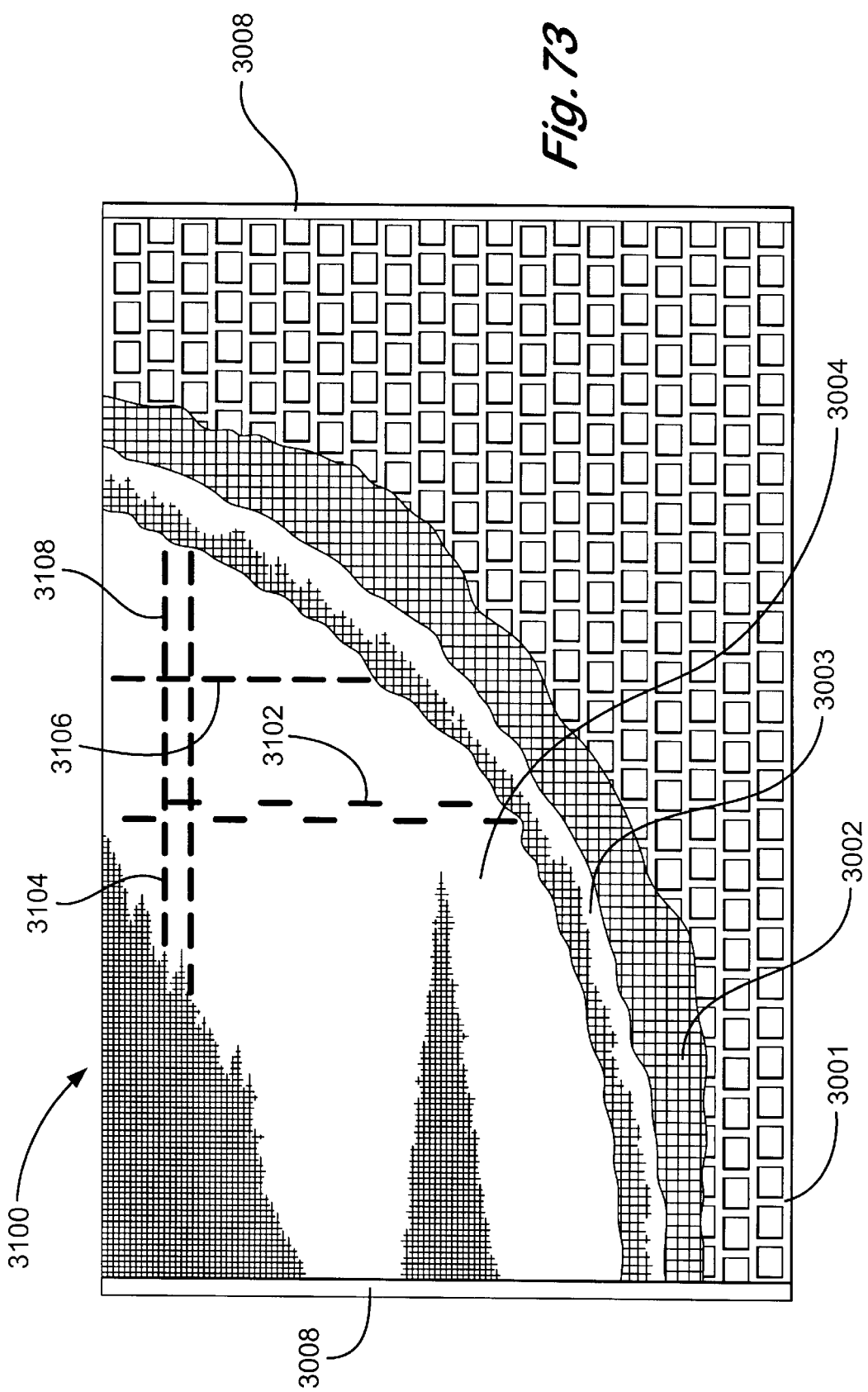

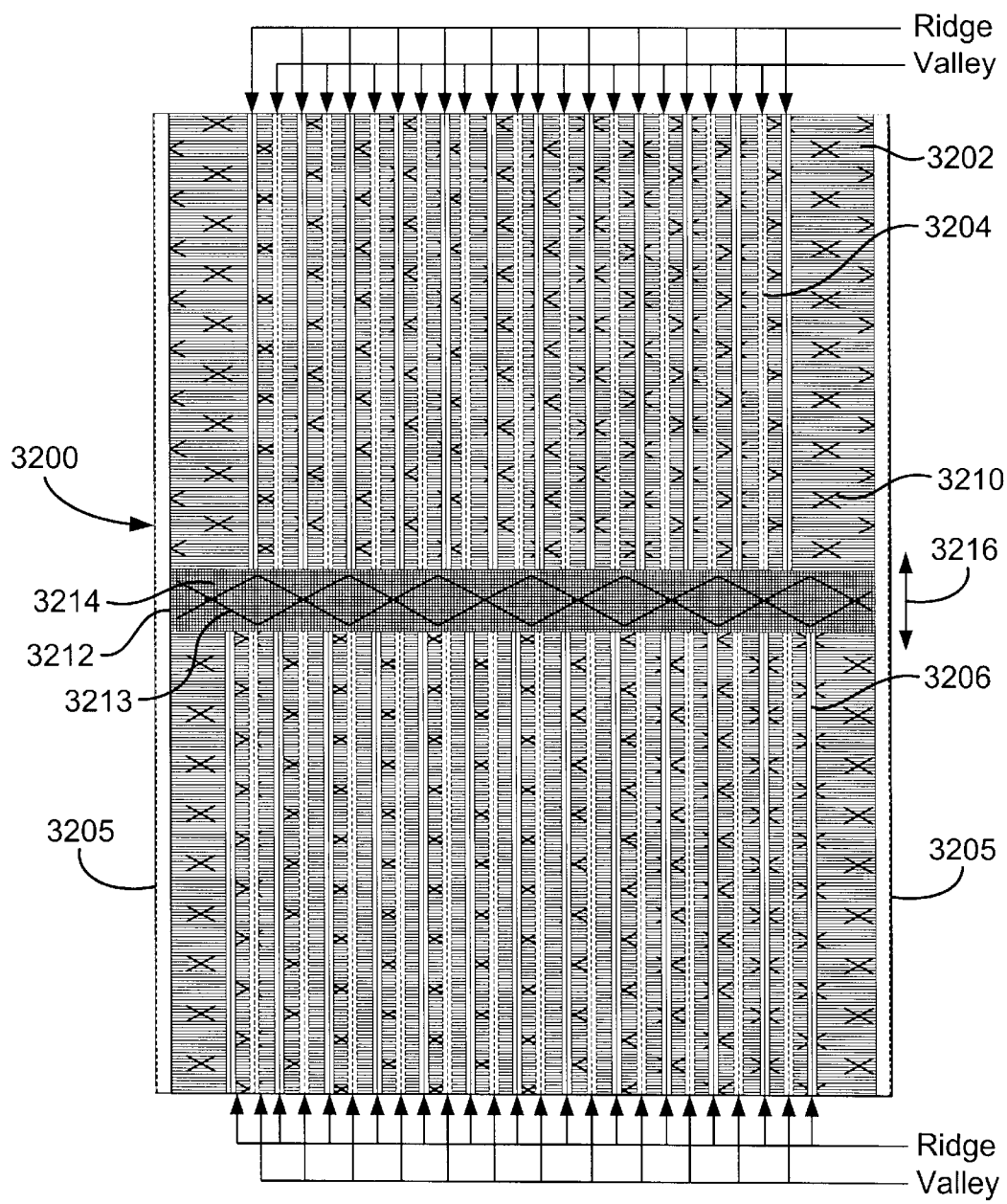
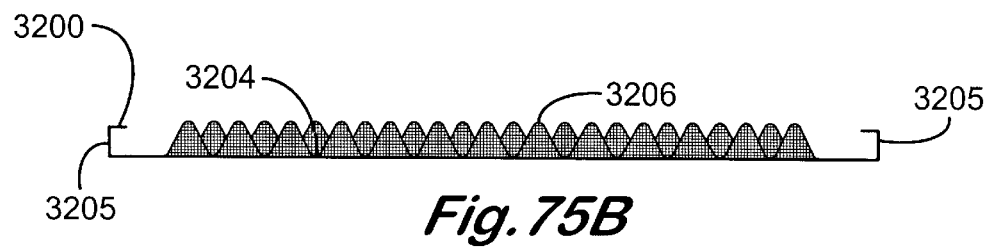
Fig. 75A
Fig. 75B

VIBRATOR SEPARATOR SCREENS

RELATED APPLICATIONS

This is a continuation-in-part of U.S. Application filed Oct. 25, 2000 entitled "Screen With Ramps For Vibratory Separator System" bearing Ser. No. 09/696,662 naming Adams, Shulte, Seyffert Largent and McClung as co-inventors which is a continuation-in-part of U.S. application Ser. No. 09/634,610 filed Aug. 5, 2000, a continuation-in-part of U.S. application Ser. No. 09/228,572 filed Jan. 11, 1999 now U.S. Pat. No. 6,152,307, which is a continuation-in-part of U.S. application Ser. No. 09/183,005 filed Oct. 30, 1998 now abandoned, which is a continuation-in-part of U.S. application Ser. No. 09/090,554 filed Jun. 4, 1998 now U.S. Pat. No. 6,267,247 which is a continuation-in-part of U.S. application Ser. No. 08/895,976 filed Jul. 17, 1997 now U.S. Pat. No. 5,988,397 which is a continuation-in-part of U.S. application Ser. No. 08/786,515 filed Jan. 21, 1997 now U.S. Pat. No. 5,971,159, and of U.S. application Ser. No. 08/598,566 filed Feb. 12, 1996 now abandoned which is a continuation-in-part of the following co-owned applications and patents: U.S. Ser. No. 29/048,575 filed Jan. 4, 1996, now U.S. Pat. No. D 377,656 issued Jan. 28, 1997 which is a continuation of U.S. Ser. No. 29/014,571, filed Oct. 25, 1993, now U.S. Pat. No. D 366,040 issued on Jan. 9, 1996 which is a continuation-in-part of U.S. applications Ser. No. 08/056,123 filed Apr. 30, 1993, now U.S. Pat. No. 5,385,669 issued on Jan 31, 1995; and Ser. No. 08/105,696 filed Aug. 12, 1993, now U.S. Pat. No. 5,392,925 issued on Feb. 28, 1995; U.S. Ser. No. 08/504,495 filed Jul. 20, 1995; U.S. Ser. No. 08/598,566 filed Feb. 12, 1996 which is a continuation-in-part of U.S. Ser. No. 08/220,101 filed Mar. 30, 1994 now U.S. Pat. No. 5,490,598 issued Feb. 13, 1996. This is a continuation-in-part of U.S. applications Ser. No. 09/517,212 filed Mar. 2, 2000; Ser. No. 09/544,572 filed Apr. 6, 2000; Ser. No. 09/228,572 filed Jan. 11, 1999; and Ser. No. 09/183,003 filed Oct. 30, 1998. This is a continuation-in-part of U.S. application Ser. No. 09/090,554 filed Jun. 4, 1998 entitled "Vibratory Separator Screen" which is a continuation-in-part of U.S. application Ser. No. 08/895,976 filed Jul. 17, 1997 entitled "Screen For Vibratory Shaker" which is a continuation-in-part of U.S. application Ser. No. 08/786,515 filed Jan. 21, 1997 entitled "Screen For Shale Shaker" and of U.S. application Ser. No. 08/598,566 filed Feb. 12, 1996 entitled "Screen For Vibrating Separator." U.S. application Ser. No. 08/786,515 is a continuation-in-part of the following co-owned applications and patents: U.S. Ser. No. 29/048,575 filed Jan. 4, 1996, now U.S. Pat. No. D 377,656 issued Jan. 28, 1997 which is a continuation of U.S. Ser. No. 29/014,571, now U.S. Pat. No. D 366,040 issued on Jan. 9, 1996 which is a continuation-in-part of U.S. applications: Ser. No. 08/056,123 filed Apr. 30, 1993, now U.S. Pat. No. 5,385,669 issued on Jan. 31, 1995; and Ser. No. 08/105,696 filed Aug. 12, 1993, now U.S. Pat. No. 5,392,925 issued on Feb. 28, 1995; U.S. Ser. No. 08/504,495 filed Jul. 20, 1995 entitled "Shale Shaker Screen;" U.S. Ser. No. 08/598,566 filed Feb. 12, 1996 entitled "Screen For Vibrating Separator" which is a continuation-in-part of U.S. Ser. No. 08/220,101 filed Mar. 30, 1994 now U.S. Pat. No. 5,490,598 issued Feb. 13, 1996. This is a continuation-in-part of U.S. Ser. No. 09/183,004 filed Oct. 30, 1998. All of these related applications and patents are incorporated herein in their entirety for all purposes.

BACKGROUND OF THE INVENTION

1. Field of the Invention

The present invention is directed to screens for vibratory shakers, screens for classifying and/or filtering material, such screens with one or more ramped and/or raised portions over and/or through which material to be treated flows, and vibratory separators with such screens.

2. Description of Related Art

The related art section of each of the above-identified applications is incorporated here fully by reference.

The need for solids control in drilling mud used in hydrocarbon well drilling is well known in the prior art. Drilling mud, typically a mixture of clay and water and various additives, is pumped down through a hollow drill string (pipe, drill collar, bit, etc.) into a well being drilled and exits through holes in a drillbit. The mud picks up cuttings (rock) and other solids from the well and carries them upwardly away from the bit and out of the well in a space between the well walls and the drill string. At the top of the well, the solids-laden mud is discharged over a shale shaker, a device which typically has a series of screens arranged in tiered or flat disposition with respect to each other. The prior art discloses a wide variety of vibrating screens, devices which use them, shale shakers, and screens for shale shakers. The screens catch and remove solids from the mud as the mud passes through them. If drilled solids are not removed from the mud used during the drilling operation, recirculation of the drilled solids can create weight, viscosity, and gel problems in the mud, as well as increasing wear on mud pumps and other mechanical equipment used for drilling.

In some shale shakers a fine screen cloth is used with the vibrating screen. The screen may have two or more overlying layers of screen cloth. The prior art discloses that the layers may be adhered or bonded together; and that a support, supports, or a perforated or apertured plate or frame may be used beneath the screen or screens. The screen is resiliently suspended or mounted upon a support and is caused to vibrate by a vibrating mechanism, e.g. an unbalanced weight on a rotating shaft connected to the frame. Each screen may be vibrated by vibratory equipment to create a flow of trapped solids on top surfaces of the screen for removal and disposal of solids. The fineness or coarseness of the mesh of a screen may vary depending upon mud flow rate and the size of the solids to be removed.

Many screens used with shale shakers are flat or nearly flat (i.e. substantially two-dimensional). Other screens, due to corrugated, depressed, or raised surfaces are three-dimensional. U.S. Pat. Nos. 5,417,793; 5,417,858; and 5,417,859 disclose non-flat screens for use with shale shakers. These screens have a lower planar apertured plate with a multiplicity of spaced-apart apertures or openings therethrough. Undersides of troughs of undulating screening material are bonded to the apertured plate.

Vibrating screens have been employed for many years to separate particles in a wide array of industrial applications. One common application of vibrating screens is in drilling operations to separate particles suspended in drilling fluids. The screens are mounted generally horizontally on a vibrating mechanism or shaker that imparts either a rapidly reciprocating linear, elliptical or circular motion to the screen. Material from which particles are to be separated is poured onto a back end of the vibrating screen, usually from a pan mounted above the screen. The material generally flows toward the front end of the screen. Large particles are unable to move through the screen remaining on top of the screen and moving toward the front of the screen where they are collected. The smaller particles and fluid flows through the screen and collects in a pan beneath the screen.

A vibrating screen may be formed from one or more layers of wire mesh. Wire mesh is generally described with reference to the diameter of the wires from which it is woven, the number wires per unit length (called a mesh count) and the shape or size of the openings between wires. Wire mesh comes in various grades. "Market" grade mesh generally has wires of relative large diameter. "Mill" grade has comparatively smaller diameter wires and "bolting cloth" may have the smallest diameter wire. The type of mesh chosen depends on the application. The related art section of each of the above-identified applications and patents is incorporated here fully by reference.

FIG. 34A discloses one example of a typical prior art shaker system (e.g. as shown in U.S. Pat. No. 5,190,645). A well is being drilled by a bit carried on a string of drill pipe as drilling mud is pumped by a pump into the drill pipe and out through nozzles in the bit. The mud cools and cleans the cutters of the bit and then passes up through the well annulus flushing cuttings out with it. After the mud is removed from the well annulus, it is treated before being pumped back into the pipe. The mud enters a shale shaker where the relatively large cuttings are removed. The mud then enters a degasser where gas can be removed if necessary. The degasser may be automatically turned on and off, as needed, in response to an electric or other suitable signal produced by a computer and communicated to degasser. The computer produces the signal as a function of data from a sensor assembly associated with shale shaker. The mud then passes to a desander and (or a desilter), for removal of smaller solids picked up in the well. The mud next passes to a treating station where, if necessary conditioning media, such as barite, may be added. Suitable flow controls e.g. a valve, control the flow of media. The valve may be automatically operated by an electric or other suitable signal produced by the computer as a function of the data from sensor assembly. From the treatment station, the mud is directed to a tank from which a pump takes suction, to be re-cycled through the well. The system shown in exemplary, and it will be understood that additional components of the same types (e.g. additional treatment stations) or other types (e.g. centrifuges) could be included. Such a shale shaker or vibrator separator apparatus may employ any known screen or screens and may have a single screen or combination of two or more screens, one above the other, as is well known in the art.

SUMMARY OF THE PRESENT INVENTION

The present invention discloses, in at least certain embodiments, a screen assembly for a vibratory separator apparatus, the screen assembly with at least two screening members, and the at least two screen members connected by sewing material (e.g., but not limited to thread, thread-like material, staples, and/or rivets). In such a screen assembly, the at least two screening members may be a plurality of layers of screening material, and in one aspect, the plurality of layers of screening material includes at least one or two fine screen layers and a second coarse screen layer.

The sewing material may be thread; thread-like material including but not limited to, yarn, twine, string, rope and cord; rivets; and staples or any other suitable material. The sewing material may be in a pattern of spaced-apart items, knots or stitches over the surface of the screen members. One of the screen members may be a perforated plate.

In one particular embodiment of a screen assembly according to the present invention there are at least two screening members including at least two or three layers of screening material and a base, the layers of screening material sewn together to form a combined screen, the combined screen sewn to the base.

In other embodiments there is expandable material on and corresponding to a sewing stitch pattern or pattern of holes made by a needle with thread or sewing material passing through holes in the expandable material, the expandable material expanded within the holes thereby contracting the holes following extraction of a needle therefrom to inhibit tearing between holes in the screening material or of either of the at least two screening members between holes and/or to inhibit or prevent tearing between points of passage of the thread, etc. through a member or screen. In another aspect there are multiple stitches, rivets, and/or staples and/or lines thereof adjacent each other in areas of increased wear of the screen assembly.

In other embodiments there is three-dimensional screening material with a plurality of alternating ridges and troughs, with at least one series of stitches, rivets, and/or staples (or with a pattern or series thereof) on a side of a ridge (or of sides of a plurality of ridges) from a top to a bottom thereof, and the at least one series of stitches, rivets, or staples (or plurality thereof) having portions projecting out from an outer surface of the ridge or ridges for contact by solid particles flowing over the screen assembly to change direction of travel of the solid particles. The present invention also provides, in at least certain embodiments, a vibratory separator apparatus or shale shaker with a vibratory shaker device, a screen assembly mounted on the vibratory shaker device and with at least two screening members, and the at least two screen members connected by sewing material.

What follows are some of, but not all, the objects of this invention. In addition to the specific objects stated below for at least certain preferred embodiments of the invention, other objects and purposes will be readily apparent to one of skill in this art who has the benefit of this invention's teachings and disclosures. It is, therefore, an object of at least certain preferred embodiments of the present invention to provide:

New, useful, unique, efficient, nonobvious: screens and vibratory devices with such screens; screens with two or more screening members and/or screening material layers sewn together; screens with expandable material for "healing" or contracting the size of holes through which thread or other sewing material passes; and methods for using such screens.

Certain embodiments of this invention are not limited to any particular individual feature disclosed here, but include combinations of them distinguished from the prior art in their structures and functions. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods.

The present invention recognizes and addresses the previously-mentioned problems and long-felt needs and provides a solution to those problems and a satisfactory meeting of those needs. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

BRIEF DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 1A is a top view of a screen plug according to the present invention. FIG. 1B is a side view of an embodiment of a plug as in FIG. 1A. FIG. 1C is a side view of an embodiment of a plug as in FIG. 1A.

FIG. 2A is a top view of a screen plug according to the present invention. FIG. 2B is a cross-section view along line 2B—2B of FIG. 2A. FIG. 2C, 2D are side views of an embodiment of a plug as in FIG. 2A.

FIG. 3A is a top view of a screen plug according to the present invention. FIG. 3B is a cross-section view along line 3B—3B of FIG. 3A. FIG. 3C is a side view of an embodiment of a plug as in FIG. 3A. FIG. 3D is a side view of an embodiment of a plug as in FIG. 3A. FIG. 3E is a side view of an embodiment of a plug as in FIG. 3A. FIG. 3F is a side view in cross-section of a fastener for the plug of FIG. 3F.

FIG. 4A is a top view of a screen according to the present invention. FIG. 4B is an end view of the screen of FIG. 4A.

FIG. 5A is a top view of a screen according to the present invention. FIG. 5B is an end view of the screen of FIG. 5A.

FIG. 6A is a perspective view of a strip support according to the present invention. FIGS. 6B, 6D are end views of the strip support of FIG. 6B. FIG. 6C is a top view of the strip support of FIG. 6A.

FIGS. 7A, 7E are top views of a strip support according to the present invention. FIG. 7B is a perspective view of the strip support of FIG. 7A. FIGS. 7C, 7D are end views of the strip support of FIG. 7B.

FIG. 8 is a top schematic view of a screen assembly according to the present invention.

FIG. 9 is a side cross-section view of a screen assembly according to the present invention.

FIG. 10A is a side cross-section view of a screen assembly according to the present invention. FIG. 10B is a side cross-section view of a screen assembly according to the present invention.

FIG. 11A is a side cross-section view of a screen assembly according to the present invention. FIG. 11B is a top view of the screen assembly of claim 11A.

FIG. 12A is a side cross-section view of a screen assembly according to the present invention. FIG. 12B is a top view of the screen assembly of claim 11A.

FIG. 13 is a side cross-section view of a plug according to the present invention.

FIG. 14 is a side cross-section view of a plug according to the present invention.

FIG. 15A is a bottom view of a plug according to the present invention. FIG. 15B is a side view of the plug of FIG. 15A.

FIG. 16A is a bottom view of a plug according to the present invention. FIG. 16B is a side view of the plug of FIG. 15A.

FIG. 17A is a top view of a screen assembly according to the present invention. FIG. 17B is an end view of the screen assembly of FIG. 17A. FIG. 17C is an end view of an elongated plug of the screen assembly of FIG. 17A. FIGS. 17D and 17E are end views of alternative elongated plug embodiments.

FIG. 19A is a perspective view of a strip system according to the present invention. FIG. 19B is a cross-section view along line 19B—19B of FIG. 19A. FIG. 19C is a cross-section view along line 19C—19C of FIG. 19B. FIG. 19D is a cross-section view of a system as in FIG. 19A.

FIG. 23A is a top view of a screen according to the present invention. FIG. 23B is a view along line 23B—23B of FIG. 23A.

FIG. 34B is a schematic view of a system according to the present invention.

FIGS. 39A, 39B and 40 are perspective views of screen assemblies according to the present invention.

FIG. 41 presents perspective views of a variety of components according to the present invention for screen assemblies according to the present invention.

FIGS. 42B and 42C present cross-section views of parts of the screen assembly of FIG. 42A. FIGS. 42D and 42E present alternative configurations for screen components according to the present invention.

FIG. 49 is a side view of a screen component (as in FIG. 48A) on a screen according to the present invention and FIGS. 50A–50C are side view of a screen according to the present invention.

FIG. 51A is a top view of a screen assembly according to the present invention. FIG. 51B is a cross-section view of the screen assembly of FIG.

FIG. 56 is a top view of a screen assembly according to the present invention.

FIG. 68 is a schematic view showing a method according to the present invention for making screen assemblies according to the present invention.

FIG. 69 is a perspective view of a screen assembly according to the present invention.

FIG. 70A is a top schematic view of part of a screen assembly according to the present invention. FIG. 70B is a side view of the screen assembly of FIG. 70A.

FIG. 71A is a top schematic view of part of a screen assembly according to the present invention. FIG. 71B is a side view of the screen assembly of FIG. 71A.

FIG. 73 is a top view of a screen assembly according to the present invention.

FIG. 75A is a top view of screen assembly according to the present invention. FIG. 75B is an end view of the screen assembly of FIG. 75A.

DESCRIPTION OF EMBODIMENTS PREFERRED AT THE TIME OF FILING FOR THIS PATENT

Figure 18A:
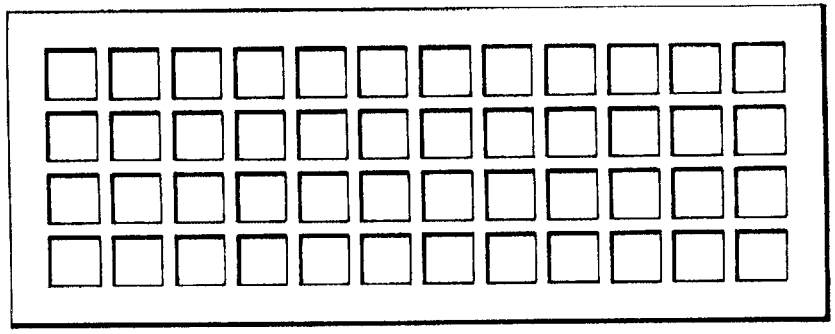
FIGS. 18A–18D are top views of prior art perforated plates.
Figure 18B:
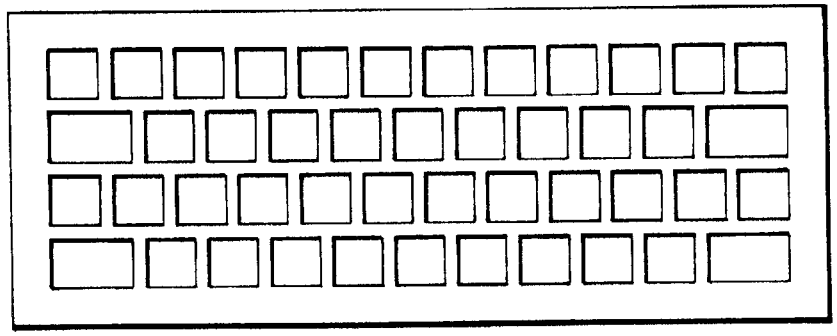
Figure 18C:
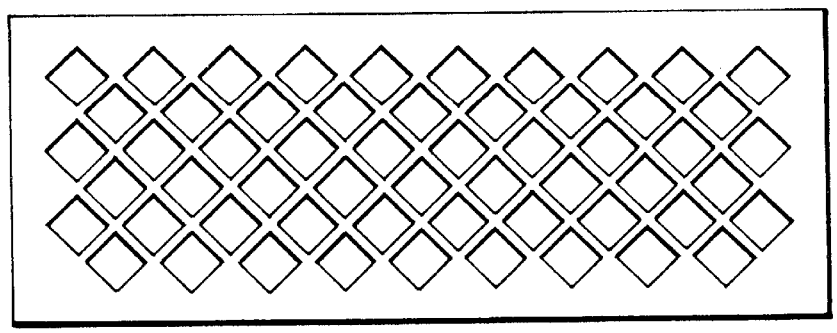
Figure 18D:
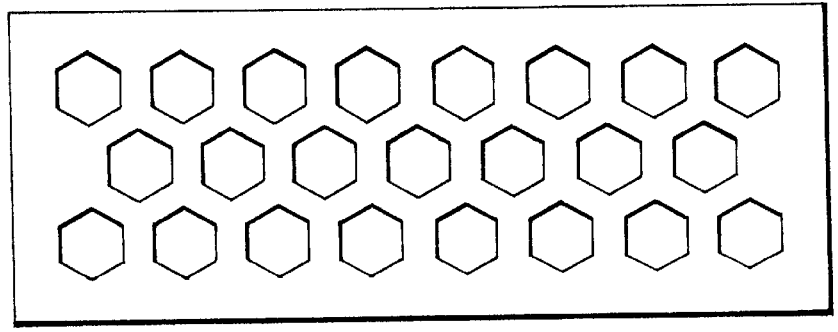

As shown in FIG. 1A, a plug 160 according to the present invention has a body 161 and a mesh 162 formed integrally thereof. It is within the scope of this invention for the mesh to be a wire mesh or meshes (or screens) secured to the body 161 or wire mesh over the integral mesh 162. In certain aspects the plug 160 is a single piece member made of plastic or urethane.

In the embodiment of FIG. 1B, the plug 160 has an upper member 163 spaced apart from a lower member 164 by a snap recess 165 which is sized to correspond to an edge of a screen opening so that the plug 160 may be snapped into and then held in the screen opening.

In the embodiment of the plug 160 in FIG. 1C, an upper member 166 is disposed above a lower member 167. The lower member 167 is sized to fit in an opening of a screen. The plug 160 may be held in place in a screen opening by a friction fit and/or with a suitable glue, adhesive, or epoxy. Velcro™ material at plug edges and on opening edges may be used to releasably secure any plug herein at or in an opening. Plugs of different screening material or mesh or mesh size may be used in different screen areas; e.g., but not limited to plugs with a 40 mesh at back edge of a screen and plugs with a 100 mesh at a front end of the screen.

As shown in FIGS. 2A, 2B and 2C, a plug 170 according to the present invention has a body 171 and a mesh 172 formed integrally thereof. It is within the scope of this invention for the mesh to be any known mesh or screen, meshes or screens, or combination thereof, including but not limited to a layer or layers of plastic or synthetic mesh or a piece or pieces of perforated plastic or synthetics (bonded together, unbonded, or bonded at intermittent points) or a wire mesh secured to the body 171. In certain aspects the plug 170 is a single piece member made of plastic or urethane.

In the embodiment of FIG. 2A, the plug 170 has an upper member 173 spaced apart from a lower member 174 by a snap recess 175 which is sized to correspond to an edge of a screen opening so that the plug 170 may be snapped into and then held in the screen opening.

In the embodiment of the plug 170 in FIG. 2D, an upper member 176 is disposed above a lower member 177. The lower member 177 is sized to fit in an opening of a screen. The plug 170 may be held in place in a screen opening by a friction fit and/or with a suitable glue, adhesive, or epoxy.

As shown in FIGS. 3A, 3B and 3C, a plug 180 according to the present invention has a body 181 and a mesh 182 formed integrally thereof. It is within the scope of this invention for the mesh to be a wire mesh secured to the body 181. In certain aspects the plug 180 is a single piece member made of plastic or urethane.

In the embodiment of FIG. 3A, the plug 180 has an upper member 183 spaced apart from a lower member 184 by a snap recess 185 which is sized to correspond to an edge of a screen opening so that the plug 180 may be snapped into and then held in the screen opening.

In the embodiment of the plug 180 in FIG. 3D, an upper member 186 is disposed above a lower member 187. The lower member 187 is sized to fit in an opening of a screen. The plug 180 may be held in place in a screen opening by a friction fit and/or with a suitable glue, adhesive, or epoxy.

FIG. 3E shows an embodiment of the plug 180 with an upper body 188 and a lower body 189 with threads 190 thereon. A fastener 191 (FIG. 3F) with internal threads 192 threadedly mates with the lower body 189 to removably attach the plug 180 in a screen opening. Internal threads may be used on the plug 180 with an externally threaded fastener.

FIG. 4A shows a screen 330 according to the present invention with a plurality of ridges with ridge tops 332 connected to ridge sides 333 with bottom member 334 between adjacent ridge sides 333. The ridge tops 332 have a plurality of openings 335 each with a plug 336 therein according to the present invention. The ridge sides 333 have a plurality of openings 337 each with a plug 338 therein according to the present invention. The bottom member 334 has one or a plurality of at least two or more openings each with a plug 339 therein according to the present invention. A plate 340 has the ridge tops 332, ridge sides 333 and bottom members 334, each with their respective openings. It is within the scope of this invention for some or substantially all (e.g. the total minus one, two, three, four, five, or up to twenty) of the openings in the plate 340 to be covered with screen, screens, mesh or meshes in any combination applied and secured in any known manner or in any manner disclosed herein. It is within the scope of this invention for any opening in the plate 340 to have a plug permanently or removably disposed therein or for such a plug to be emplaced in any opening to repair damaged screen or to replace a previously used plug. Any plug disclosed herein may be used with the screen 330. The plugs 342 are like the plugs of FIG. 1C, 2D, 3D or 3E. It is within the scope of this invention for the screen 330 to have any number of desired ridges 332 of any suitable dimensions with corresponding ridge sides 333 and bottom members 334, or with interconnected ridges having no bottom member therebetween. Alternatively, pointed corrugations may be used with no flat top and no flat bottom or with a flat bottom and pointed top. Such a screen (and any screen or screen assembly disclosed herein) may be used on a frame; on a flat perforated plate; on one or more braces and/or strip supports (flat and/or corrugated; and corrugated to correspond to the shape of the screen 330's shapes); on a combination thereof; and/or with upturned side edges or other connection apparatus for connection to a vibratory separator or shale shaker.

It is within the scope of this invention for the plugs, of FIGS. 2A–2D and 3A–3E (and any plug disclosed herein) to be circular, oval, or square, rectangular, triangular, regular polygonal, polygonal elliptical (as viewed from above) or to be elongated as disclosed below. It is within the scope of this invention for mesh or meshes on or formed integrally of any plug herein (described above or below) to be oriented and emplaced on a screen either parallel to or normal to the direction of flow of material onto the screen for dewatering or classifying as desired. It is within the scope of this invention to provide a plug (described above or below) with both mesh or meshes formed integrally thereof and mesh or meshes applied thereunder or thereover. Upper plug parts may be made of plastic (or urethane) with lower parts made of metal, or vice versa. The plug body may be plastic or metal with plastic and/or wire mesh bonded to it. Different plugs may be used in the same screen. Plugs can be any desired size. In one aspect plugs range from a smallest width of about 0.5 inches to one foot wide, or more and from a length of 0.5 inches to several feet. In one aspect plugs with different mesh or screen than other plugs are used in the same screen to provide a different classification function in one screen. In one aspect plugs of uniform size with similar or dissimilar mesh or screen are used.

FIG. 5A shows a screen 350 according to the present invention with a plurality of openings 351 and 352 in a plate 360. Plugs 353 are secured in some of the openings 351 and a plug 354 is in one of the openings 352. Mesh (shown partially in FIG. 5A) covers substantially all of the tops of the plugs 353 and 354. Screen 355 covers openings that are not plugged. Screen 355 may be any known screen, screens, mesh, or meshes applied to the plate 360 in any known manner or any manner disclosed herein. The plate 360 may be any known plate, flat or corrugated.

FIG. 6A shows a support strip 370 according to the present invention with a body 371, ends 372 and upturned fingers 373, 374. In one aspect the strip 370 is metal (e.g. but not limited to carbon steel or stainless steel), and the fingers are upturned following a cut 375 in the body 371 and then a cut to separate the fingers. These cuts are made and sized, in one aspect, so that the fingers are sized and positioned to correspond to raised portions of a corrugated screen or of a corrugated plate. The strip 370 can be used as any strip disclosed herein or in pending co-owned application U.S. Ser. No. 08/786,515 filed on Jan. 21, 1997 entitled "Screen For Shale Shaker" incorporated fully herein for all purposes. Alternatively, the strip 370 can be a molded item made as shown in FIGS. 6A–6C. It is within the scope of this invention to have a strip with three, four, five or more sets of upturned fingers and, in one aspect, to have a set of fingers for each raised portion of a plate and/or screen used with the strip. It is within the scope of this invention to use any desired number of strips with a plate and/or screen. One or more sets of fingers 373, 374 may be used on a strip with one or more fingers 385 of the strip of FIG. 7A. FIG. 6D shows an alternative embodiment of the strip 370 with an internal support 377 between fingers 373, 374. Such supports 377 may be glued in place to the interior surfaces of the fingers 373, 374. If the strip 370 is metal and the supports 377 are metal, they may be glued, sintered, or welded in place. The supports 377 (and strip 370) may be made of materials as described below for the supports and strips in FIGS. 19A–23D.

FIGS. 7A–7C disclose a support strip 380 for a screen and/or plate which has a body 381 (in one aspect made of metal) with ends 382 and a cut 383 which has fingers 385. As shown in FIGS. 7B and 7C, the fingers 385 are upturned and have a top curved portion 384. In one aspect the top curved portion 384 corresponds in shape to a curved portion of a corrugated plate and/or screen used with one or more of the strips 380. Alternatively the strip 380 can be made of one integral plastic piece. Any desired number of fingers 385 may be provided. FIGS. 7D and 7E show an alternative embodiment of the strip 380 with an internal support 387 beneath each finger 385. The supports 387 have an end portion 388 extending over a top of the strip 380. The supports 387 may be secured to the interior surface of the fingers 385 and/or secured to or fastened to the strip 380. The supports 387 as shown do not extend downward to the lowest extent of the bottom of the strip 380, although this would be within the scope of the invention. The supports 377, 387 may be one or a series of fluid flow holes therethrough—as may any support in FIGS. 19A–23D. Any support disclosed herein may be fastened to a strip and/or screen and/or plate with one or more fasteners and/or with Velcro™ material.

The present invention discloses a method for making a screen assembly in which a perforated plate is sandblasted and/or washed with any suitable degreaser and/or soap. Any suitable perforated plate may be used. In one particular embodiment the perforated plate has round holes about ¼ inch in diameter or square holes with a diagonal measurement of about ¼ inch which have centers that are about 0.030 inches apart and that are separated from each other by about 0.050 inches of plate. Alternatively holes with a ⅜ inch, or ½ inch diameter may be used. The plate, in certain aspects, is made of carbon steel, stainless steel, or plastic. The holes, in one aspect, are at a 45° angle to the direction of fluid flow across the plate. If desired, the plate can be sandblasted or sanded.

The plate is heated to about 450° F. (in an oven or heat press) and is then dipped, preferably while positioned horizontally, into a fluidized bed of epoxy, (or other suitable adhesive) to coat the plate with melted epoxy powder in the bed. Heat in the plate permits the epoxy powder to bond to it in a semi-cured state. In another aspect powdered nylon, (or powdered polyester, or any suitable powderized coating) is coated onto the plate using a fluidized bed. In one aspect the epoxy is about 15 to 30 mils thick and in another aspect is about 20 mils thick on top of the plate and about 5 mils thick on the sides and bottom.

One, two, three, four or more layers of wire mesh are then cut to cover the pattern of perforations on the screen plate (in one aspect wider and longer than the coated screen plate), in one aspect mesh of 2 mesh to 500 mesh. The wire mesh and screen plate are placed on top of a non-stick panel (e.g. a panel made of 20 gauge steel with a Teflon™ coating is applied to the panel; alternatively a 20 gauge steel sheet with a 20 mil thick sheet of Teflon™ material on it may be used). The now non-stick panel acts as a tray for sliding the plate/mesh combination into an oven and the panel prevents the screen plate coating from sticking to the oven. Due to the Teflon™ coating the plate surface adjacent to the wire mesh, the screen plate and wire mesh do not bond to the panel. The screen plate, alternatively, may be placed on top of the mesh or meshes. A second non-stick panel is then placed over the first plate/mesh/panel combination. This second panel non-sticking surface is adjacent to the plate. In one aspect this second panel has a sheet of self-adhesive Teflon™ material on its lower side facing the mesh on the plate. Instead of Teflon™ material, any material may be used which will prevent the epoxy (nylon, polyester, etc.) from sticking to the panels. The two panels may be fastened together to provide pressure to facilitate encapsulation of the mesh by molten epoxy.

The sandwich of panels, plate, and mesh is placed in an oven, e.g. for 6 to 8 minutes at 340° F. to cure the epoxy. The cured screen plate is removed from the oven and the mesh and epoxy are cut flush with the sides of the screen plate. It is known in the art to thus prepare a plate/mesh combination. However, the inventors are unaware of any prior art teaching: the re-introduction of the plate/mesh back into an oven; the re-heating of the plate/mesh; or corrugating a re-heated combination of plate/mesh.

The plate with the mesh may then be corrugated or, alternatively, it is first placed back in the oven for about 2 minutes at about 450° F. While still hot, the plate is removed from the oven and corrugated (e.g. using a press brake). In one aspect a plate about 36, inches wide and about 47 inches long after corrugations has corrugations with ridges that are about an inch high. In one preferred embodiment the plate with the mesh and cured epoxy is at a temperature of at least about 250° F. until the corrugating operation is finished. With more flexible cured materials, e.g. nylon, it is not critical to maintain the relatively high temperature level of the plate during the corrugation operation. Alternatively, the plate is not corrugated.

The resulting screen assembly may be attached to a frame or it may be provided with upturned opposed edges for connection to a separator or shaker. In one aspect Velcro™ material on the screen assembly is used with mating Velcro™ material on a frame or on a separator or shaker to releasably attach the screen assembly thereto. In another aspect the screen assembly is thus connected to one or more support strips (e.g. but not limited to, any support strip described herein).

In one aspect such a screen assembly is placed on a frame coated with epoxy and the two items are held together between Teflon™ material sheets. This combination is then cooked at about 450° F. for about 8 to 15 minutes to cure the epoxy and secure the screen assembly to the frame.

In one aspect a corrugated screen assembly as described above has the spaces below ridges capped or plugged at each end of the screen assembly.

FIG. 8 shows schematically a screen 450 with a plurality of screening plugs or modules 451, 452, 453 that are removably secured in corresponding openings 454 in a plate 456. Each module may be any size. With modules larger than those shown (e.g. up to a largest dimension of 6, 8, 12 or more inches or several feet; and in one aspect a screen with relatively few modules e.g. as in FIG. 8) there are fewer modules over the plate surface and with smaller modules (e.g. down to a largest dimension of about ½ inch) there are more modules over the plate surface. In one aspect the modules 451 have a relatively coarse metal mesh, e.g. 150 mesh screen; the modules 452 have a coarser mesh, e.g. 80 mesh; and the modules 453 have a fine mesh, e.g. 200 mesh, with the flow of fluid to be treated from the fine to the coarse modules (right to left in FIG. 8A). Alternatively this pattern can be reversed; all the modules may have a substantially similar mesh; or any and all modules may have a combination of meshes thereon, including screens in layers of different mesh and/or screens or meshes made of different material, e.g. but not limited to carbon steel, stainless steel, Teflon™ material, plastic, and/or urethane.

It is within the scope of this invention to provide any plug or module disclosed herein initially with no holes, perforations, or openings therethrough and then, e.g. later at a job site, to perforate the plug or module with the desired number and desired size openings, holes, or perforations or combination thereof. Such openings (and holes or openings for any plug or module disclosed herein) may be normal to the direction of the flow of fluid flowing above the hole, etc. (e.g. for classification) or at an angle other than perpendicular to such direction of flow (e.g. for dewatering to remove a large, preferably maximum, amount of liquid from a product).

With respect to the screen of FIG. 8 (or any other screen disclosed herein) it is within the scope of this invention for any plug or module, or any group thereof, to be fashioned for dewatering and/or for classification. A single screen may, therefore, have an area primarily for dewatering a product flowing thereacross and an area for classifying component materials of the product. Plugs and modules disclosed herein may be made of metal, plastic, fiberglass, cermet, urethane, KYNAR, polymeric material, BUNA N, Teflon™ material, or polyvinylidene fluoride. In one aspect a screen is provided with plugs or modules made of urethane (or similar material) for a high wear area (e.g. at an area of the initial introduction of a slurry to a first screen, the area which first encounters fluid and/or product to be treated); and a lower o wear area with plugs or modules with metal wire mesh.

Square plugs or similar plugs fitted with woven mesh (e.g. rectangular woven mesh) can be fitted to provide a screen for classifying or dewatering. With rectangular openings, in one aspect flow parallel to a long opening is used for dewatering and flow perpendicular to a long opening is used for classification.

FIG. 9 shows a screen assembly 460 with a plate 462 having holes 463 therethrough. A plug 464, 465, or 466 is removably secured in each hole 463. The plugs convert the plate into a 3-D corrugated screen assembly. It is within the scope of this invention for the plugs to have any desired shape and size to make a screen assembly with ridges of any shape and size—the ridges being part of the plugs. The plugs may be discrete separate items with a plurality of them spaced apart or they may be elongated members, e.g. two, four, twelve, twenty four, thirty, thirty six or more inches long and one, two, three, four or more inches wide.

The plug 464 has openings 467. Any number of openings of any desired size may be used. A mesh 468 covers the exposed surface of the plug 464. The plate 462 has optional openings 469 (any desired number and in any desired pattern) which may be sized for dewatering, separation, or classifying.

The plugs 465 have openings 469 and have no mesh thereon. The plug 466 has two mesh layers 470 and 471 and holes 472. Any combination of any mesh made of any material may be used on the plugs 464, 465, 466. Grooves 475 permit the plugs to be snapped into the holes 463. Alternatively the plugs can be permanently or semi-permanently bonded to the plate. Failed or damaged plugs may be replaced with little or no loss of screening area.

FIG. 10A shows a screen assembly 480 according to the present invention with a plate 482 having holes 481 therethrough and thereacross. A groove 484 permits plugs 485 to be snapped into the holes 481. A top perforated plug body 483 projects above the plate surface and a bottom perforated plug body 488 projects below the plate surface. Perforations 486 in the top perforated plug body may be similar to or different from perforations 487 in the bottom perforated plug body in size and disposition and they may be angled differently. Top and bottom plug bodies may be made of similar or different material and they may have one or more meshes (metal or otherwise thereon). As with the plugs of FIG. 9 and others disclosed herein, the plugs 485 may be any desired size, length, width, and cross-sectional shape.

FIG. 10B shows a screen assembly 490 with plugs as in FIG. 9 above a top surface of the plate 462 and bottom plug bodies like those of the plugs 485 (FIG. 10A). Holders 491 hold the bottom plug bodies on the plate 462. The holders 491 use the grooves 484 as is shown in FIG. 10A. The sections of the plate 462 between plugs may have holes or openings therethrough. The holes 463 in the plate 462 may be sized and configured as any opening or hole disclosed herein, including but not limited to an array of adjacent holes or openings (square, hexagonal, circular, triangular, rectangular) extending across the entire surface of the plate 462 or a series of relatively long openings extending from one side of a square or rectangular plate 462 to the other so that a corrugated screen is formed with both upper and lower corrugated surfaces defined by the plugs, the plugs extending for substantially the whole length of the relatively long openings.

FIGS. 11A and 11B show a screen assembly 630 according to the present invention with a plate 631 (shown partially) having a plurality of openings 632 thereacross. The openings 632 may initially be covered by one or more meshes and/or screens (as with all plates disclosed herein) or, alternatively all the openings 632 may have a plug 634 therein (as with all plates disclosed herein). Also, a plug 634 may be used to repair damaged mesh/screen over an opening with little or no loss of screening area. The plug 634 has a tapered body 635 corresponding to a tapered surface of the openings 632 and a lower lip 636 that permits the plug to be snapped into the openings 632 and held in the openings 632. The plug 634 has holes 637 extending therethrough. Alternatively the plugs 634 may be solid or may have more or less holes of larger or smaller diameter than those shown. The plug 634 as shown in FIG. 11B is elliptical as viewed from above; however it is within the scope of this invention to use any suitable shape, including but not limited to square, circular, triangular, hexagonal, polygonal, regular polygonal or rectangular. Also, a mesh, meshes, screen, and/or screens may be applied on the top surface of the plugs 634. It is critical for certain particular embodiments of the screen assembly 630 that the top surface of the plugs 634 is substantially flush with the top surface of the plate 631 (or with mesh etc. on top of the plate). Materials disclosed herein may be used for the plugs and plate.

FIGS. 12A and 12B show a screen assembly 640 according to the present invention with a plate 641 (shown partially) having a plurality of openings 642 thereacross. The openings 642 may initially be covered by one or more meshes and/or screens (as with all plates disclosed herein) or, alternatively all the openings 642 may have a plug 644 therein (as with all plates disclosed herein). Also, a plug 644 may be used to repair damaged mesh/screen over an opening. The plug 644 has a body 645 and a groove 646 that permits the plug to be snapped into the openings 642 and a bead 649 on the plate 641 to enter into the groove 646 to hold the plugs 644. The plug 644 has holes 647 extending therethrough. Alternatively the plugs 644 may be solid or may have more or less holes of larger or smaller diameter than those shown. The plug 644 as shown in FIG. 12B is circular as viewed from above; however it is within the scope of this invention to use any suitable shape, including but not limited to square, circular, elliptical, hexagonal, polygonal, regular polygonal, triangular, or rectangular. Also, a mesh, meshes screen, and/or screens may be applied on the top surface of the plugs 644. It is critical for certain particular embodiments of the screen assembly 640 that the top surface of the plugs 644 is substantially flush with the top surface of the plate 641 (or with mesh etc. on top of the plate). Materials disclosed herein may be used for the plugs and plate.

FIG. 13 shows a plug 650 according to the present invention with a body 651 and a top convex surface 652. A series of holes 653 extend through the plug 650. The plug 650 may be any desired size or shape.

FIG. 14 shows a plug 660 according to the present invention with a body 661, a top convex surface 662, and a mesh 668 thereon. A series of holes 663 extend through the plug 660. The plug 660 may be any desired size or shape. The holes 653 (FIG. 13) and holes 663 (FIG. 14) may be any diameter and there may be any desired number of them.

FIGS. 15A and 15B show a plug 670 according to the present invention with a body 671 and a series of holes 673 extend therethrough. The plug 670 may be any desired size or shape. The plug 670 is made of flexible material and has an expansion ring 675 therein that pushes the plug sides outwardly to facilitate maintenance of the plug 670 in position in a plate opening and/or put the plug's mesh or meshes in tension. A mesh or screen 675 is on top of the plug 670.

FIGS. 16A and 16B show a plug 680 according to the present invention with a body 682. A series of holes 683 extend through the plug 680. The plug 680 may be any desired size or shape. The plug 680 is made of flexible material and has expansion springs 684 and 686 that push the plug sides outwardly to facilitate maintenance of the plug 680 in position in a plate opening and/or put the plug's mesh or meshes in tension. One, two, three or more springs may be used. Meshes 681 and 688 are secured on the plug 680.

FIGS. 17A and 17B show a screen assembly 500 according to the present invention with a perforated plate 502 having perforations 504 extending therethrough from top to bottom. Any number and size perforations may be employed in any desirable pattern or positioning on the plate 502. Dovetail recesses 506 extend across the plate 502. Holes 505 extend from the recesses through the plate 502. A corresponding dovetail base of an elongated hollow plug 510 is held in each dovetail recess 506. Each plug 510 has a series of perforations or holes 508 therethrough and one or more bottom holes 509. Any number and size holes may be employed in any desired pattern or positioning on the plugs 510. The plugs 510 may be held tightly in the recesses 506 with a tight friction fit and/or with welding or epoxy. In one aspect the plugs 510 are removably inserted into the dovetail recesses 506 for easy replacement and/or repair. Any hole in a plug 510 may be repaired with a plug as previously described above for repairing damaged or torn mesh or screen. The perforations 504 and/or the holes 508 may be covered with any known mesh, meshes, screen or screens, bonded or unbonded, in any combination or layers.

FIG. 17C shows one of the plugs 510.

FIG. 17D shows an alternative embodiment of an elongated hollow plug 520 according to the present invention that has a body 522, holes 524 therethrough, a base 526 with holes 528 therethrough and a dovetail portion 529 through which the holes 528 also extend. To enhance sealing of the plug/plate interface, a seal bead 521 is provided along each side of the plug along its entire length. Alternatively such a seal member may be formed of or secured to the plate with which the plug 520 is used. The seal bead or member may be plastic, rubber, or any known suitable sealing material. Such a bead may also serve to stabilize the plug in place on the plate.

FIG. 17E shows an alternative elongated solid plug 530 with a body 532 having a series of holes 534 therethrough and a dovetail base 536. A mesh or screen 538 is secured over the plug body 532 covering the plug on its top surface. Fluid to be treated flows through the screen 538 and through the holes 534. Two or more meshes and/or screens may be used.

FIGS. 18A–18D show known perforation patterns for plates used with screens which may be used with plates and/or screen assemblies according to the present invention. The direction of fluid flow on the plates of FIGS. 18A–18D may be from top to bottom (as viewed in the Figures) or side to side (as viewed in the Figures).

Pending U.S. applications Ser. Nos. 08/598,566 and 08/786,515, identified above, are incorporated herein in their entirety for all purposes.

FIG. 19A shows a screen frame 700 according to the present invention. In one aspect the frame 700 is made from a single sheet or frame piece from which areas 702 are removed, e.g. but not limited to by an appropriate saw or laser, to form outer sides 703, 704, 705, 706 and cross strips 707 and cross strips 708. Each cross strip 708 has two raised portions or humps 709. It is within the scope of this invention for any of the strips 707, 708 to have one, two, three, four five or more humps 709.

As shown each hump 709 has an internal support 710 therebeneath. The supports 710 are secured to a strip's underside by any suitable means, including, but not limited to, glue, adhesives, epoxy, sintering, and welding. The strips 707, 708 and the supports 710 may be made of any suitable metal, plastic, fiberglass, or composite material.

As shown in FIGS. 19B and 19C the inner surface of a top of the raised portion or hump 709 is spaced apart from a top surface of the supports 710 to facilitate fluid flow over and around the supports 710.

As discussed below, the strips 707, 708 and/or supports 710 may have a series of fluid flow holes therethrough. As shown in FIG. 19D a hump 711 (like the humps 709, FIG. 19B) has a series of fluid flow holes 712 therethrough and a support 713 (like the supports 710, FIG. 19B) has a series of fluid flow holes 714 therethrough.

Figure 20A:
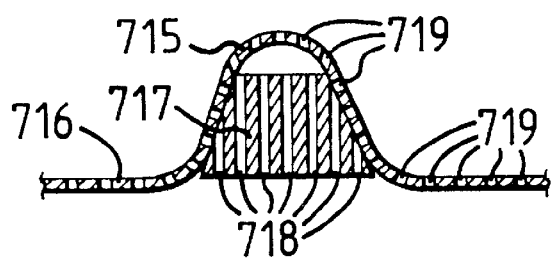
FIG. 20A is a cross-section view of a screen support member according to the present invention.
Figure 20B:
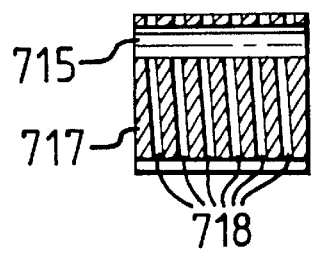
FIG. 20B shows a side cross-section view of the support of FIG. 20A.

FIGS. 20A and 20B shows a hump 715 (like the humps 709, 711) on a strip 716. The strip 716 has a series of fluid flow holes 719 therethrough, including holes through the hump 715. An internal support 717 with a series of fluid flow holes 718 therethrough is substantially as wide as the strip 716.

Figure 21A:
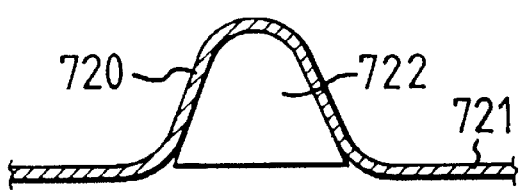
FIG. 21A is a cross-section view of a screen support member according to the present invention.
Figure 21B:
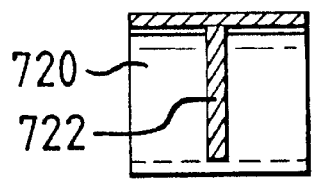
FIG. 21B shows a side cross-section view of the support of FIG. 21A.

FIG. 21A shows a hump 720 (like the humps in FIGS. 19B, 19D, 20A) of a strip 721 (like the strips 708, 716) has an internal support 722; but the support 722 viewed in cross-section as in FIG. 21A, occupies substantially all of the space under the hump 720 when viewed this way. The support 722 and/or hump 720 may have a series of fluid flow holes therethrough. The support 722, as is true of the supports in FIGS. 19D, 20A, 22A, 22C, 23B, and 23D, may be secured to a strip's underside as is a support 710 (FIG. 19B) and the strips in these figures and the supports may be made of any of the materials listed above regarding the strips 707, 708 and supports 710.

Figure 22A:
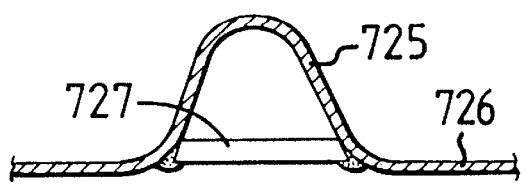
FIG. 22A is a cross-section view of a screen support member according to the present invention.
Figure 22B:
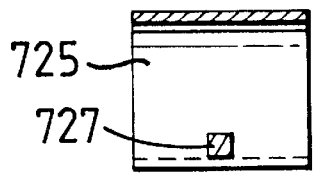
FIG. 22B shows a side cross-section view of the support of FIG. 22A.
Figure 22C:
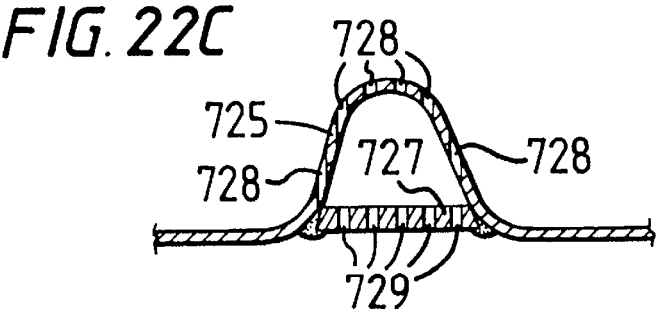
FIG. 22C is a cross-section view of a screen support member according to the present invention.

FIGS. 22A and 22B show a hump 725 of a strip 726 with an internal support 727 adhesively secured to the strip 726 with epoxy. Alternatively, the support 727 may be welded to the strip 726. Preferably when viewed as in FIG. 22B the support 727 occupies less than 10% of the area beneath the hump 725 and most preferably less than 5%. As with any other internal support and hump disclosed herein, the hump 725 and/or support 727 may have one or a series of fluid flow holes therethrough, as shown with the holes 728, 729 in FIG. 22C.

Figure 23C:
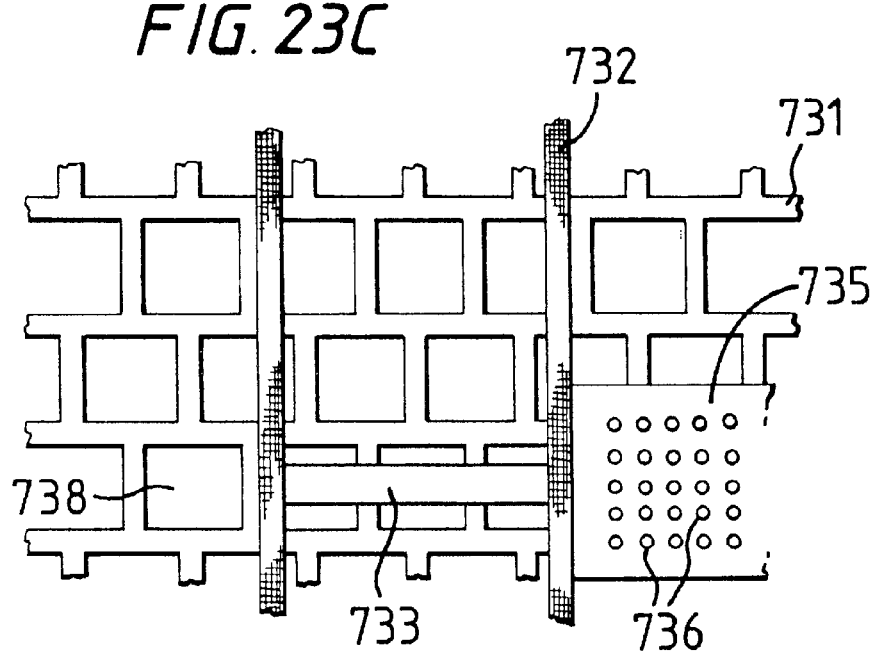
FIG. 23C is a view along line 23C—23C of FIG. 23B.

FIGS. 23A–23C illustrate changes to a screen assembly 730 disclosed in U.S. Pat. No. 5,720,881 which is incorporated fully herein. The screen assembly 730 has a plate 731 with holes 738 therethrough and a multi-layer screen 732 epoxied together and bonded to the plate 731.

As shown in FIG. 23B, support 733 underlies a ridge 734 of the screen 732 and support 735 with a series of fluid flow holes 736 therethrough underlies a ridge 737.

It is within the scope of this invention to use one or more supports 733 and/or 735 (and/or one or more of any of the supports disclosed herein) under one, two, three, more than three, or all of the ridges of the screen 732 (or of any screen or screen assembly disclosed in U.S. Pat. No. 5,720,881). In one aspect each ridge may have a series of spaced apart supports and, in another aspect, supports under one ridge are offset from those under another ridge.

Although it is not preferred, in certain embodiments the support(s) may be loose under the ridges. As shown in FIG. 23B the support 733 is secured to the screen 732 and to the plate 731 and the support 735 is secured to the screen 732.

As shown in FIG. 23C the width of a support may be such that, as viewed from above, it does not block off the openings 738 (support 733) or, alternatively it does block off openings 738 (support 736).

Figure 23D:
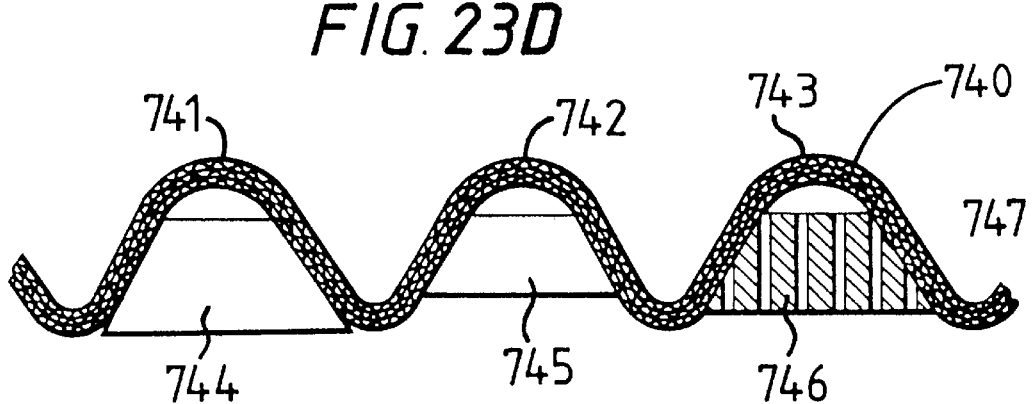
FIG. 23D is a cross-section view of a screen according to the present invention.

FIG. 23D shows a screen 740 like the screen assembly 730's screen 732, but with no lower plate 731. It is to be understood that the screens 732 and 740 represent any known single or multi-layer screen or screen assembly with screen(s) bonded together or unbonded. It is within the scope of this invention to use one or more supports (any disclosed herein) with each of the various screen assemblies disclosed in U.S. Pat. No. 5,720,881 including but not limited to those of this patent's FIGS. 2, 4, 8 and 9.

Ridges 741, 742, 743 of the screen 740 each has an internal support 744, 745, 746, respectively secured thereto and thereunder. It is within the scope of this invention for the screen 740 to have only supports 744, 745, or 746, to have them under each ridge, for such supports to extend along and under the entire length of a ridge, or for there to be a plurality of spaced apart supports beneath each ridge. The support 746 is shown with a series of fluid flow holes 747 therethrough, but it may be solid and either or both of the supports 744, 745 may have a series of fluid flow holes therethrough.

Figure 24B:
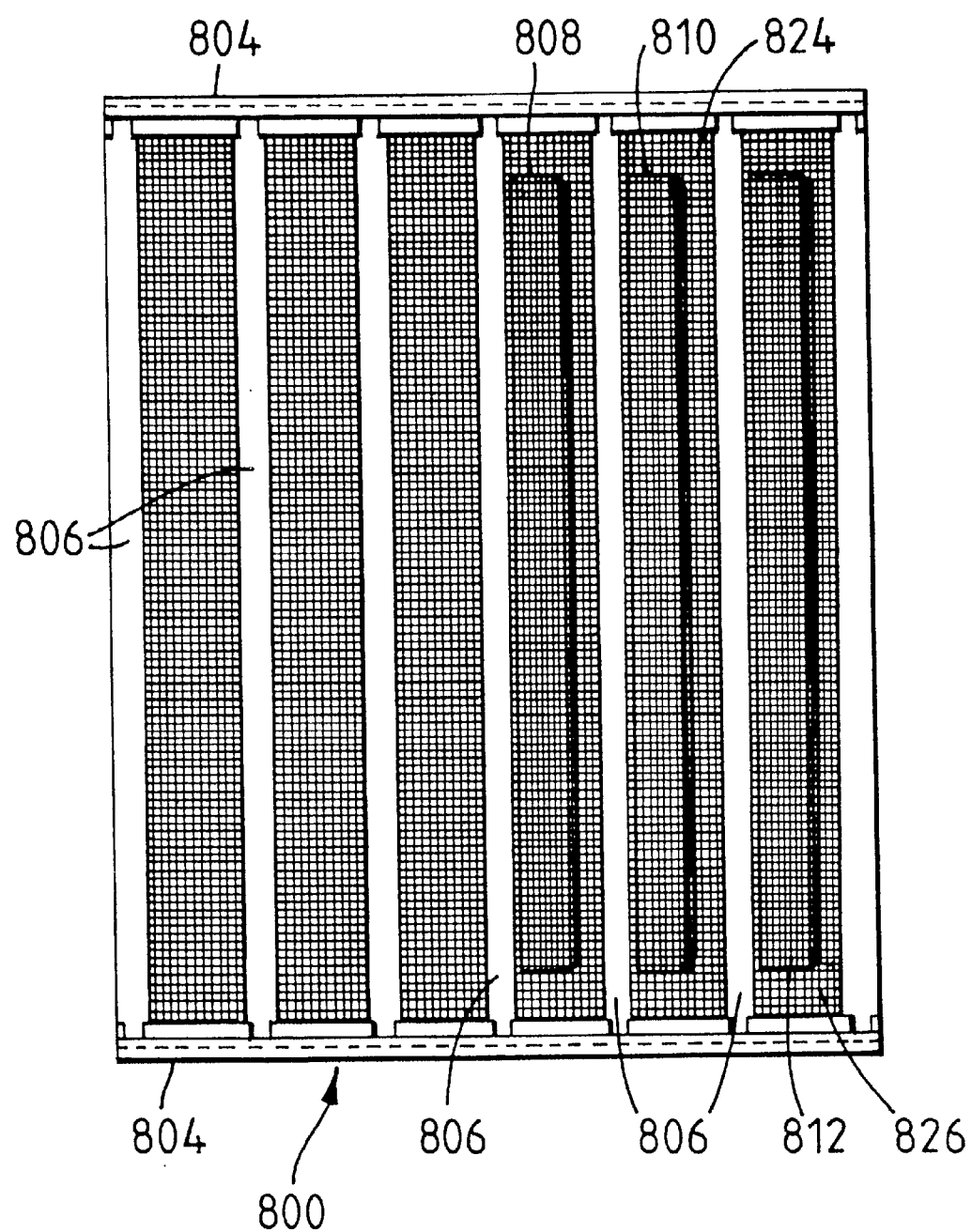
FIG. 24B is a bottom view, FIG. 24C a top view, FIG. 24D a side view, FIG. 24E a side view, and FIG. 24F an end view of the screen of FIG. 24A.

FIG. 24A shows a screen 800 according to the present invention with mesh 802 supported on spaced-apart straps 806. The mesh 802 may be any suitable known mesh, screen, meshes, screens, or combination thereof, secured together or lying on each other and/or partially bonded or sintered together, or so connected to each other over substantially all of their area. In the screen 800, the mesh 802 is, in one aspect, a wire mesh that is bonded to the straps 806.

The straps 806 are secured to hookstrips 804, e.g. as previously described for straps herein.

As shown, the screen 800 has three spaced-apart ramps 808, 810, 812. A dewatering area or pool 822 is defined between the two ramps 808, 810 and a dewatering area or pool 820 is defined between the two ramps 810, 812. Side flow paths 824, 826 are positioned between ends of the ramps 808, 810, 812 and the hookstrips 804.

Figure 24C:
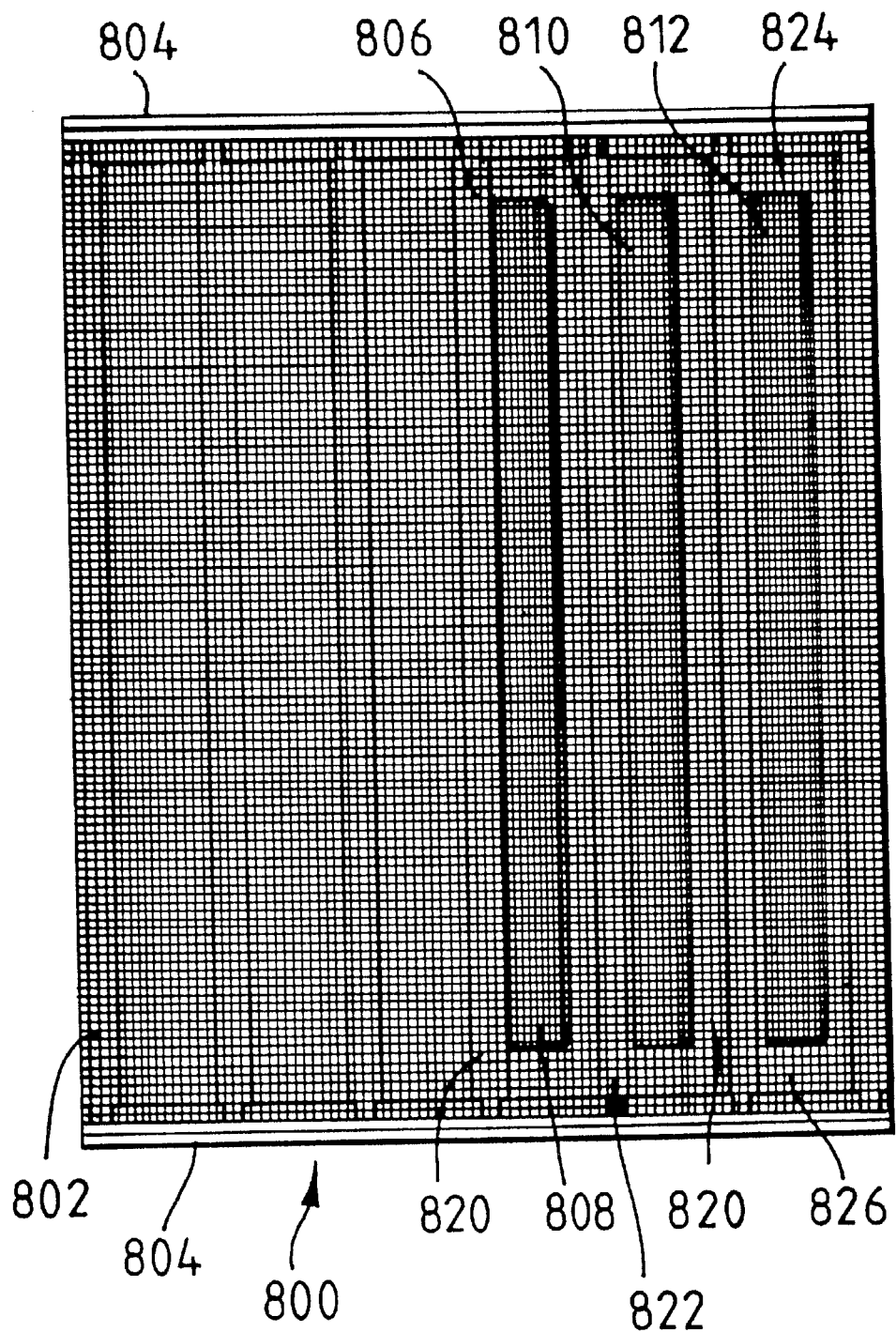
FIG. 24A is a perspective view of a screen according to the present invention.

In one aspect the ramp 808 is located so that fluid material is introduced onto the screen 800 in an area behind (to the left in FIG. 24C) the ramp 808 and which includes one of the straps 806 therebeneath to counter effects of the impact of the fluid material on the wire mesh 802 in this area. Also such a location of the ramp 808 with respect to the strap 806 facilitates dewatering of solids in this area while inhibiting screen wear. Liquid rising to the top can exit through the screen ramp. Similarly a strap 806 traverses the areas 822 and 826.

Alternatively, the ramp portions and straps may be positioned so that any or part of the ramp portions overlie a strap or a portion of a strap. The ramp portions may be spaced apart any desired distance. In one aspect the screen 800 is about 36 inches by 45½ inches; the right-hand edge (as viewed in FIG. 24C) of the ramp 808 is between about three to about five inches or more from the left-hand edge of the ramp 810; the right-hand edge of the ramp 810 is between about three to about five inches or more from the left-hand edge of the ramp 812; the right-hand edge of the ramp 812 is between about three to about five inches or more from the right edge of the screen 800; and the ramps are between about three to about five inches wide (horizontal dimension as viewed in FIG. 24E) and about ½ inch high (as in FIG. 24E). Each ramp 808, 810, 812 has a ramped surface 808a, 810a, 812a, respectively at an angle, preferably, between about twenty to about forty degrees from the horizontal, more preferably between about twenty-five to about thirty degrees, and in one particular aspect about twenty seven-degrees. Each ramp also has a rear face at between about eighty to about one hundred twenty-five degrees to the horizontal, more preferably between ninety and one hundred twenty degrees, and in one particular aspect about one hundred fifteen degrees.

FIGS. 25A–25E show cross-section views for a variety of ramp profiles 840–848 according to the present invention. In certain preferred embodiments ramp heights range between ¼ inch and 1½ inches and ramp widths range between about one inch and about five inches.

Figure 26:
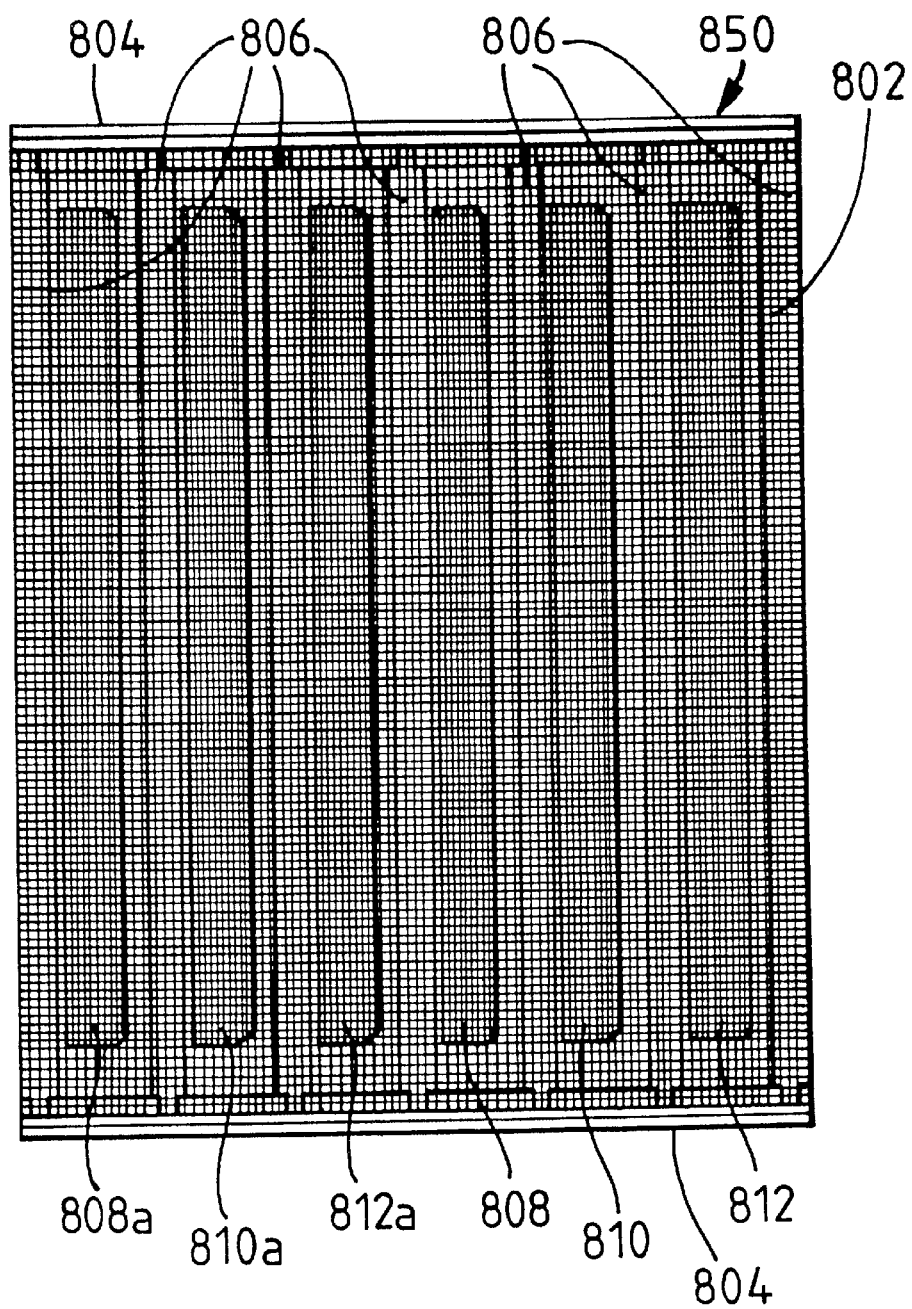
FIGS. 26–28 are top views of screens according to the present invention.

It is within the scope of this invention to provide a screen with one, two, three, four, five, six or more ramps and the ramps may be the same or different on a multi-ramp screen—and may be any ramp with any profile disclosed herein. FIG. 26 shows a screen 850 like the screen 800 (and like numerals indicate the same parts), but with an additional series of ramps 808a, 810a, 812a.

Figure 27:
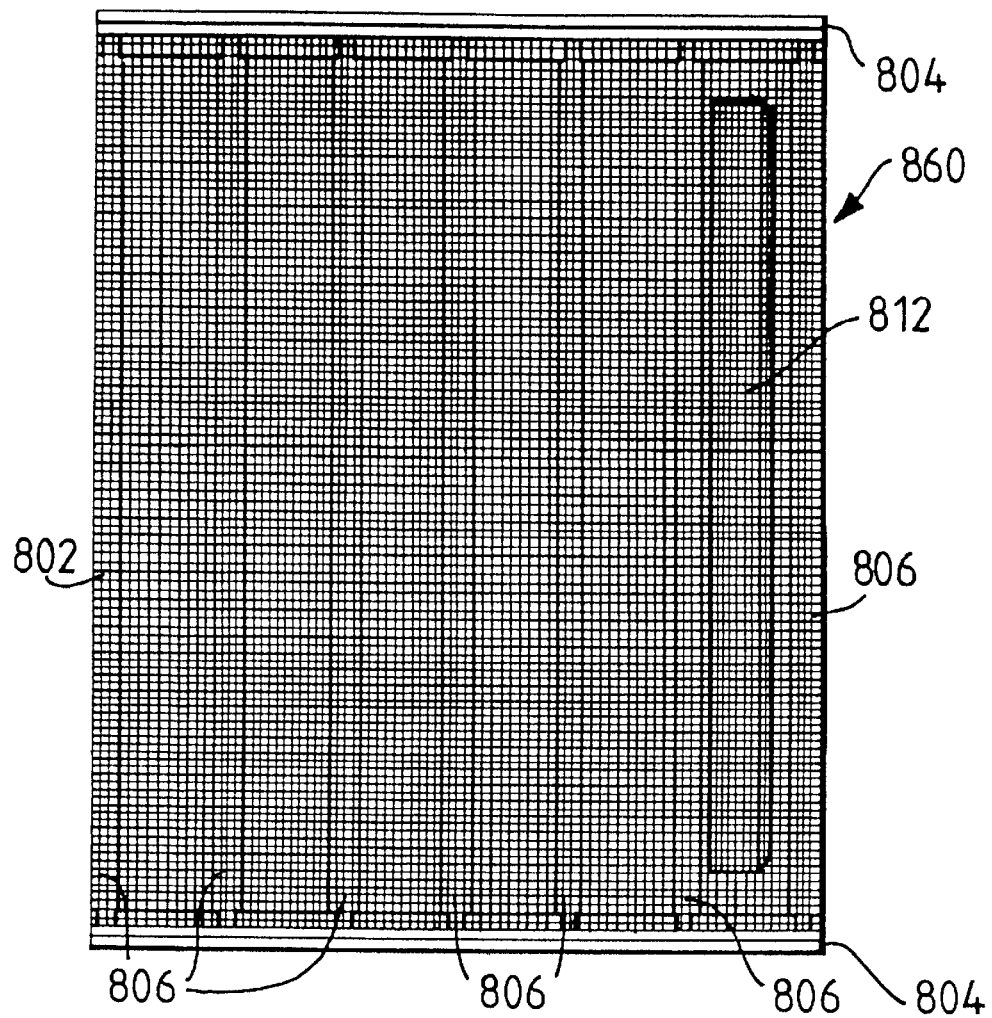

FIG. 27 shows a screen 860 like the screen 800 (and like numerals indicate the same parts), but with only one ramp 812.

Figure 28:
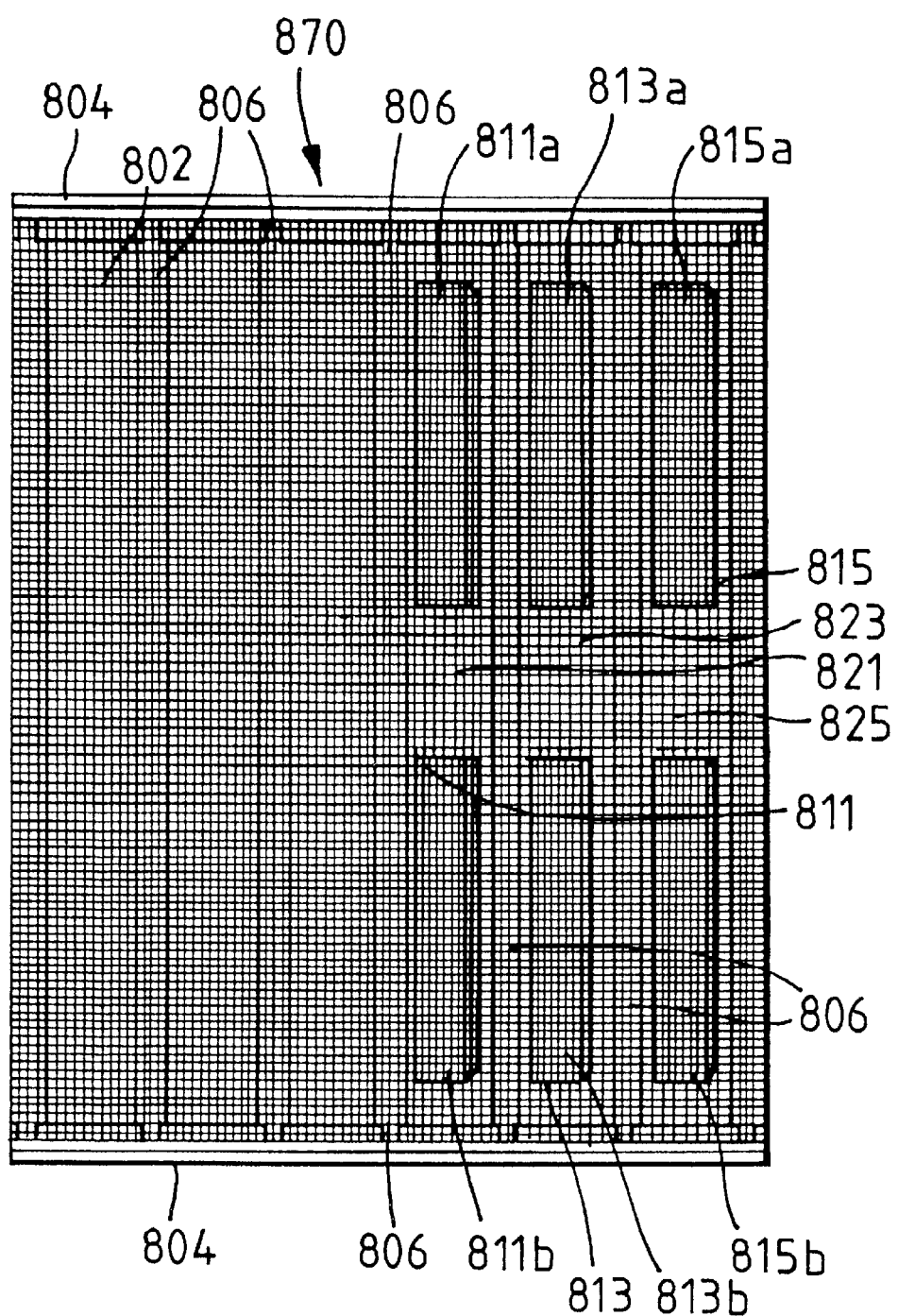

FIG. 28 shows a screen 870 like the screen 800 (and like numerals indicate the same parts), but with divided ramps 811, 813, 815 (each with ramp portions 811a, 811b; 813a, 813b; 815a, 815b, respectively) each having a flow path 821, 823, 825 between ramp portions. It is within the scope of this invention to provide: a full undivided ramp for any of the ramps 811, 813 or 815; a flow path between ramp portions of any desired width, including, but not limited to, between about three inches and about five inches; and to provide additional flow paths (one, two, or more) through the ramp portions themselves. In one aspect, ramp portions are offset to provide a more tortuous path for wet solids. Any one or two of the paths 821, 823, 825 may be deleted by providing an undivided ramp across the screen 870.

Figure 24D:
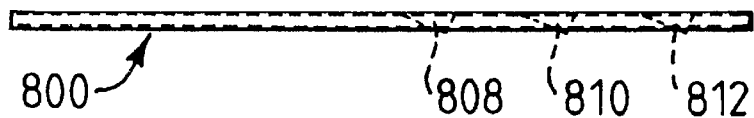
Figure 24E:
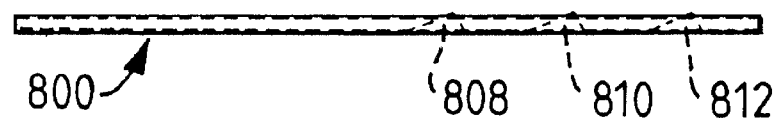
Figure 24F:
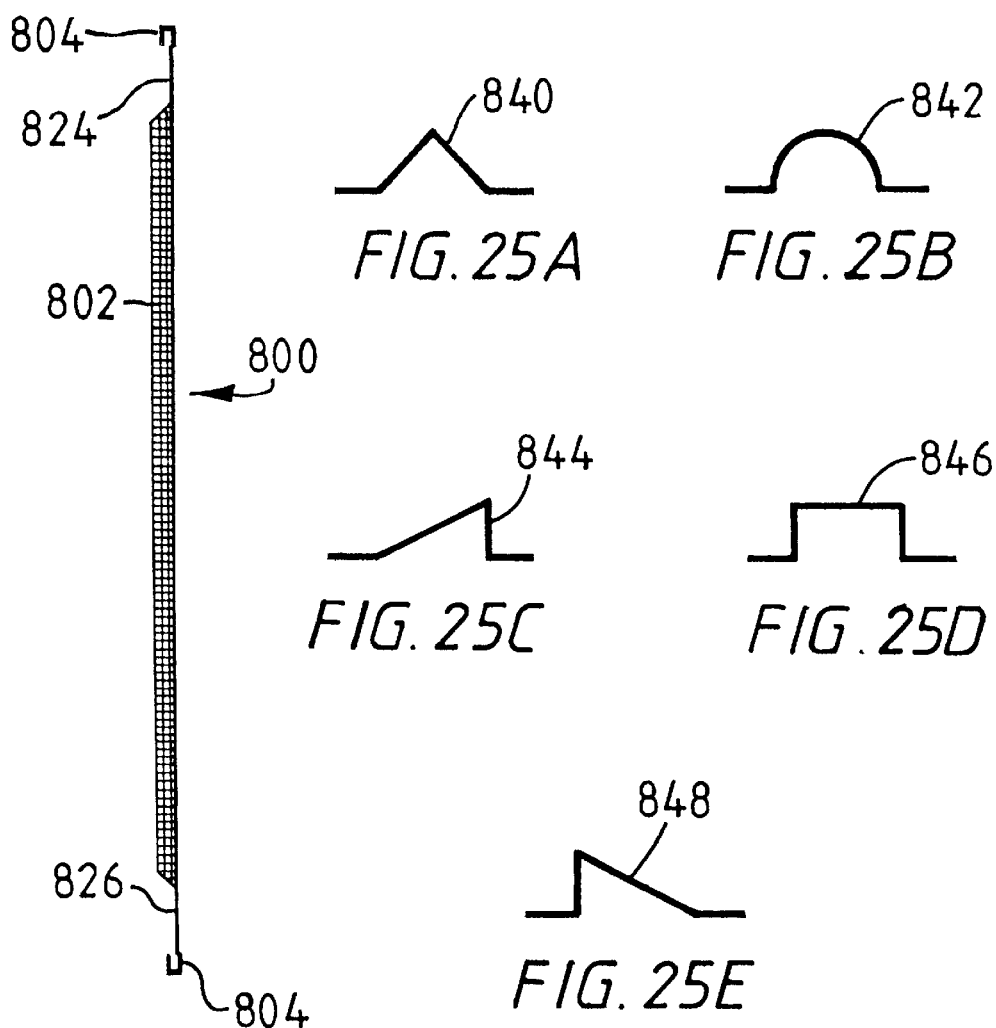
Figure 25A:
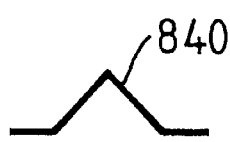
FIGS. 25A–25E are cross-section views of screen ramp portions according to the present invention.
Figure 25B:
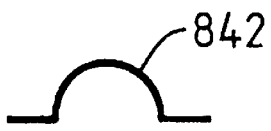
Figure 25C:
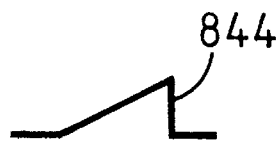
Figure 25D:
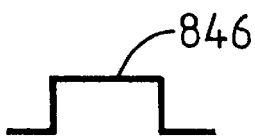
Figure 25E:
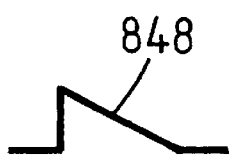

In any screen disclosed herein with one, two or three ramps on one side of the screen (as viewed from above), e.g. as in FIGS. 24D, 27 and 28, it is within the scope of this invention to provide one, two or more ramps on the other side of the screen.

Figure 29A:
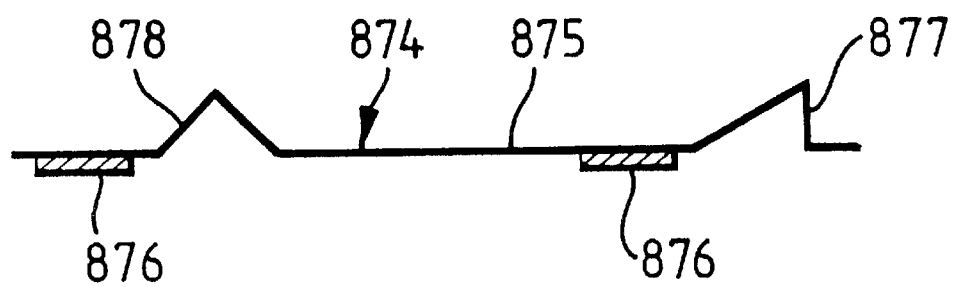
FIGS. 29A and 29B are cross-section views of screen ramp portions according to the present invention.
Figure 29B:
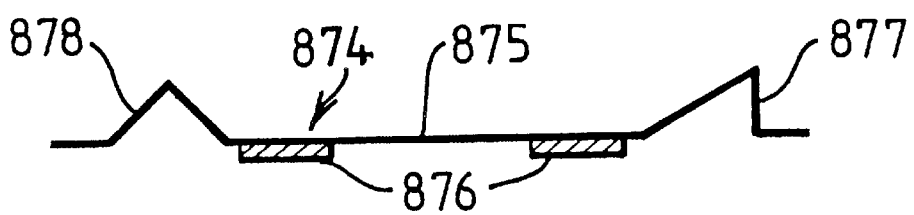

Different ramp profiles may be used on the same screen. FIG. 29A shows part of a screen 874 according to the present invention (like the screen 800) with mesh 875 and spaced-apart ramps 877, 878. Straps 876 (like the straps 806) are beneath the mesh 875. FIG. 29B shows a different location for the straps 876.

Figure 30A:
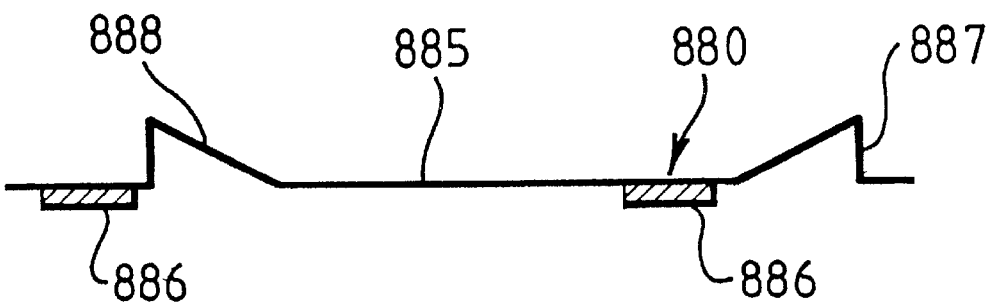
FIGS. 30A and 30B are cross-section views of screen ramp portions according to the present invention.
Figure 30B:
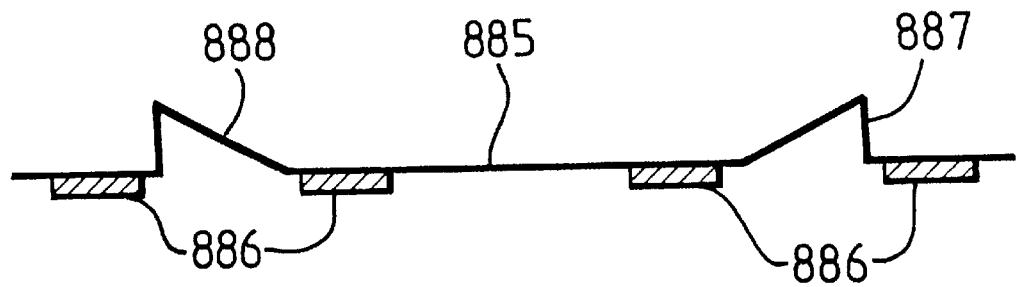

FIG. 30A shows a screen 880 according to the present invention (like the screen 800) with mesh 885 in straps 886 (like the straps 806) and ramps 887, 888. FIG. 30B shows the screen 880 with additional straps 886. The screens of FIGS. 29A–30B may have hookstrips and straps like the screens 800, 850, 860 and/or 870.

Figure 31:
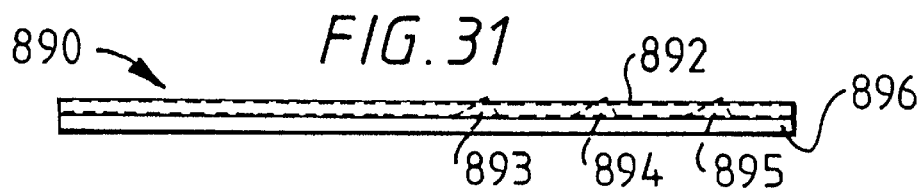
FIG. 31 is a side view of a screen according to the present invention.

Although a series of spaced-apart parallel straps is not the legal equivalent of a perforated plate, a screen as described herein (FIGS. 24D–30B) and/or any ramp or ramp portion as described herein may be used on a perforated plate and, in particular aspects, on a perforated plate of any prior art screen instead of the prior art mesh(es) and/or screen(s) used thereon, including, but not limited to, with flat and/or three-dimensional screens and/or with the plates of the screens of previous U.S. Pat. Nos. 4,575,421; 5,720,881; 5,417,858; 5,783,077; 5,417,859; 5,417,793; 5,636,749; 4,033,865; 5,221,008; 4,819,809; 4,065,382; 3,929,642; and 5,211,291. Such a screen is illustrated by the screen 890 of FIG. 31 which has mesh 892; ramps 893, 894, 895; and a perforated plate 896 (side view shown without showing perforations that do extend through the plate). It is also within the scope of this invention to use a perforated plate under a portion of the screen mesh and one or more straps under the remaining portions of the screen mesh, with one or more ramped screen portions over the perforated plate and/or over the strap(s).

Figure 32B:
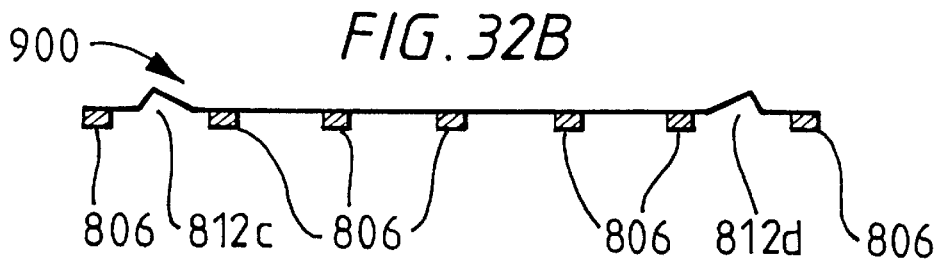
FIG. 32B is a cross-section view along line 32B—32B of FIG. 32A.
Figure 32A:
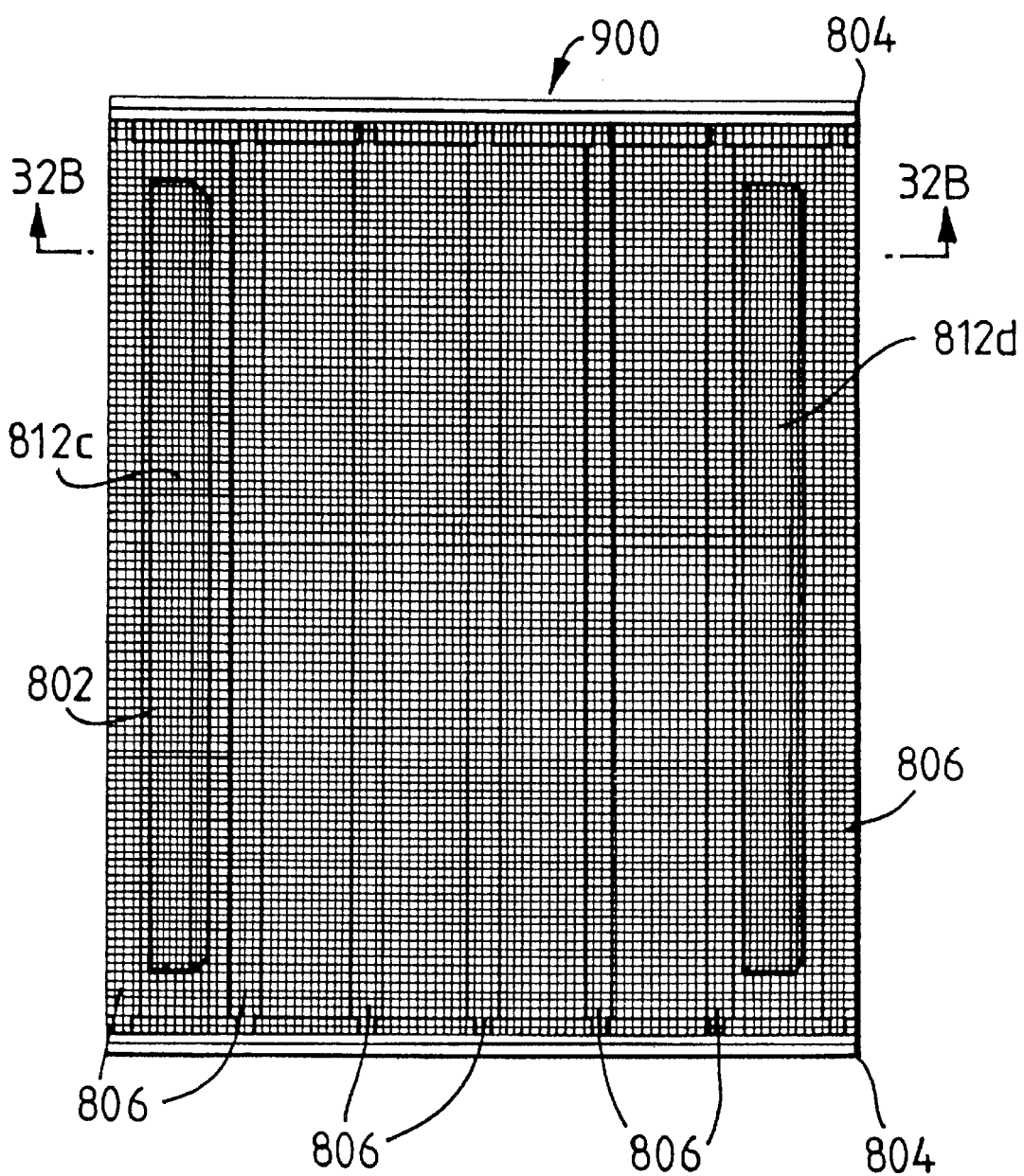
FIG. 32A is a top view of a screen according to the present invention.

FIGS. 32A and 32B show a screen 900 like the screen 860 (like numerals indicate the same parts) but with an additional ramp 812c at the side of the screen opposite the side with the ramp 812d. Such a ramp 812c may be used with the screens 800 or 870. Flow paths may be used through the ramp 812c and/or through the ramp 812d. The ramps 812c and 812d are separate pieces that are bonded to, sintered to, and/or secured to the mesh 802 and/or to a strap 806, e.g. by any structure or securement apparatus or method disclosed herein (e.g., but not limited to as in FIGS. 1A, 3D, 9–17E). Any ramp or ramp portion herein may also be so connected to a mesh, screen, plate, and/or strap and/or secured to the mesh (screen, strap, and/or plate), e.g. by any structure or securement.

Figure 33:
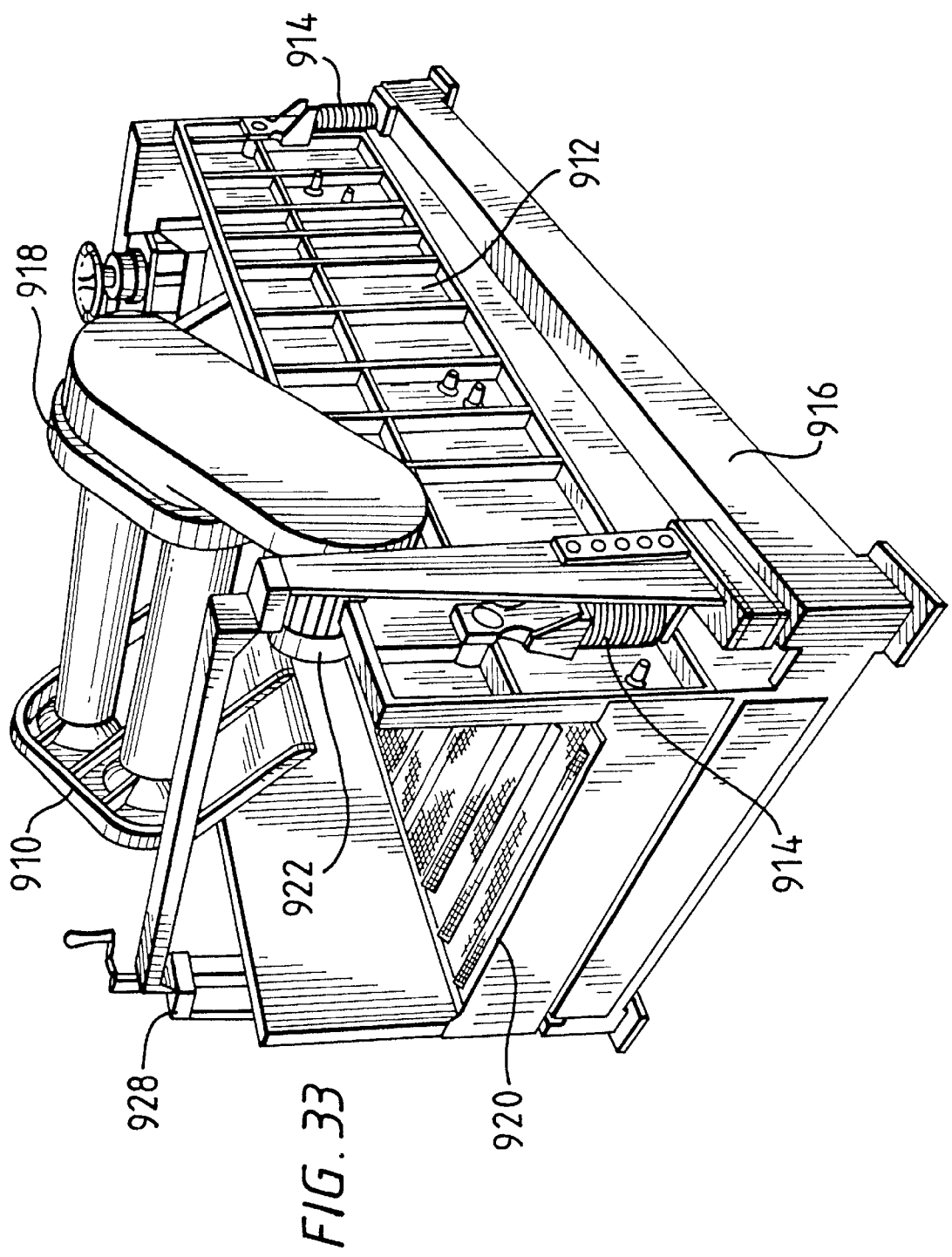
FIG. 33 is a perspective view of a system according to the present invention.

Referring now to FIG. 33, a vibratory separator system 910 according to the present invention has a screen 920 (with screen or screening cloth or mesh as desired) according to the present invention mounted on vibratable screen mounting apparatus or "basket" 912. The screen 920 may be any screen disclosed herein or have any combination of any feature or features of any screen or screen part disclosed herein; and any such screen may be used with any appropriate shaker or screening apparatus. The basket 912 is mounted on springs 914 (only two shown; two as shown are on the opposite side) which are supported from a frame 916. The basket 912 is vibrated by a motor 922 and interconnected vibrating apparatus 918 which is mounted on the basket 912 for vibrating the basket and the screens. Elevator apparatus 928 provides for raising and lowering of the basket end. The screen 920 may be any screen disclosed herein, including, but not limited, those of FIGS. 24D–32A and those in the Figures beyond FIG. 33. As shown the screen 920 is like the screen 800 of FIG. 24D. In certain aspects using a ramped screen as in FIG. 24A produces processed cuttings with an oil content of 3% or less and a water content of 20% or less when the screen is used in a multi-screen BRANDT LCM2D shaker beneath two standard DX 210 screens; and in a particular embodiment of such a screen, the oil content is less than 2% with a water content less than 15%. Any ramp disclosed herein may have a curved or undulating shape as viewed from above instead of the straight shape, e.g. as disclosed in FIG. 26. One or more ramps and/or divided ramps as described above may be used on any screen disclosed herein having one or more screens formed with an undulating shape.

Figure 35A:
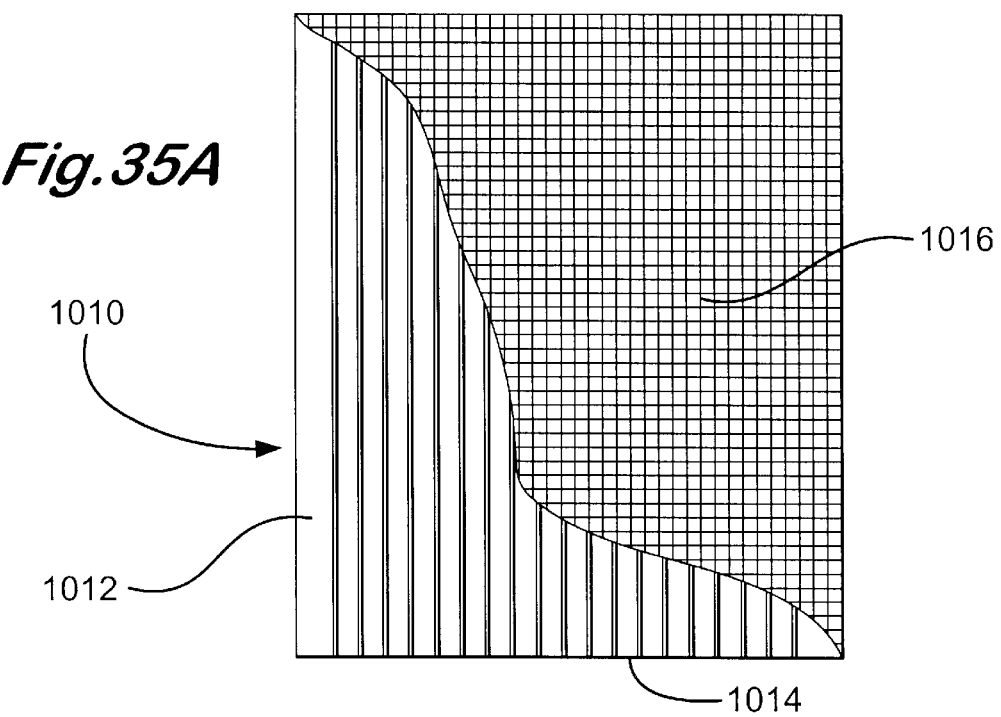
FIG. 35A is a top view partially cut-away of a screen according to the present invention.

FIG. 35A shows a screen 1010 according to the present invention with a lower base, support or frame 1012, three undulating mesh screens 1014 on and/or bonded to the frame 1012, and an upper mesh or screen 1016. The screens 1014 may themselves be bonded together, e.g. with epoxy, welding, and/or sintering. Rubber strips, plastic strips tape, cushion or cushions 1018 are positioned between the screen 1014 and the upper screen 1016. The strip(s) or cushion(s) are optional. As shown the strip(s), tape(s), or cushion(s) 1018 are secured to the screen 14 (or to crests thereof), but it is within the scope of this invention to secure them (or some of them) to the screen 1016. To effect such securement any suitable glue, epoxy, weld, and/or sintering may be employed. The frame 1012 may be any suitable known base, frame or support.

Figure 35B:
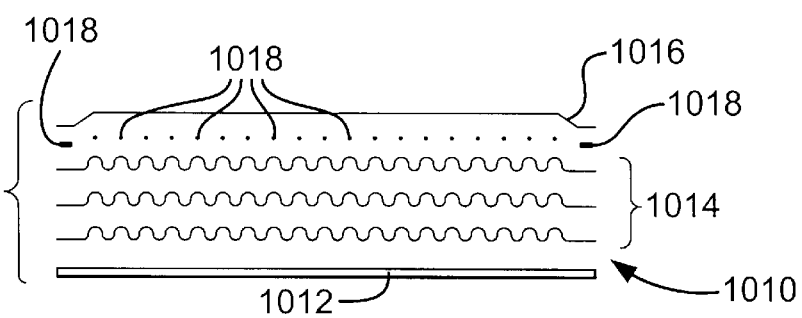
FIG. 35B is an exploded view of the screen of FIG. 35C.
Figure 35C:
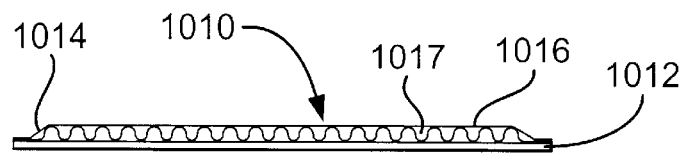
FIG. 35C is an end view of the screen of FIG. 35A.

It is within the scope of this invention for the screen 1014 to be any known screen, mesh, screens, meshes, or combination thereof, bonded together, unbonded, or bonded at only certain locations and with any known shape as viewed either from above or on end (as in FIG. 35A). It is within the scope of this invention for the upper screen 1016 to be any known screen, mesh, screens, meshes, or combination thereof, bonded together or unbonded, and with any known shape. As shown in FIG. 35B, the screen 1014 is three mesh screens bonded together with coarser mesh on the bottom, medium mesh in the middle, and finer mesh on top. The screen 1016 as shown may be a scalping screen of a mesh coarser than the finest mesh of the screen 1014 or of a multi-layer coarser mesh. In another aspect the screen 1014 is a single screen of closely woven mesh made of any suitable material, e.g. stainless steel and/or plastic material and the screen 1016 is a single screen of coarser mesh made of any suitable material (e.g. but not limited to stainless steel and/or plastic), with the screen 1014 on a metal or plastic frame or support. Alternatively or additionally, instead of the frame 1012 any known perforated plate, strip, or series of straps or strips may be used. A series of strips is not legally equivalent to a perforated plate.

In one aspect the strips 1018 are fused plastic strips aligned with peaks of the undulating fine mesh. Such strips may be made of rubber (e.g. nitrile) or plastic, e.g. polypropylene, to inhibit or prevent abrasion of the finer meshes. Such strips can be glued to the bottom of the screen 1016 and/or the screen 1014. Also the screen 1016 can be glued to the screen 1014.

Figure 35D:
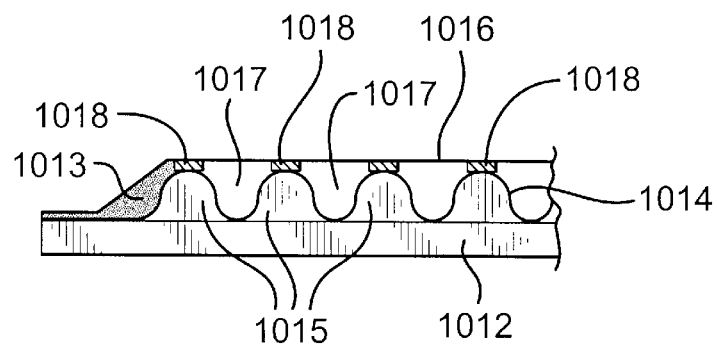
FIG. 35D is an enlargement of part of the screen of FIG. 35C.

End plugs 1013 and 1015 (FIG. 35D) sealingly close off open ends of the screen 1010. These end plugs may be made of rubber, metal, wood, plastic, Teflon™ material, or urethane. The plugs 1013 extend along two sides of the screen along crests of the screening material to completely seal the sides. The plugs are held in place by friction fit, glue, epoxy, welding and/or sintering. Alternatively, the ends may be covered with screen material.

Fluid flow on the screen 1010 from either end may be from top-to-bottom as viewed in FIG. 35A, bottom-to-top, or from one side to the other.

In one aspect the screen 1016 is a scalping screen of woven steel mesh. In another aspect, it is woven plastic or synthetic or composite mesh; and in another aspect it is a combination of woven steel and woven plastic or synthetic or composite mesh. The screen 1016 may be the same mesh or coarser mesh than that of the screen 1014 or of any layer thereof.

In this embodiment the areas 1017 between the screen 1016 and the screen 1014 are open. The screen 1016 protects the mesh of the screen 1014 from abrasive particles. When the screen 1016 is of a coarser mesh than that of the screen 1014, relatively larger particles retained on the screen 1016 are prevented from damaging and/or hindering flow through the screen 1014.

With the screen 1010 as shown liquid flow through the screen is increased by reducing the thickness of the solids bed of the finer mesh screens by the separation of larger particles with the screen 1016.

Use of the upper screen 1016 increases stability and rigidity of the screen 1010, improving solids conveyance across and off, rather than through the screen 1016 thereby facilitating liquid flow through the screen. Solids that do not flow through the screen 1016 do not encounter the lower finer mesh screens and do not reduce flow through the finer mesh screens. Use of the upper screen 1016 also reduces the initial impact load of flow onto the screen 1014 at a feed entrance to the screen, thereby extending screen life.

Figure 36:
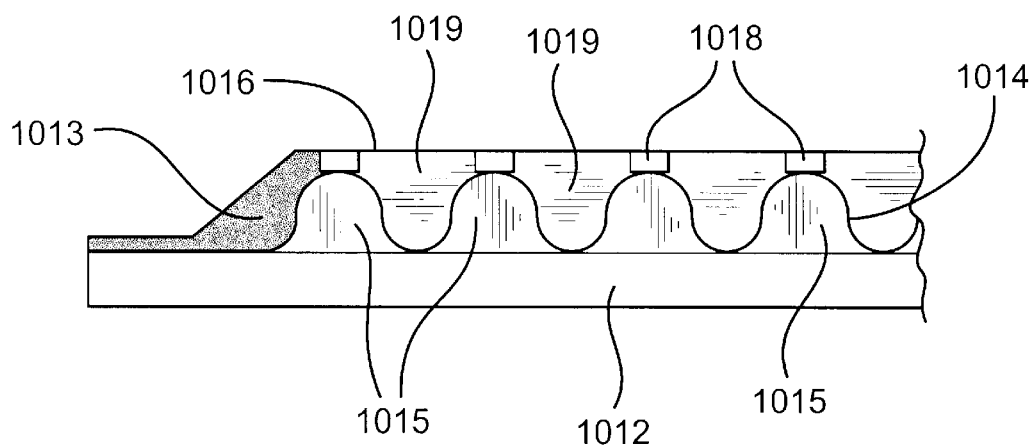
FIG. 36 is an end view in cross section of an alternative embodiment of the screen of FIG. 35A.

FIG. 36 shows an alternative embodiment of the screen 1010 with identical parts (indicated by the same numerals) but with additional end plugs 1019 between the upper screen 1016 and the screen 1014. Such "double plugging" may be used on either or both screen ends. A fluid and/or particles introduced to the screen 1010 first encounters the screen 1016 and then material flowing through the screen 1016 flows to the screen 1014. The plugs 1019 may be made of the materials described for the plugs 1013, 1015 and the plugs 1019 may be similarly installed and/or secured in place. Any of the plugs 1013, 1015, 1019 may be deleted in certain embodiments.

Figure 37:
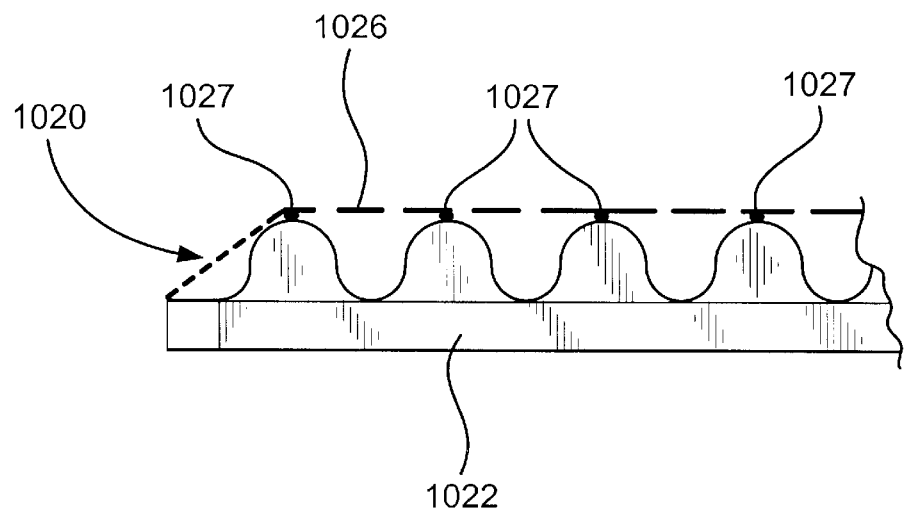
FIG. 37 is an end view of a screen according to the present invention.

FIG. 37 shows a screen 1020 like the screen 1010, but without the cushion members 1018. A scalping screen 1026 is secured at points 1027 to a screen 1024 on a base, frame, or support 1022. The screens 1024, 1026 may be in any of the forms discussed above for the screens 1014, 1016, respectively and the base, frame, or support 1022 may have any of the forms or alternatives discussed above for the base, frame, or support 1012. The screen 1026 may be secured to the screen 1024 in any suitable way, including but not limited to with glue, epoxy, fused plastic and/or by welding and/or sintering.

Figure 38A:
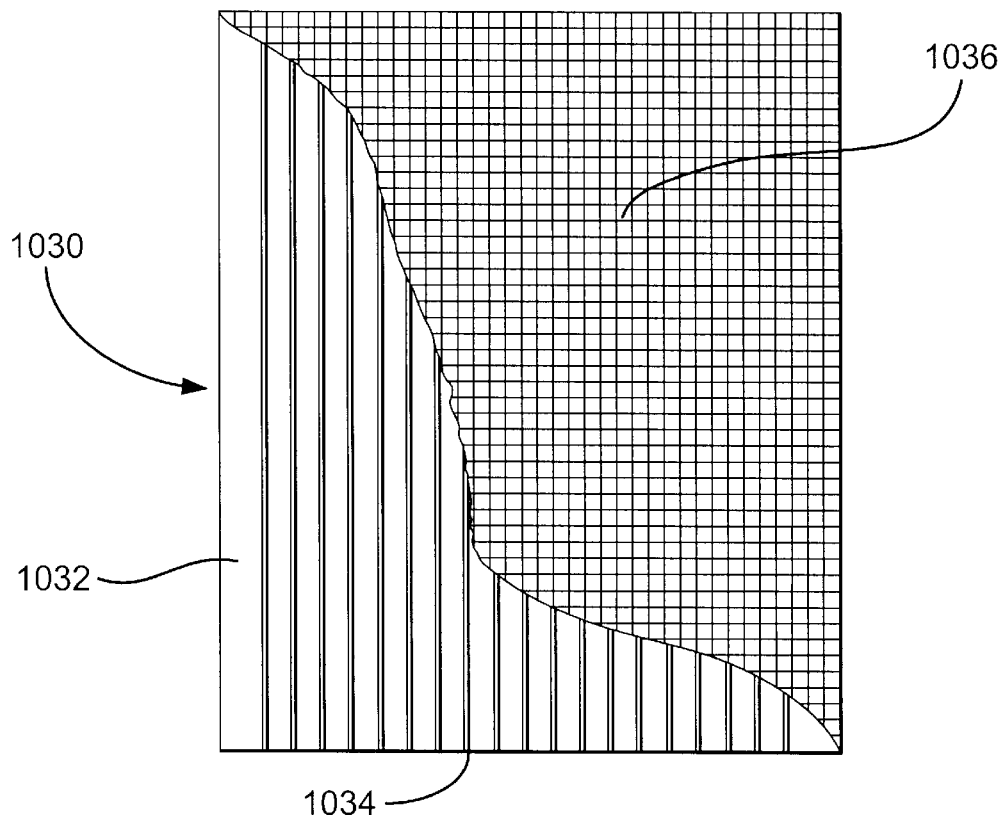
FIG. 38A is a top view of a screen according to the present invention.
Figure 38B:
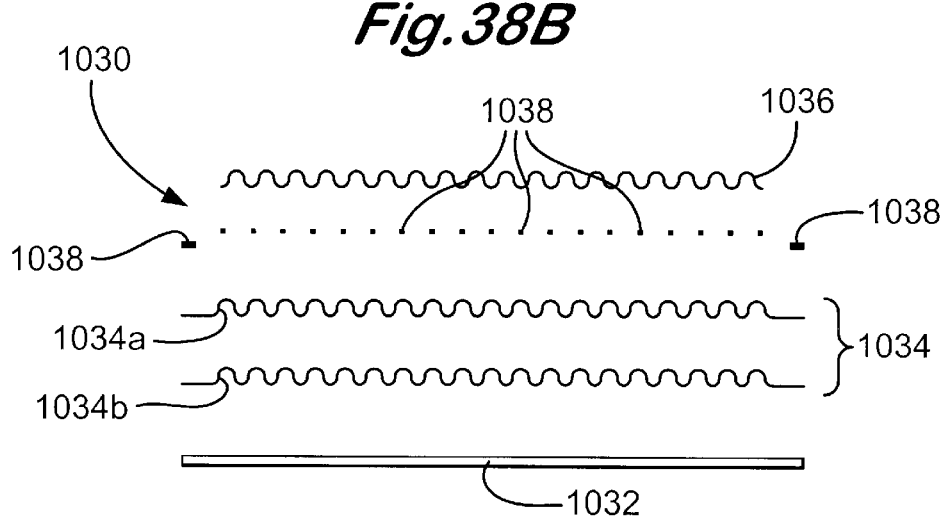
FIG. 38B is an exploded view and FIG. 38C is an end view of the screen of FIG. 38A.

FIG. 38A shows a screen 1030 with a base, frame, or support 1032 on which is a screen 1034 to which is secured a corrugated upper screen 1036 with optional items 1038 (like the tape, cushion, strips 1018, above). In one aspect the screens 1034 and 1036 are of different mesh; in one aspect with coarser mesh in the screen 1036; and in another aspect the two screens are of a similar mesh. The screens 1034, 1036 may be like the screens 1014, 1016 and 1024, 1026 respectively with respect to mesh size and materials. The base, frame, or support 1032 may be like the items 1012, 1022 and their alternatives described above. As shown the screen 1034 includes a fine mesh screen 1034a on top of a coarser mesh screen 1034b. A third screen (not shown) of medium mesh (e.g. as in FIG. 35B) may be used. If used, the upper screen 1036 may be secured to or simply rest on the items 1038 and the lower screen 1034 may be secured to or simply rest beneath the items 1038. It is to be understood that the items 1038 represent any of the strip(s), tape, etc. described above regarding the items 1018.

Figure 38C:
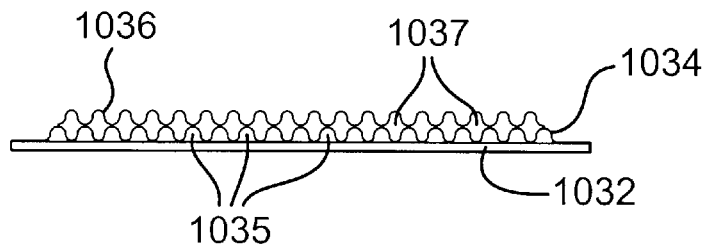
Figure 38D:
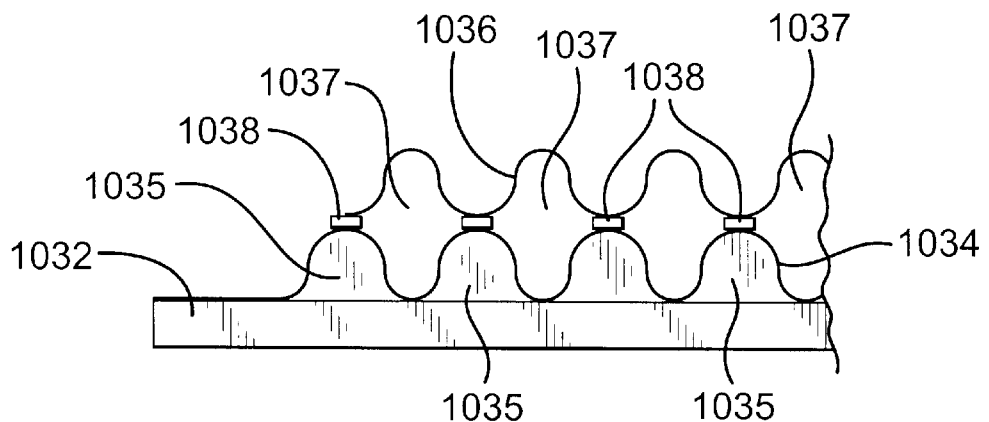
FIG. 38D is an enlargement of a portion of the screen shown in FIG. 38C.

End plugs 1035 (FIGS. 38C, 38D) sealingly shut off the end openings beneath corrugations of the screen 1034. Open areas 1037 extend between the screens 1034, 1036. Fluid flow on the screen 1030 may be top-to-bottom as viewed in FIG. 38A, bottom-to-top, or from one side to another.

Figure 38E:
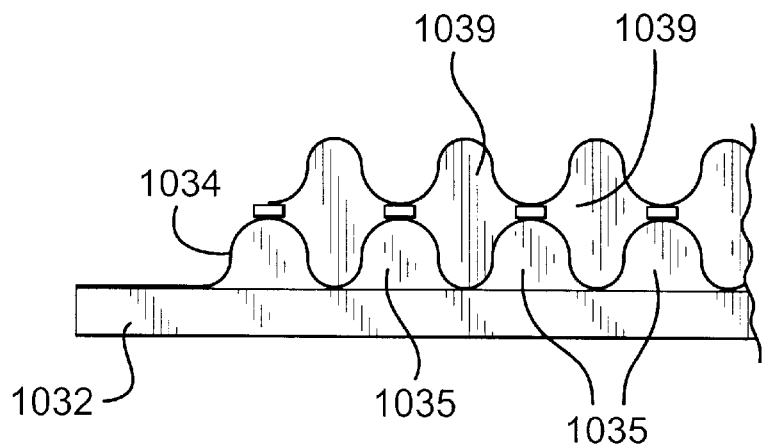
FIG. 38E is an end view that shows an alternative structure for the screen of FIG. 38A.

FIG. 38E shows an alternative embodiment of the screen 1030 with plugs 1039 sealingly closing off the ends of the areas 1037 to fluid flow. The plugs 1035, 1039 may be like, and installed as, any of the plugs described above.

The screens in FIGS. 35A–38E have the advantages of an upper screen as described for the screen 1010.

Figure 34A:
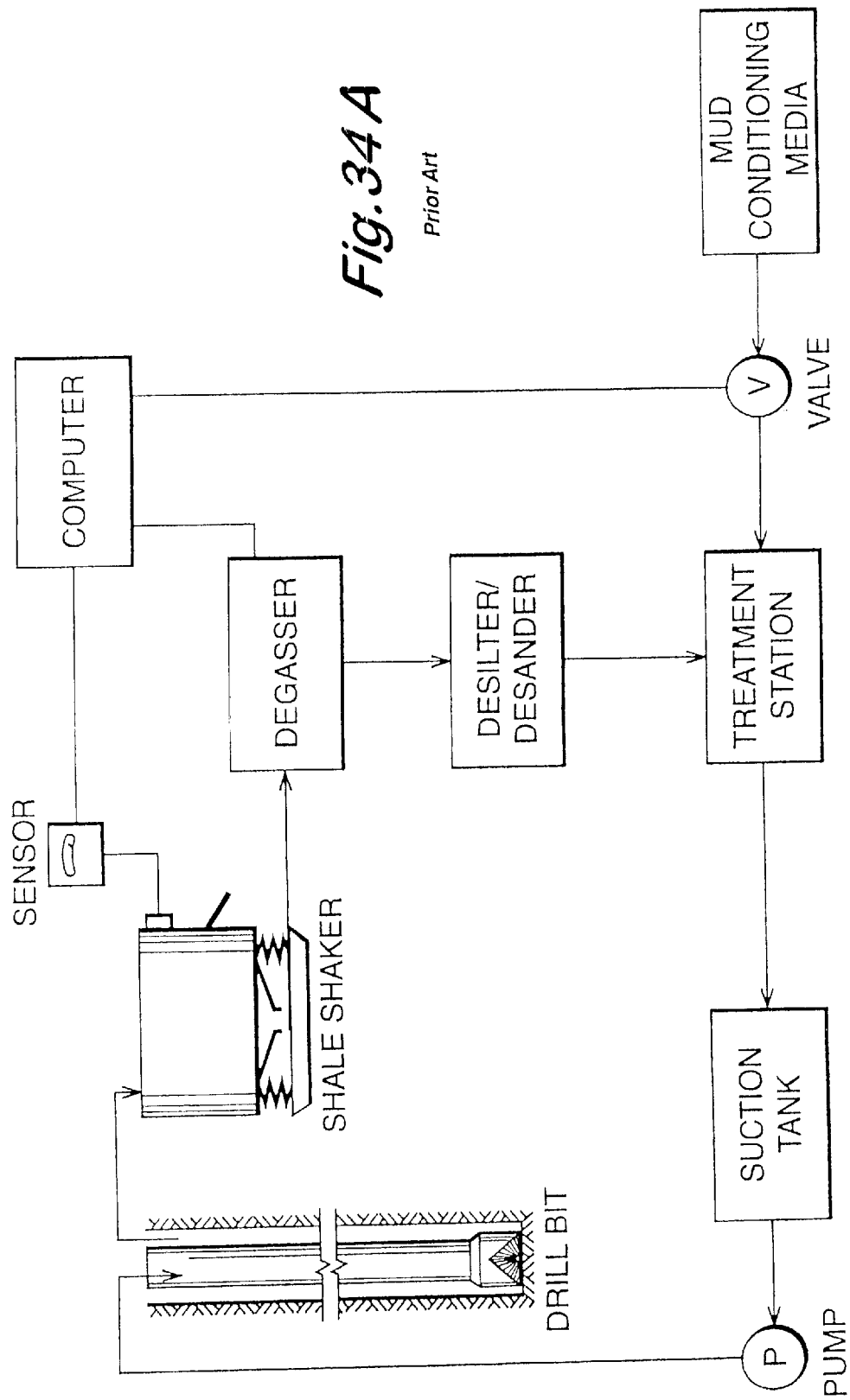
FIG. 34A is a schematic view of a prior art system.

FIG. 34B shows a system 1000 according to the present invention with parts like those of the system of FIG. 34A; but with a shale shaker K having a screen or screens S according to the present invention (any screen or screens disclosed herein). The screen(s) S are mounted in a typical shaker basket B and one or more vibrators V (any known suitable shaker vibrator) vibrate the basket B and hence the screen(s) S.

Figure 39A:
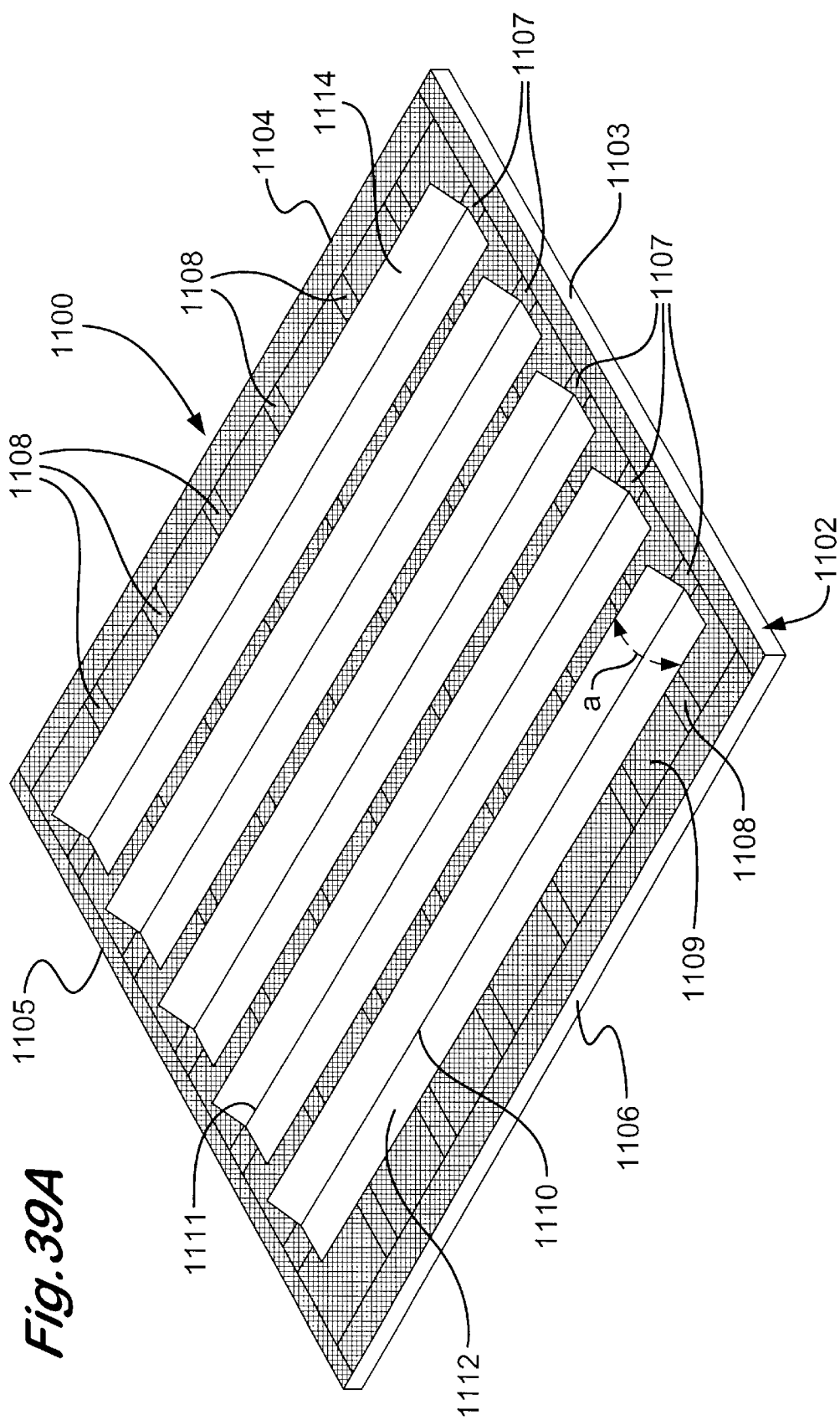

FIG. 39A shows a screen assembly 1100 according to the present invention which has a tubular frame 1102 with interconnected outer frame members 1103, 1104, 1105, 1106 and crossbars 1107, 1108 each with two spaced-apart ends connected to an outer frame member.

Screening material 1109 is located over the crossbars and attached to the outer frame members (and, in certain aspects to the crossbars) by any suitable known method, connectors, glue, welding, etc. The screening material 1109 may be any known screen and/or mesh; in any combination of one, two, three or more layers; connected, fused, glued, and/or sintered together in any known way either substantially over the entire surface of screening material or only in portions thereof.

Connected on top of the screening material 1109 are a plurality of spaced-apart ramps 1110 each with a base 1112 and a portion 1114 projecting up from the screening material 1109. AS shown there is an obtuse angle a between each ramp's base 1112 and projecting portion 1114. The angle a may be any desired angle from zero to one hundred eighty degrees (i.e., acute, right, obtuse or straight angle). In certain aspects the base portion of one, some or all of the ramps may be deleted, and the projecting portions alone are connected to the screening material. The ramps (and any other screen component disclosed herein for connection to a screen assembly) (the bases and/or the projecting portions) may be connected to the screening material with any suitable connector or method, including, but not limited to, with screws, rivets, welding, gluing, releasable cooperating hook-loop fastener material, solder, adhesive, tape (single or double-sided), and/or sintering.

As shown in FIG. 39A a line 1111 defining a boundary between each ramp base and projecting portion is located above a crossbar 1107 and portions of each base are over parts of the crossbars 1108. It is within the scope of this invention for these ramp base portions to also be connected to these cross bar portions as well as to the screening material; alternatively, there is no such connection, connection only to the crossbars 1107, or connection only to the crossbars 1108 (as can be the case for any screen assembly according to the present invention).

Figure 39B:
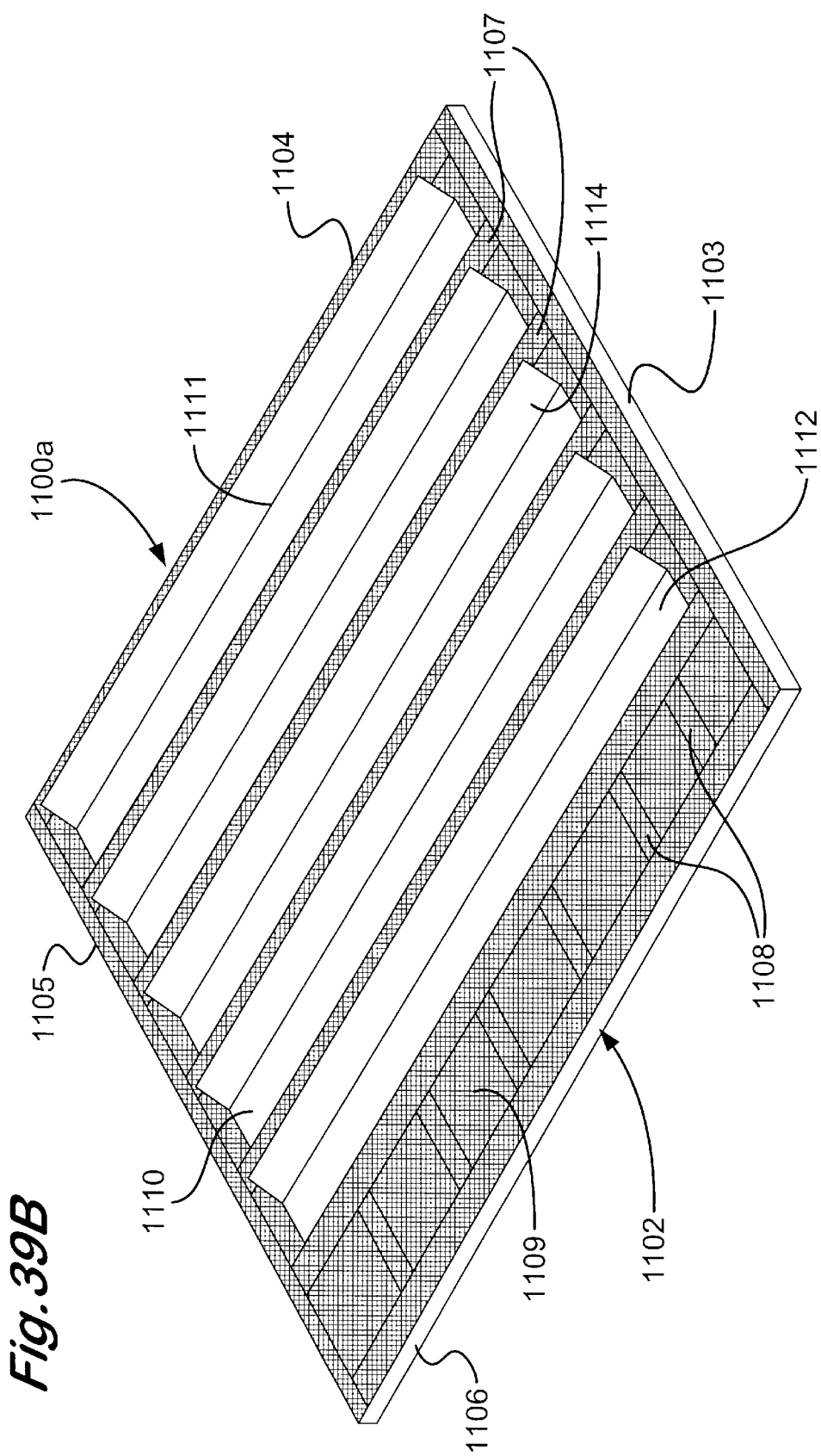

FIG. 39B shows another version of the screen assembly 1100 designated 1100a with like numerals indicating like parts. In the screen assembly 1100a, the ramp bases 1112 are positioned above the crossbars 1107 with the lines 1111 located between crossbars, i.e., not over a crossbar. Alternatively, it is within the scope of this invention to place one or some of the ramps as in FIG. 39A and one or some of the ramps as in FIG. 39B. Also as shown the ramps are generally parallel to the crossbars 1107 and the outer frame members 1104, 1106; but it is within the scope of this invention for the ramps to be at an angle to these items and, in one aspect for different ramps to be at different angles, e.g., but not limited to, a plurality of spaced-apart ramps with every other ramp at one angle and the ramps between them at a different angle—which in one aspect includes ramps with an acute angle between adjacent ramp ends.

FIG. 40A shows a screen assembly 1120 according to the present invention which has two spaced-apart hook strips 1122 between which and to which are connected a plurality of spaced-apart support strips 1124 (which may be as in disclosed herein or as any disclosed in any parent application or patent listed herein) on which is mounted screening material 1129 (like the screening material (1109 or as any disclosed herein) and may include a diamond-patterned layer 1128 (e.g. of metal, glue, plastic, adhesive, rubber, or epoxy). A plurality of ramps 1123, like the ramps 1110 above, are connected to the screening material 1129. A line 1125 defining a boundary between a base 1121 and a projecting portion 1127 of each ramp is located above a strip 1124; but it is within the scope of this invention, as with the screen assembly of FIG. 39A, to locate this line as desired. The hook strips 1122 may be of any known shape and/or configuration for hooking apparatus for shale shakers and vibratory separators (including but not limited to any known side channels, hooks, or strips for mounting a screen to a shale shaker).

FIG. 41A discloses a plurality (1131–1135) of various ramps according to the present invention useful with any screen assembly according to the present invention and which may be used instead of any ramp shown on any screen assembly herein; alternatively, a combination of any of these ramps on a single screen assembly may be used according to the present invention.

FIG. 41B shows end views of the ramps of FIG. 41A. Certain of the ramps according to the present invention have an enclosed area and, therefore, an end which, according to the present invention, may be open or closed (e.g. as in ramps 1131, 1133, 1134, 1134). It is within the scope of this invention to leave these ramp ends open; partially open (e.g. top, bottom, one side or the other side closed off); or closed off either with solid material or with screen or mesh (as shown in the ramps 1131 and 1133 closed off, respectively with screening material 1136, 1138). Screening material used to close off or partially close off a ramp end may be any screening material disclosed herein and the ramp ends thus closed-off may be flat (i.e. perpendicular to the surface of the screen assembly) or non-flat, e.g. as disclosed in U.S. application Ser. No. 09/634,610 filed Aug. 5, 2000, incorporated fully herein for all purposes. The ramps 1131, 1133, 1134, 1135 each has a base 1141, 1143, 1144, 1145, respectively, with portions on either side of a projecting ramp portion 1151, 1153, 1154, 1155, respectively. Suitable connection of these base portions on either or both sides of the projecting portions may be made to screening material of a screen assembly according to the present invention. It is also within the scope of the present invention to fold either or both base portions either under or over prior to attaching the ramps to a screen assembly.

Figure 42A:
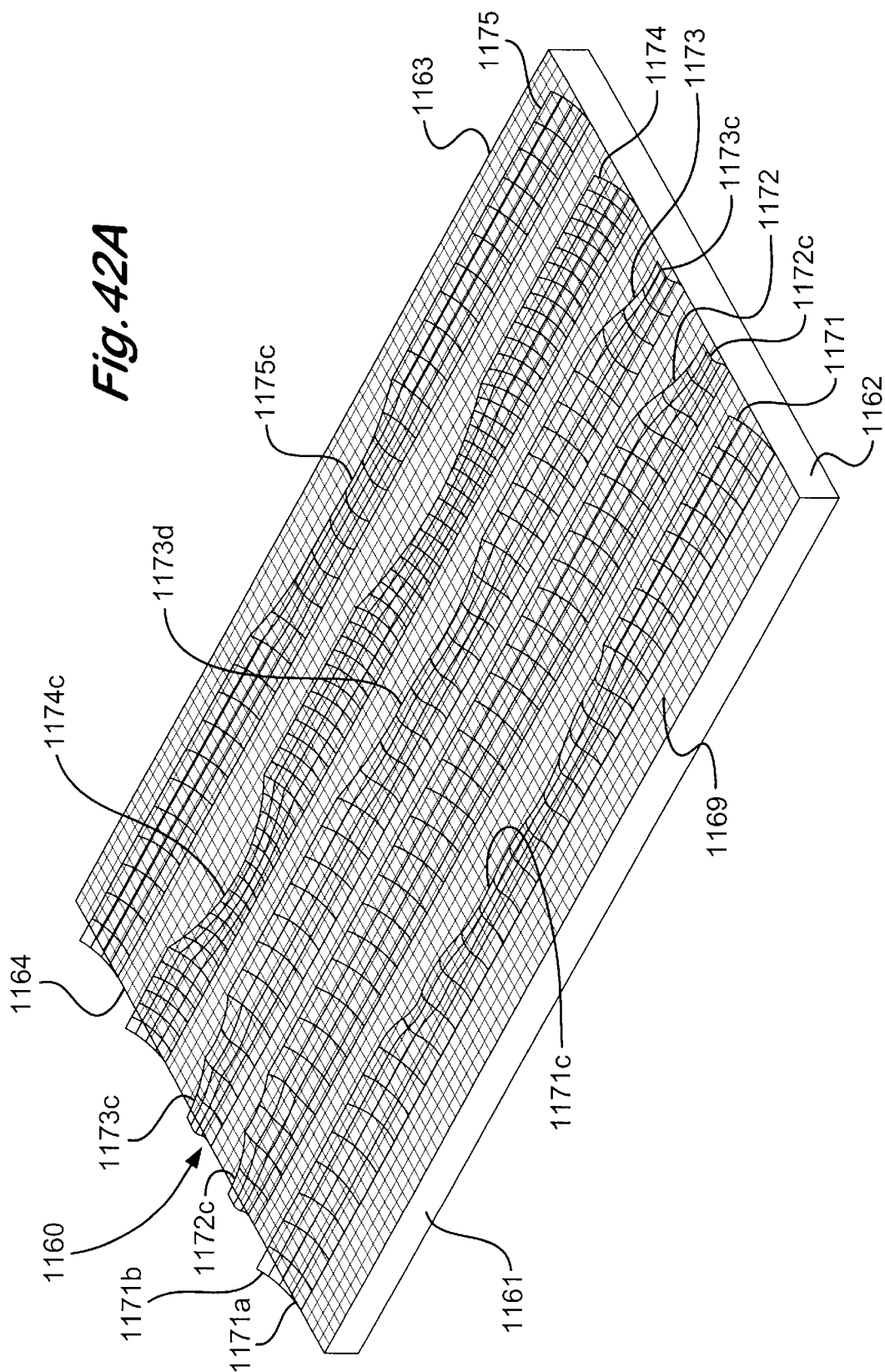
FIG. 42A is a perspective view of a variety of components according to the present invention for screen assemblies according to the present invention.

FIG. 42A shows a screen assembly 1160 according to the present invention that has an outer frame with interconnected frame members 1161, 1162, 1163, 1164 (however it is within the scope of this invention for the ramps of the screen 1160 to be used on a screen like that in FIG. 40 that has hookstrip sides). Ramps 1171–1175 are connected to screening material 1169.

In one aspect the ramps 1171–1175 are made of mesh or screen or a combination thereof that can be folded down or pushed down and remains in the "down" position, i.e., it has memory. As indicated any desired part of a ramp may be positioned lower than the other parts.

Ramp 1171 has a base 1171a, a projecting portion 1171b, and a portion 1171c that has been pushed down. FIG. 42A shows an end view of the ramp 1171 and FIG. 42B shows a cross-section view of the lower portion 1171C. Ramp 1172 has lower, pushed down portions 1172c; ramp 1173 has lower, pushed down portions 1173c and 1173d; ramp 1174 has lower pushed down portions 1174c; and ramp 1175 has lower pushed down portions 1175c. Alternatively, the ramps 1171–1175 are preformed of suitable material which has no memory (does not retain a shape, position, or configuration into which it is pressed, pushed, or moved), e.g. metal, rubber, or solid plastic (with or without fluid-passing perforations across its surface). All of the ramps of a particular screen assembly according to the present invention may be like any one of the ramps 1171–1175; or any combination of such ramps may be used according to the present invention. It is also within the scope of this invention to make different parts of a ramp out of different screening material. For example, in the ramp 1171 the base 1171a and part 1171b may be made from screening material of a mesh size similar to that of the screening material 1169 and the portion 1171c may be made of a much finer mesh that lays down (rather than a mesh with memory that needs to be pushed or folded down). Upper or projecting portions of the ramps (e.g. portions 1171b, 1127, 1114) may be made of non-memory material that is so non-rigid that it moves up and down or flaps uncontrollably as the screen assembly is vibrated (e.g. a shale shaker processing fluid with drilling mud and drill cuttings or other solids entrained therein). Any projecting portion or upper portion of a screen or ramp disclosed herein may be made of multiple layers, e.g. a non-memory movable layer with a one, two, or more lower and/or upper layer(s) of metal or of synthetic material, perforated or not, to inhibit or prevent up/down or uncontrollable flapping and/or to inhibit or prevent wear of and damage to such a non-memory layer. Optionally, different parts of a single projecting portion may have one or more of these reinforced areas along the length of the projecting portion. In one aspect a coarse mesh is used beneath a projecting portion and a fine mesh is used on top so that fine solids or particles separated from a fluid more easily climb up the projecting portion. Alternatively, a reinforcing material (mesh, screen, solid) may be used around the top, bottom, and/or side edges of a projecting portion to strengthen the projecting portion. Also, an upstanding ramp portion or a front ramp portion may be made of a very coarse mesh, e.g. 19 mesh, for strength and stability.

FIGS. 42D and 42E illustrate other possible ramp end profiles for ramps 1176, 1177 and relative sizes for base and projecting portions which may be used for any ramp herein. Also any number (e.g. one, two, three, four, five, six, or more) of any ramp 1171–1175 may be used on any screen.

Figure 43:
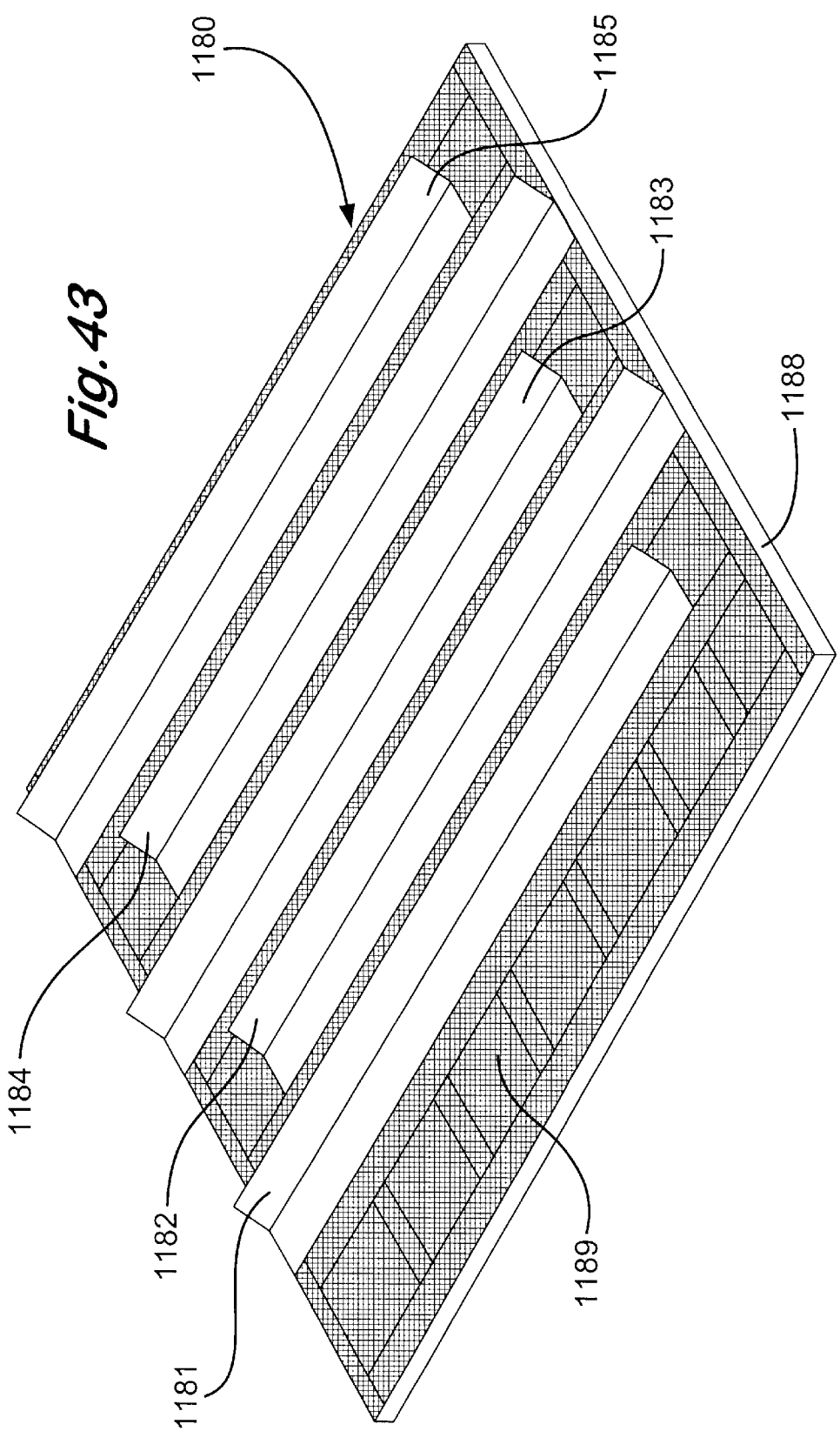
FIG. 43 is a perspective views of screen assemblies according to the present invention.

FIG. 43 shows a screen assembly 1180 according to the present invention which has an outer frame 1182 (like the frame of the screen 1160) with crossbars and screening material 1189 like that of the screen 1160. Ramps 1181–1185 represent any ramp according to the present invention. As shown, the ramps are offset from each other, as may be any two ramps of any screen assembly according to the present invention and any number (e.g. one, two, three, four, five, six, or more) of any ramp may be used. Also any portion of any ramp may be deleted providing a flow path through that ramp at that area. In one particular embodiment central portions e.g. between one and fourteen inches wide, are deleted from alternating ramps, beginning with ramp 1181 or with ramp 1182.

Figure 44A:
FIGS. 44A, 45A, 46A and 47A present a side view of a piece of material, screen or mesh which is formed into the screen components shown, respectively in FIGS. 44B, 45B, 46B, 47B and 47C.
Figure 44B:

FIG. 44A shows a piece of screening material 1190 which may be any screening material or combination thereof disclosed herein. As shown in FIG. 44B, the screening material 1190 has been formed or folded to form upwardly-projecting portions 1191 and 1192 that can serve as ramps for any screen assembly according to the present invention with one or more such ramps. As shown the lower ends of the upwardly projecting portions are open; but it is within the scope of the present invention to close off these ends (or the ends of any ramp disclosed herein) with solids material or with material such as screen or mesh that permits fluid flow therethrough.

Figure 45A:
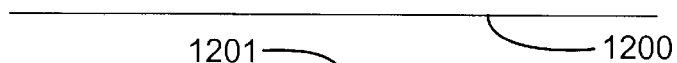
Figure 45B:

FIG. 45A shows a piece of screening material 1200 which may be any screening material disclosed herein. As shown in FIG. 45B the screening material 1200 has been formed or folded to make a ramp 1201 with an inclined portion 1202 and a wall portion 1203. The area under the ramp may be open or closed off (with solids or with fluid-passing material).

Figure 46A:
Figure 46B:
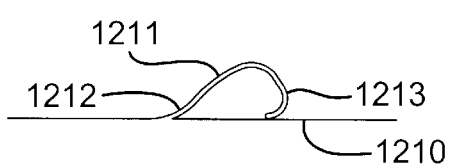

FIG. 46A shows a piece of screening material 1210 which may be any screening material disclosed herein. As shown in FIG. 46B the screening material 1210 has been formed or folded to make a ramp 1211 with an inclined portion 1212 and a front portion 1213. The open area under the inclined portion may be open or closed off (with solids or with fluid-passing material). The front portion 1213 is shown as contacting the screening material 1210. It is within the scope of this invention to also connect the front portion 1213 to the screening material 1210 either all along the length of a ramp with such a profile or at spaced-apart points along the length.

Figure 47A:
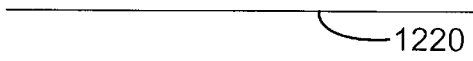
Figure 47B:
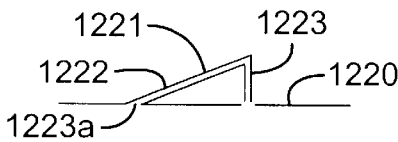
Figure 47C:
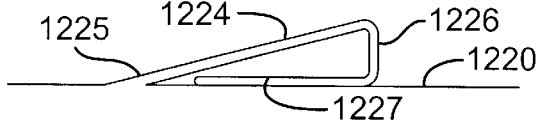

FIG. 47A shows a piece of screening material 1220 which may be any screening material disclosed herein. As shown in FIG. 47B the screening material 1220 has been formed or folded to make a ramp 1221 with an inclined portion 1222 and a front portion 1223. The open area (1223a) under the inclined portion may be open or closed off (with solids or with fluid-passing material). The front portion 1223 is shown as contacting the screening material 1220. It is within the scope of this invention to also connect the front portion 1223 to the screening material 1220 either all along the length of a ramp with such a profile or at spaced-apart points along the length. FIG. 47C shows another ramp 1224 made (formed or folded) with the screening material 1220. The ramp 1224 has an inclined portion 1225, a front portion 1226 and a lower portion 1227. The front portion 1226 may be connected to the screening material at points or all along its length, as may be the lower portion 1227. Also the end of the lower portion 1227 may touch or be connected to the inclined portion 1225. Alternatively, the portion 1227 may extend out in front of the ramp rather than beneath the portion 1224.

Figure 48A:
FIG. 48A is a side view of a screen component according to the present invention.
Figure 48B:
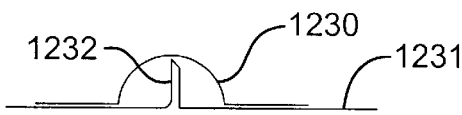
FIG. 48B shows the component of FIG. 48A on a screen according to the present invention.

FIG. 48A shows an end profile of a ramp 1230 according to the present invention, e.g. like the ramp 1135 above, FIG. 41A. FIG. 48B shows the ramp 1230 in place connected to screening material 1231 which has an upwardly projecting portion 1232 (formed or folded into the screening material). The ramp 1230 may be connected to the portion 1232. Any ramp according to the present invention with a raised portion may be so-positioned above any screening material disclosed herein with an upwardly-projecting portion.

Figure 49:
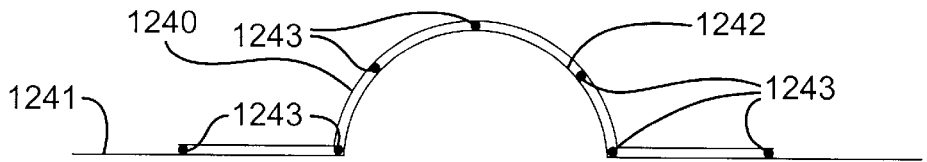

FIG. 49 shows a ramp 1240 (end view or cross-section) according to the present invention (like the ramp 1230) connected to screening material (any disclosed herein or any combination thereof) 1241 with welds, connectors or glue 1243 (any one of which or all but one may be deleted). An upwardly-projecting portion 1242 of the screening material 1241 has been formed or folded to correspond in shape to the projecting portion of the ramp 1240. For any shape ramp according to the present invention screening material can be formed or shaped to correspond in shape to a ramp shape for positioning of and/or connection of a ramp to screening material. Any ramp described herein as made or formed of screening material may be made or formed of one, two, three or more layers of screening material and/or mesh.

FIG. 50A shows a screen 1250 according to the present invention with screening material 1251 (any disclosed herein or any combination thereof) with spaced-apart ramps 1252 connected to the screening material (which may be any ramp herein including, but not limited to, any ramp herein that is a separate piece connected to screening material or any ramp folded from screening material). A mass of solids 1253 (e.g. solids separated from drilling mud flowing across the screen 1250 in a shale shaker) is moving over the screen 1250. As shown in FIG. 50B, the ramps 1252 are configured, sized, and made of such material that the mass of solids 1253 moves the ramps downwardly as it passes over them, facilitating movement of the mass of solids across the screen. As shown in FIG. 50C the ramp that was moved down by the mass of solids has moved or sprung back to its initial position. In certain prior art machines, a relatively large mass or conglomeration of separated solids might not be able to climb or be moved over an upwardly projecting portion or ramp of a screen.

FIG. 51A shows a screen 1260 according to the present invention which has a frame 1261 made of frame members 1262, 1263, 1264, 1265 with a plurality of cross members 1266. Between pairs of frame members and cross members, and between pairs of cross members are connected pieces 1267 of screening material (any disclosed herein or any combination thereof). Alternatively, a single piece of screening material may be placed over the frame 1261 and folded to result in screen part placement as in FIG. 51B.

Figure 52:
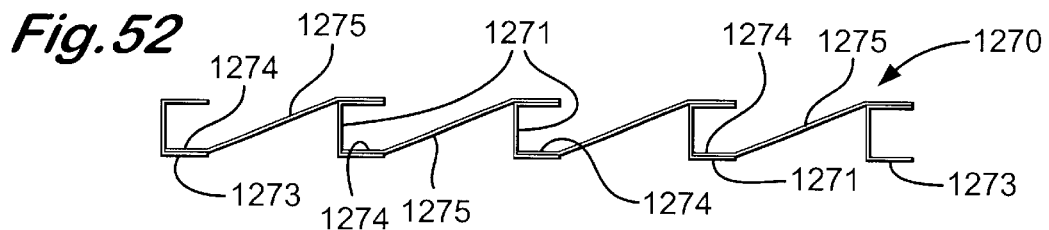
FIG. 52 is a cross-section view of a screen assembly according to the present invention.
Figure 53:
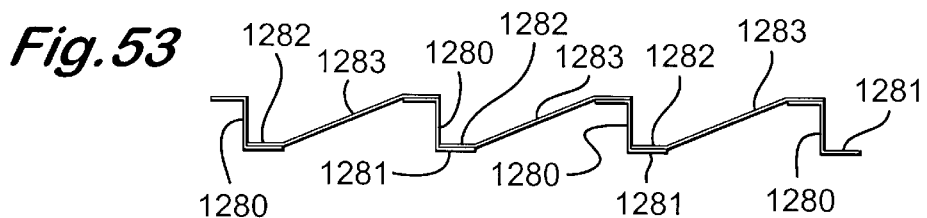
FIG. 53 is a cross-section view of a screen assembly according to the present invention.
Figure 54:
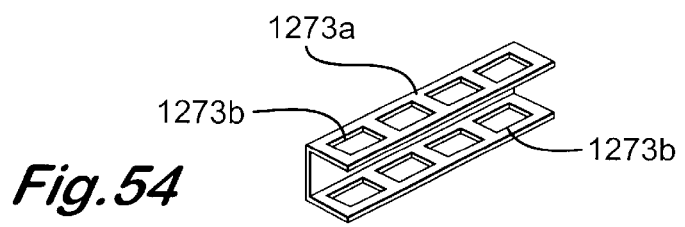
FIG. 54 is a perspective view of a channel member for a screen according to the present invention.

FIGS. 52, 53 and 54 illustrate various types of frame and cross members useful in screens as in FIG. 51A. FIG. 52 shows a screen 1270 with cross members 1271 and frame members 1273 having a "C" channel shape when viewed in cross-section; and an end 1244 of a piece of screening material 1275 is in and connected to each channel.

FIG. 53 shows a channel member 1280 which may be used for a frame or cross member, e.g., but not limited to, in the screens 1260 and 1270. The channel member 1280 has a lower portion 1281 on which an end 1282 of screening material 1283 is placed and to which it is connected. Such a channel may be used for a screen as in FIG. 51A. FIG. 54 shows a channel member 1273a, like the channel member 1273, but with holes 1273b therethrough.

Figure 55A:
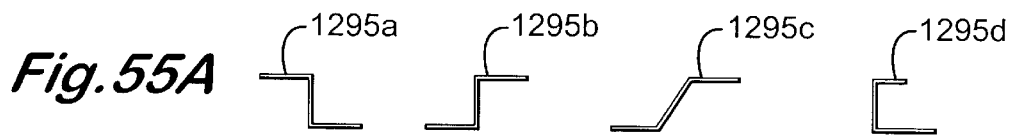
FIGS. 55A and 55B are cross-section views of channel members for a screen according to the present invention.
Figure 55B:
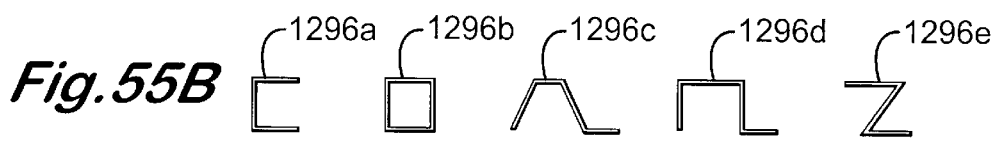

FIGS. 55A and 55B show alternative frame and cross member profiles 1295a, 1295b, 1295c, 1295d and 1296a, 1296b, 1296c, 1296d, 1296e, respectively (cross-section) for any of the frame or cross members disclosed above (with or without holes in any or all of the parts of the profiles).

Figure 55C:
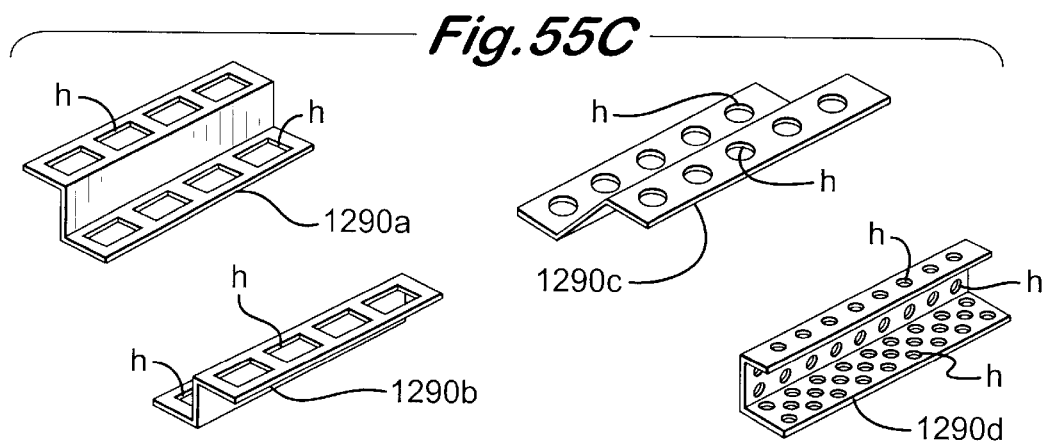
FIG. 55C presents perspective views of channel members for a screen according to the present invention.

FIG. 55C illustrates that any cross member in any frame according to the present invention may have perforations along its length to facilitate solids separation. As shown in cross-section, channel members 1290a, 1290b, 1290c and 1290d (shown in cross-section) have holes h therethrough along their lengths. Any series of holes may be deleted from any channel member.

FIG. 56 shows a screen assembly 3000 with some parts like those of prior art U.S. Pat. No. 4,575,421; however as described below, various parts of the screen assembly 3000 are held together by sewing material (e.g. thread, wire, string, filaments, cord, twine, yard or fiber). U.S. Pat. No. 4,575,421 is incorporated here fully for all purposes, including, but not limited to the parts of the screen assembly 3000 which are like the parts of the screen assemblies in the patent. Sides 3008 may be any known channel-shaped member, hookstrip, or frame sides. Alternatively a rigid frame with four sides may be used.

A plurality of layers of screening material 3002, 3003, and 3004 are positioned above a plate 3001 (like the plates, including but not limited to the plate 11, in U.S. Pat. No. 4,575,421). The layers 3002, 3003 and 3004 are like the layers, respectively, 24, 25, 26 as described in U.S. Pat. No. 4,575,421. It is, however, within the scope of this invention to delete any one or two of the layers and for any of the layers 3002, 3003, 3004 to be any screening material or mesh disclosed herein or combination thereof; and it is within the scope of this invention for the plate 3001 to be any support plate structure screen, frame, or series of strips (although these things are not legal equivalents) known in the art.

Figure 57:
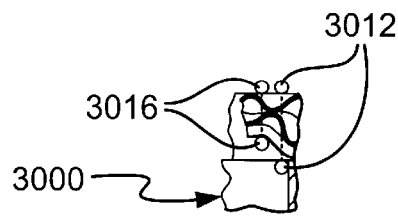
FIGS. 57 and 58 are cross-section views of parts of the screen of FIG. 56.
Figure 58:
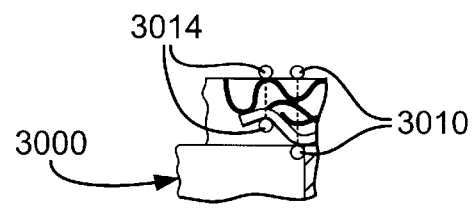

The layers 3002, 3003, 3004 are sewn together by sewing material. Exemplary lines of sewing material 3014 and 3016 are shown in FIGS. 56, 57, and 58. It is to be understood that such lines of sewing material sewing the layers together may extend in spaced-apart fashion over substantially all of the surface of the layers with any desired spacing between lines of sewing material. It is also within the scope of this invention for the sewing material to be in lines that are generally parallel to the sides of the screening layers, as shown; for the sewing material lines to extend diagonally across the screening material; for the sewing material lines to be at an angle other than diagonal across the screening material; and/or for lines of sewing material to intersect, forming any desired pattern including, but not limited to, a pattern corresponding to shapes formed by members of a lower supporting mesh, structure or plate. Such lines of sewing material may also be used to join together either layers 3002 and 3003, 3002 and 3004, and/or layers 3003 and 3004.

Lines of sewing material 3010 and 3012 sew together the plate 3001 and the layers 3002, 3003 and 3004. The lines 3010 and 3012 may take any of the forms and positions described above for the lines 3014, 3016. In one aspect "edge stitching" may be used to sew screening material to the plate. It is also within the scope of this invention to sew one, two, three or more layers of screening material to a frame that supports the screening material.

The sewing material used to sew together any two or more layers of screening material and/or mesh, or any support structure or plate and one or more layers of screening material may be any suitable known sewing material, including, but not limited to, thread, wire, yarn, string, twine, cord, and filament line (any of which may be mono- or multi-strand or filament with different or similar strands or filaments in multi-component sewing material). Such sewing material may be made, e.g., of natural, plastic, or synthetic thread, yarn, cord or wire materials; composite materials; polymer(s); elastomer(s); rubber; phenolic resin (s); metal (including but not limited to steel, stainless steel, bronze, brass, copper, zinc, aluminum and any combination or alloys of them); KEVLAR™ material; and polytetrafluoroethylene or Teflon™ material—any of which may be coated with plastic, metal, polymer, elastomer, or resin. Sewing material of any cross-sectional surface area and/or cross-sectional shape (or of any suitable diameter) may be used. Different sewing materials may be used for different stitches and/or lines of stitches on a single screen or screen assembly. The needle(s) used may be any suitable known needle and may be made of any suitable metal, plastic, composite, and/or fiberglass material. In one particular aspect KEVLAR™ thread with a diameter of 0.009 inches is used. In one particular screen using such KEVLAR™ thread there are three layers of screening material sewn together.

The sewing together of any two or more items may be done according to the present invention by hand, with a manually operated sewing device or machine, or with any automatic sewing machine. Any known sewing stitch or pattern may be used. In certain aspects a sewing needle is used which is sized so that damage to the layers and/or support is minimized or eliminated. In one such aspect, a needle is selected of such size that it penetrates between and moves between adjacent wires or screen in a wire (or screen component) of a screen and rather than breaking or weakening a wire of a screen.

Any stitch or line of sewing material may, optionally, be deleted from the screen assembly 3000 (or from any sewn screen assembly disclosed herein). It is within the scope of this invention to delete all lines 3012, 3014 and all lines sewing together the layers of screening material 3002, 3003, 3004 and to rely on the lines 3010, 3012 and others spaced-apart from them that sew together all of the layers of screening material and the plate 3001. Alternatively between lines like the line 3010, lines like the line 3014 may be used to hold the layers 3002–3004 together (and likewise for lines like 3012 and 3016).

U.S. Pat. No. 4,575,421 refers to an adhesive or bonding that secures parts together. The screen 3000 may be made with no such adhesive or bonding. Alternatively, such adhesive (e.g., but not limited to, glue or epoxy) or bonding may be used in addition to any sewing material described above; or a combination of one or more spaced-apart lines of sewing material and adhesive between and/or on or beneath such lines may be used. In one aspect the layers 3002–3004 may be adhesively secured together and lines like the lines 3010 and/or 3012 used to sew the layers to the plate 3001, or the layers 3002–3004 are sewn together and then adhesively secured to the plate 3001. Any two or more metal layers and/or plate may be sintered together over a portion or over substantially all of this area. One or more separate, individual stitches or knots of sewing material may be used instead of a line of a continuous thread, etc. for any line of sewing material described herein.

FIGS. 70A and 70B show screen assembly 3108 according to the present invention with a perforated plate 3110 (which may be any plate referred to herein and any plate used in the prior art) which has a plurality of apertures, holes or openings 3112 therethrough. A wire mesh layer 3114 is secured to the plate 3110 with thread stitches (or knots) 3115. The layer 3114 may be any known suitable mesh or screen, meshes or screens, with one, two, three, or more layers.

FIGS. 71A and 71B show a screen assembly 3120 according to the present invention with a perforated plate 3121 (like the plate 3110, FIG. 70A) with apertures, etc. 3122 therethrough. Wire or screening mesh layers 3124 are sewn together with thread stitches (or knots) 3126. The layers 3124 are sewn to the plate 3121 with thread stitches (or knots) 3125. Suitable staples may be used for any stitch in the screen assemblies 3108 and 3120.

The plates and screen assemblies of FIGS. 70A and 71A are shown partially; but it is to be understood that the apertures, mesh, stitching and plates are on their entire breadth and surfaces as shown partially.

Figure 59:
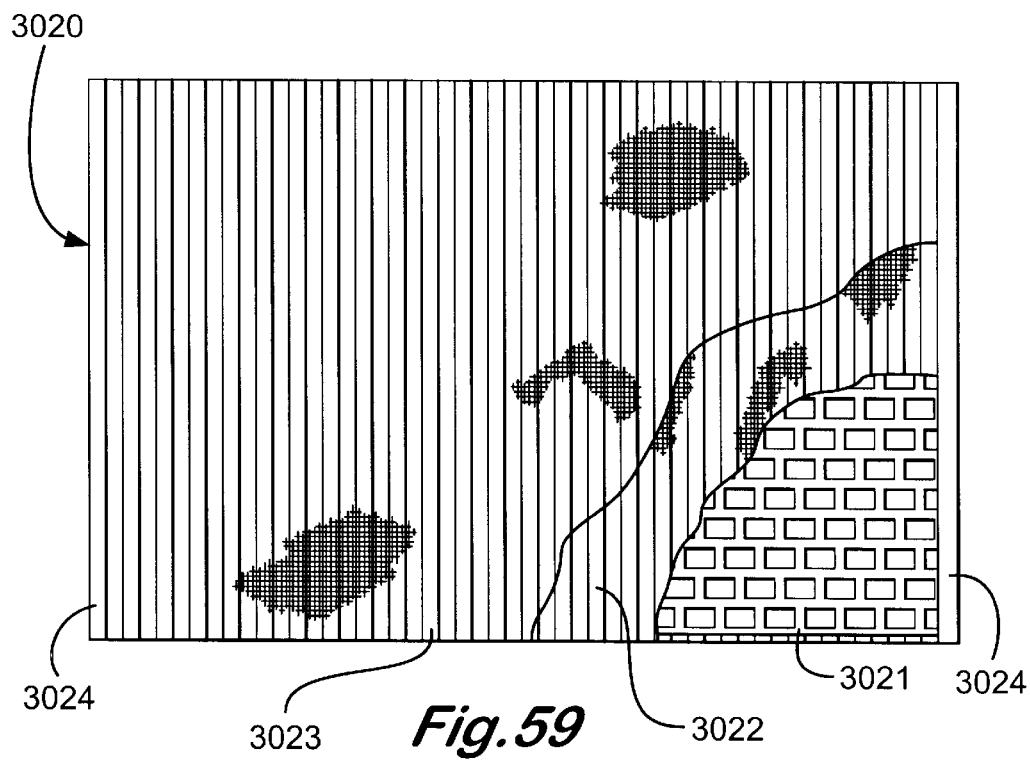
FIG. 59 is a top view of a screen assembly according to the present invention.
Figure 60:
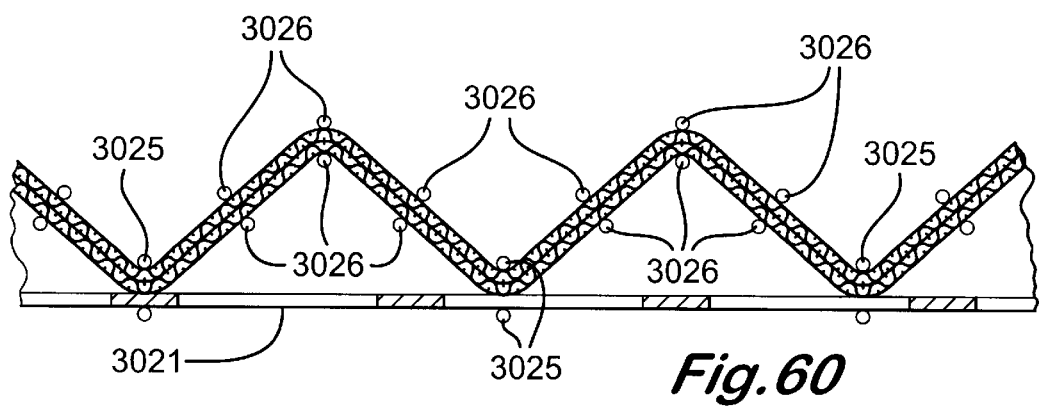
FIGS. 60, 61, 62, 65 and 66 are cross-section views of screen assemblies according to the present invention.

FIGS. 59 and 60 show a screen assembly 3020 according to the present invention which has parts like those of U.S. Pat. No. 5,417,858 (incorporated fully herein for all purposes, including, but not limited to the parts of the screen assembly 3020 which are like parts of the screen assemblies in the patent). However, as described below, various parts of the screen assembly 3020 are held together by sewing material.

The screen assembly 3020 has a plate 3021 (like the plate 3001 described above) on which are positioned a coarse support screen 3022 and a fine screening screen 3023. The screens 3022, 3023 may be, respectively, like the layers 32, 33 in U.S. Pat. No. 5,417,858. Optional sides 3024 may be like the channel shaped members 23 in U.S. Pat. No. 5,417,858 or may be any known hookstrip or frame sides.

Sewing material 3025 is used to sew and secure the layers 3022, 3023 to the plate 3021; and sewing material 3026 may be used to sew and secure the layers 3022 and 3023 together. As shown the size (diameter) of the sewing materials 3025, 3026 (and also of the material of the sewing lines in FIGS. 56–58) is, for some embodiments, greatly exaggerated and could be depicted by a single point in the drawing; but it is within the scope of the present invention to use sewing material—yarn, cord, line, thread, wire, etc.—of any suitable diameter. For any stitch, knot, series or line of stitches and/or series or line of knots disclosed herein for any screen assembly or screen according to the present invention, a staple or a series of staples may be used. Such staple(s) are applied with any suitable known stapling machine or apparatus and/or by hand. Either individual separate stitches or knots of sewing material may be used for the screen assembly 3020 (and for any screen assembly disclosed herein); or lines of sewing material in any desired stitch or stitch pattern (e.g. as the lines of the screen assembly 3000) may be used.

Figure 61:
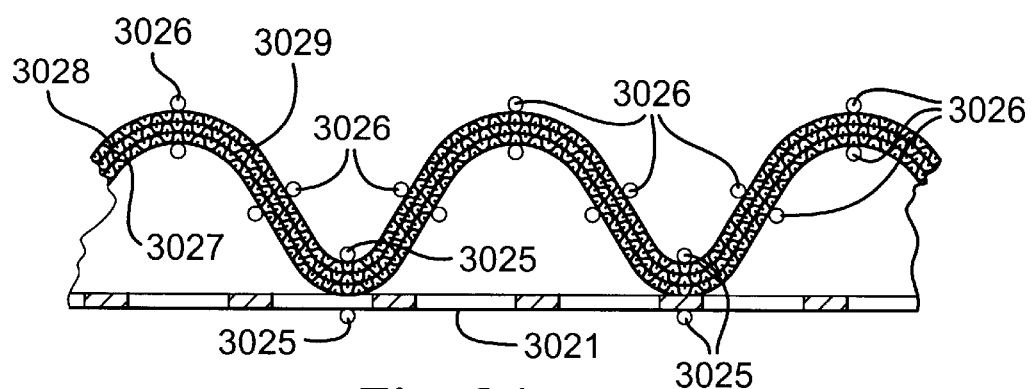

FIG. 61 shows an alternative configuration for the layers of screening material in which ridges and valleys have a more rounded shape (viewed in cross-section) as compared to the screening material of FIG. 60. Also, optionally, a third layer of screening material 3027 is beneath two upper layers of screening material 3028, 3029. A plate 3021a is like the plate 3021, FIG. 59. Sewing material 3025a is like screening material 3025, FIG. 59 and sewing material 3026a is like screening material 3026, FIG. 59. The layers 3027–3029 may be as the layers 77, 79, 80 in U.S. Pat. No. 5,417,858; or they may be made of any desired screening material and/or mesh, metal or synthetic, as may be any layer disclosed herein. In addition to securement together with sewn sewing material, any part or substantially all of the surface area of the layers around openings in the plate 3021 may be bonded or adhered with suitable material, glue or adhesive. In one aspect, screening layers are thus bonded together and the combination of these layers is sewn to the plate, or vice-versa (as can be done with any screen assembly disclosed herein).

Figure 62:
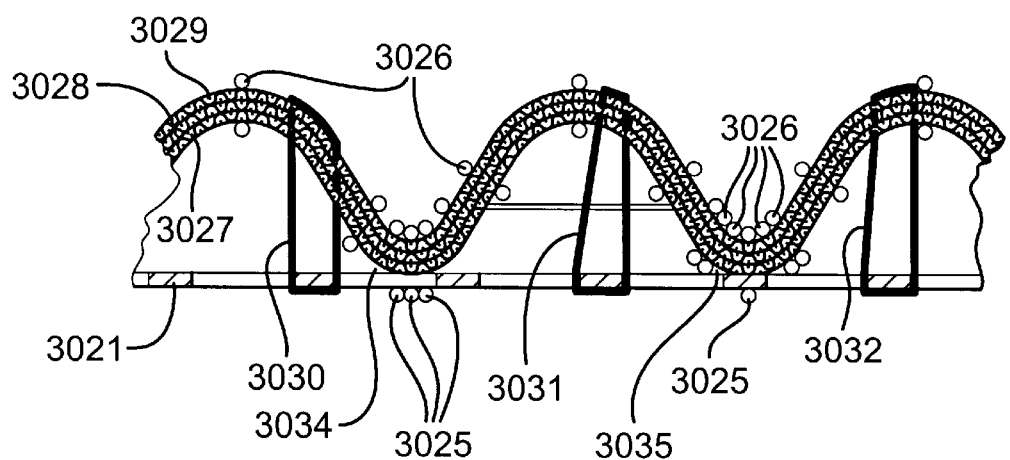

FIG. 62 illustrates a version of the screen assembly of FIG. 61 in which one or more individual stitches 3030–3032 extends through and from the screening layers 3027–3029 to and through holes or perforations the plate 3021 beneath and within ridges formed by the undulating shape of the screening material. Any desired number of such individual stitches or knots may be used within a ridge, e.g. one, two, three, four, five, or more; or a series of them may be beneath a ridge extending from one end thereof to the other. Also, the sewing material may extend through all the layers of screening material or through only one or two layers. If the sewing material is metal and the plate is also, the sewing material may be sintered to the plate; similarly, with metal screening material and metal sewing material the sewing material may be sintered to the screening material.

FIG. 62 also illustrates that an area of excessive wear or abrasion in a screen assembly (any according to the present invention) may have a plurality of either individual stitches or knots of sewing material or a line of a plurality of sewn stitches. As shown in the left-most valley 3034 of Fig. G, three stitches of sewing material 3025 are located in the valley. As shown in the right-most valley 3035 five stitches of sewing material 3026 secure the screening layers together at this location. Also, the tops of ridges of an undulating or corrugated screen assembly may have such a plurality of stitches or knots, an individual stitch or knot, or an individual staple or staples. It is within the scope of this invention to use any desired number of stitches and/or lines of stitches in any area of a screen assembly and, in one aspect, to do so for areas of anticipated excessive wear and abrasion.

Figure 63:
FIG. 63 is a top view of a screen assembly according to the present invention.

FIG. 63 illustrates that according to the present invention a screen identifier—"No. GLM III"—and/or a logo or trademark—"BIG MC"—can be sewn into a screen 3037. The screen 3037 can be single or multi-layer (and can be any screen assembly disclosed herein).

Figure 64:
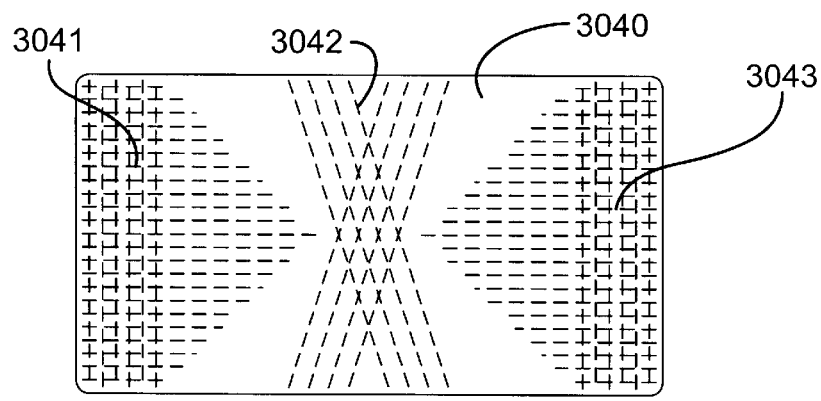
FIG. 64 is a top view of a screen assembly according to the present invention.

FIG. 64 illustrates a screen 3040 according to the present invention which has different stitching patterns 3041, 3042, 3043 with different stitch densities in different areas of a screen. The screen 3040 may be any screen or screen assembly disclosed herein and the sewing material for the stitches may be any sewing material disclosed herein. Any one or two of the patterns 3041—3043 may be deleted. It is also within the scope of this invention to use any desired pattern of stitching at any location on a screen.

Figure 65:
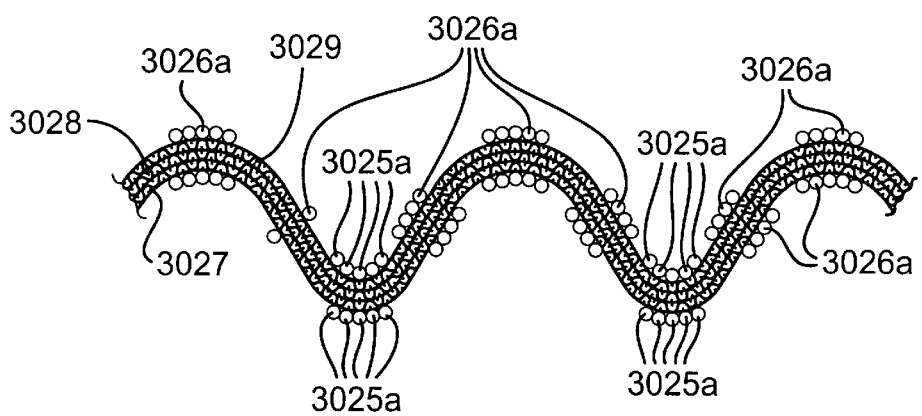

It is also within the scope of this invention to delete the plates (3001, 3021) from the embodiments of FIGS. 56 and 59 and to use a plurality of stitches, knots, and/or lines thereof (all in one general direction parallel to each other or a plurality of intersecting lines) instead of such a plate; and such a plurality of stitches, etc., is not a legal equivalent of any frame or of any plate as in U.S. Pat. Nos. 4,575,421; 5,783,077; 5,720,881; 5,417,793; 5,417,859; or U.S. Pat. No. 5,417,858. It is also within the scope of this invention to delete the plate or frame from any of the subject matter of U.S. Pat. Nos. 4,575,421; 5,783,077; 5,720,881; 5,417,793; 5,417,859; and 5,417,858 (or from any known flat or 3-D screen assembly) and to use instead a plurality of stitches, knots, and/or lines of sewn sewing material. FIG. 65 shows a version of a screen as in FIG. 61 but with no plate 3021. Pluralities of lines (as viewed from above) of stitching material 3025a and 3026a extend across the screen assembly from one side to the other. Other lines (not shown) may be provided at an angle or perpendicular to these lines of material 3025a and 3026a.

Figure 66:
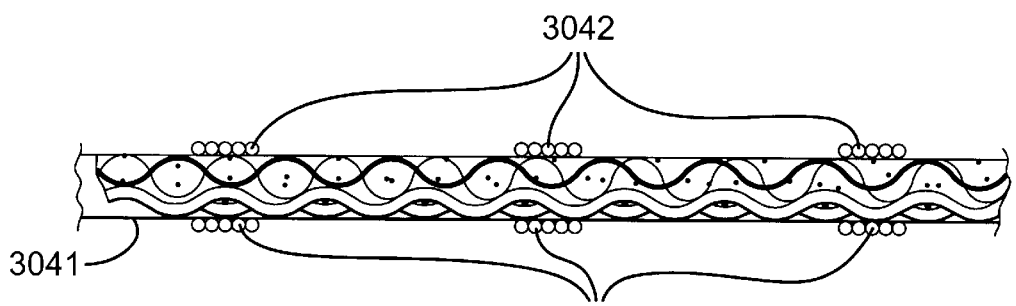

FIG. 66 shows a flat screen 3041 with layers as in U.S. Pat. No. 4,575,421 (or any multi-layer screen disclosed or referred to herein), but with no lower plate. Lines of stitching 3042 extend across the screen 3041 from one side to the other. Other lines (not shown) may be provided at an angle or perpendicular to the lines 3042. As shown in FIG. 61, a stitch or line of sewing material 3045 may be used to prevent a ridge of screening material from expanding and/or flattening. Any desired number of such lines or stitches may be used along the length of a ridge (including any ridge or ridges of a series of ridges on any screen including any screen disclosed herein).

Figure 67B:
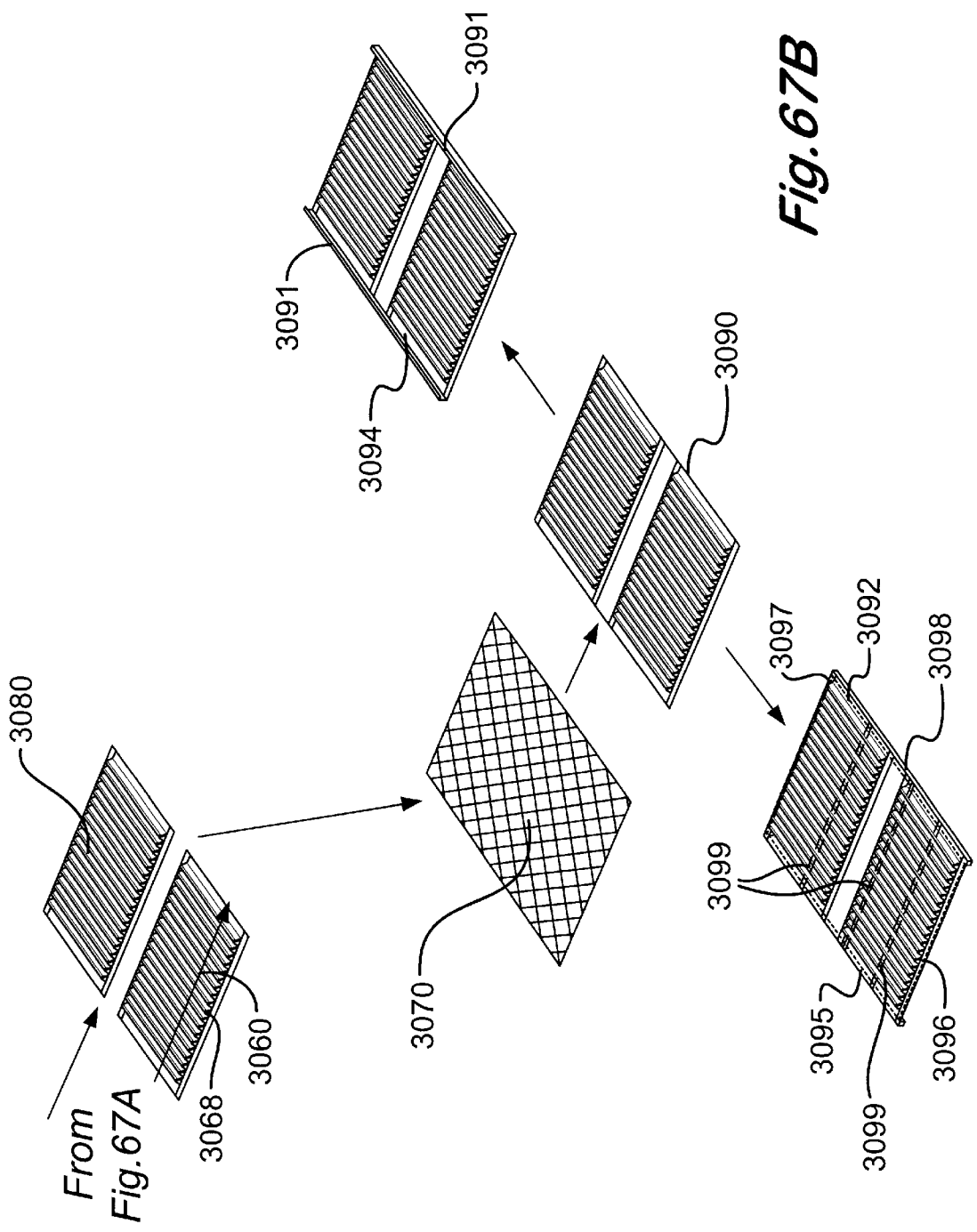
FIG. 67 is a schematic view showing a method according to the present invention for making screen assemblies according to the present invention.

FIG. 67 illustrates steps in a method according to the present invention for producing screen assemblies according to the present invention. A piece of screening material 3052 of relatively fine mesh (e.g., but not limited to, 24 mesh to 500 mesh; made, e.g., of metal, steel, stainless steel, natural fiber such as cotton, or synthetic material such as nylon, polyester, polypropylene, polyethylene, or KEVLAR™ material) is combined with a piece of screening material 3054 of a medium mesh (e.g., but not limited to, 32 mesh to 400 mesh made, e.g. of the materials as for piece 3052) and a piece of screening material 3056 of coarse mesh (e.g., but not limited to, 1 mesh to 30 mesh made, e.g., of the materials as for piece 3052). It is within the scope of this invention to add an additional layer of screening material as any of the pieces 3052, 3054, 3056 and to position it on top of any of the other pieces present. It is within the scope of this invention to delete any of the pieces 3052, 3054, or 3056. The straight sides of the glue pattern 3058 may be deleted.

Optionally a glue pattern, e.g. as in the glue pattern 3058 is applied to the screening material piece 3052. Alternatively, or additionally, such a glue pattern is applied to piece 3054 and/or piece 3056. Glue (or any suitable plastic, flexible adhesive, or fusible material) in any pattern or configuration may be used for the glue pattern. In certain aspects a glue pattern is applied over substantially the entire area of piece(s) of screening material, in one aspect to coincide with a stitching pattern, so that it a. inhibits during handling or use tearing of screening material between stitches and/or holes made by a sewing needle; b. seals around sewing material, etc.; and/or c. so that glue "heals" holes made by a sewing needle passing through the glue when the needle is retracted—i.e., the glue around a hole tends to contract somewhat back into the hole reducing the hole size or substantially closing off the hole. Glues and materials that may be used include any known in the art, any disclosed above, and, PUR glues, polyethylene, rubber, nylon, plastic, polyurethane, silicone, any suitable adhesive and epoxy. Optionally a piece of solid plastic corresponding to the stitching pattern, with or without perforations over its surface area, is used instead of or in addition to a glue pattern. Any glue, epoxy, or other adhesive may be used solely to prevent tearing; or it may also, in certain aspects, be applied in such a manner that it also bonds screening layers together and/or to a lower plate, frame, or support. A solid plastic piece may be molded with perforations or the perforations may be made after the piece is made.

Optionally strips 3063 of screening material may be applied along edges of the piece 3052 (and/or along edges of any of the other pieces 3054, 3056) for a purpose described in detail below. The strips 3063 are also shown on the piece 3052.

The combined structure 3050 (including pieces 3052, 3054, 3056) is glued or bonded together or sewn together in any manner as described herein using any stitch or sewing pattern as described herein. In one aspect, the stitching follows the glue pattern 3058 with the needle or needles piercing the glue. Such a structure, without further processing, is substantially flat and may be used in a substantially flat screen assembly. It is within the scope of this invention to sew together only the pieces 3052, 3054 or 3056 and to glue or bond the other piece to them.

In one aspect the structure 3050 is, optionally, notched, with notches 3059 along its edges, and is also corrugated (see Fig. M). As shown in Fig. N, prior corrugating, one or more splines of epoxy or plastic 3067 may be applied to the structure for added strength and rigidity. Alternatively or in addition to the splines, additional lines of sewing stitches may be used. Ends 3064 of ridges 3066 of the corrugated structure are either plugged, covered with material (perforated or unperforated, solid or mesh or screening material), or, as shown, ends 3068 (see FIG. 68) are formed of the screening material. Alternatively, an additional strip or strips of screening material, mesh, or a combination thereof (as described above) are added (e.g., but not limited to the strips 3063) and the ridge end coverings are formed of these strips. In one aspect the formed ends are the ends and/or bulbous ends described in co-owned pending U.S. application Ser. No. 09/634,610 filed Aug. 5, 2000 and incorporated fully herein for all purposes. Any screen or screen assembly in U.S. Ser. No. 09/634,610 may have layers connected together by sewing as described herein.

The resulting structure 3060 may, according to the present invention, be combined with a lower support mesh piece 3070 [e.g. made of steel, wire, composite, or other suitable (zinc, brass, bronze, aluminum, or any alloy thereof or combination thereof) material or metal with mesh ranging between one mesh and ten mesh, in one aspect four mesh] or with a lower support plate or series of support strips. Flat top wire cloth may be used for the piece 3070.

In one aspect a screen assembly 3080 (like the structure 3060) is mounted with the structure 3060 on a piece 3070, producing a screen assembly 3090 (like screen assemblies disclosed in U.S. application Ser. No. 09/634,610 filed Aug. 5, 2000). The piece 3070 may be connected to the other parts by sewing as described herein; by welding; with fasteners; and/or with glue or epoxy.

A version 3094 of the screen assembly 3090 has side hookstrips 3091 for mounting of the screen assembly to a vibratory separator for liquid/solid and/or solid/solid separation e.g., but not limited to, a shale shaker for treating drilling fluid or mud with drilling solids, debris, and/or cuttings entrained therein. A version 3092 of the screen asembly 3090 includes a frame with sides 3095, 3096, 3097 and 3098. Optionally cross support members 3099 may be included in the frame.

FIG. 73 shows a screen assembly 3100 according to the present invention which is like the screen assembly of FIG. 56 (like numerals indicate like parts). Instead of the thread and stitching of the screen assembly of FIG. 56, the screen assembly 3100 has lines of staples (or rivets) 3102, 3104 and 3106, 3108.

Figure 74:
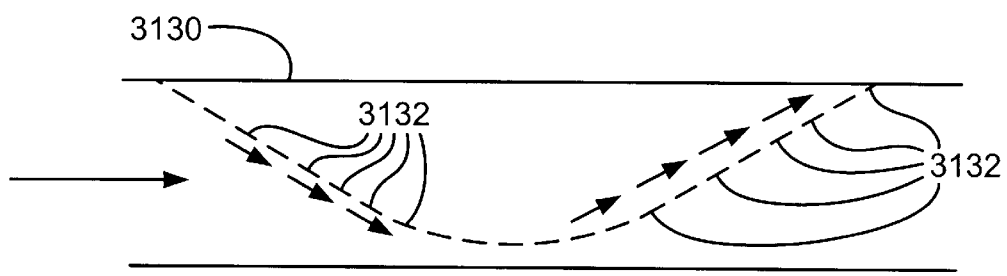
FIG. 74 is a side view of a ridge of three-dimensional screen assembly according to the present invention.

In certain aspects the thread, etc. used for three-dimensional screens and screen assemblies of the present invention is used in such a pattern and location that it presents a projecting series of thread parts that project out from ridges of a screen. Viewing such a ridge 3130 from the side as shown in FIG. 74, the thread portions 3132 direct solids flowing generally in the direction of the arrow in FIG. 74 up or down the ridge. This increases the length of travel of these solids from one end of the screen to the other (they do not travel in a straight line across the screen) and thereby increases their time on the screen surface so that liquids have more time to leave the solids and pass through the screen.

Any ramp base or portion described above that is connected to a screen, mesh, or layers thereof may be connected by sewing (or staples) above as described above; or in addition to the connection or securement method previously described sewing (or staples) as described above may also be used.

The present invention, therefore, provides in certain, but not necessarily all embodiments, a screen assembly for a vibratory separator apparatus or shaker, the screen assembly with at least two screening members, and the at least two screen members connected by sewing material. Such a method may include one or some of the following, in any possible combination: the at least two screening members comprise a plurality of layers of screening material; the plurality of layers of screening material include at least a first fine screen layer and a second coarse screen layer; wherein the sewing material is thread; wherein the sewing material comprises a pattern of spaced-apart stitches over substantially the entire surface of the at least two screen members; wherein one of the at least two screen members is a perforated plate; wherein the at least two screening members includes at least one three-dimensional screening member; wherein the at least one three-dimensional screening member is made of screening material; wherein the screening material is a plurality of layers of screening material; one of the at least two screening members comprising a base, and the plurality of layers of screening material connected to the base; wherein the base is a perforated plate; wherein the plurality of layers of screening material are connected to the base with sewing material; the sewing material comprises a plurality of spaced-apart staples; wherein the base is a layer of coarse mesh; wherein the at least two screening members is at least two layers of screening material and a perforated base, the at least two layers of screening material sewn together to form a combined screen, the combined screen sewn to the perforated base; the sewing material comprising thread in a stitch pattern across the at least two screening members, a pattern of expandable material (e.g. rubber, glue, plastic, etc.) on and corresponding to the stitch pattern, and the thread passing through holes in the pattern of expandable material, the expandable material expanded within the holes following extraction of a needle therefrom, the needle used to apply the sewing material, to inhibit tearing of either of the at least two screening members between holes; multiple stitches of sewing material adjacent each other in areas of increased wear of the screen assembly; and/or wherein the at least two screening members includes three-dimensional screening material with a plurality of alternating ridges and troughs, at least one series of stitches of sewing material ascending up a side of a ridge from a top to a bottom thereof, and the at least one series of stitches having stitch portions projecting out from an outer surface of the ridge for contact by solid particles flowing over the screen assembly to change direction of travel of the solid particles.

The present invention, therefore, provides in certain, but not necessarily all embodiments, a screen assembly for a vibratory separator apparatus, the screen assembly with at least two screening members, and the at least two screen members connected by sewing material, wherein the sewing material comprises thread, the sewing material comprising thread in a stitch pattern across the at least two screening members, a pattern of expandable material on and corresponding to the stitch pattern, the thread passing through holes in the pattern of expandable material, the expandable material expanded within the holes following extraction of a needle therefrom, the needle used to apply the sewing material, to inhibit tearing of either of the at least two screening members between holes, the at least two screening members including three-dimensional screening material with a plurality of alternating ridges and troughs, at least one series of stitches of sewing material ascending up a side of a ridge from a top to a bottom thereof, and the at least one series of stitches having stitch portions projecting out from an outer surface of the ridge for contact by solid particles flowing over the screen assembly to change direction of travel of the solid particles.

The present invention, therefore, provides in certain, but not necessarily all embodiments, a vibratory separator apparatus including a vibratory shaker device, a screen assembly mounted on the vibratory shaker device and with at least two screening members, and the at least two screen members connected by sewing material.

The present invention, therefore, provides in certain, but not necessarily all embodiments, a method for treating material, the method including introducing the material to a vibratory separator apparatus, the vibratory separator apparatus with a vibratory shaker device, a screen assembly mounted on the vibratory shaker device and with at least two screening members, and the at least two screen members connected by sewing material, and screening the material with the at least two screening members to separate components thereof, the at least two screening members vibrated by the vibratory shaker device. In one aspect in such a method the material is drilling fluid with solids therein.

Figure 72:
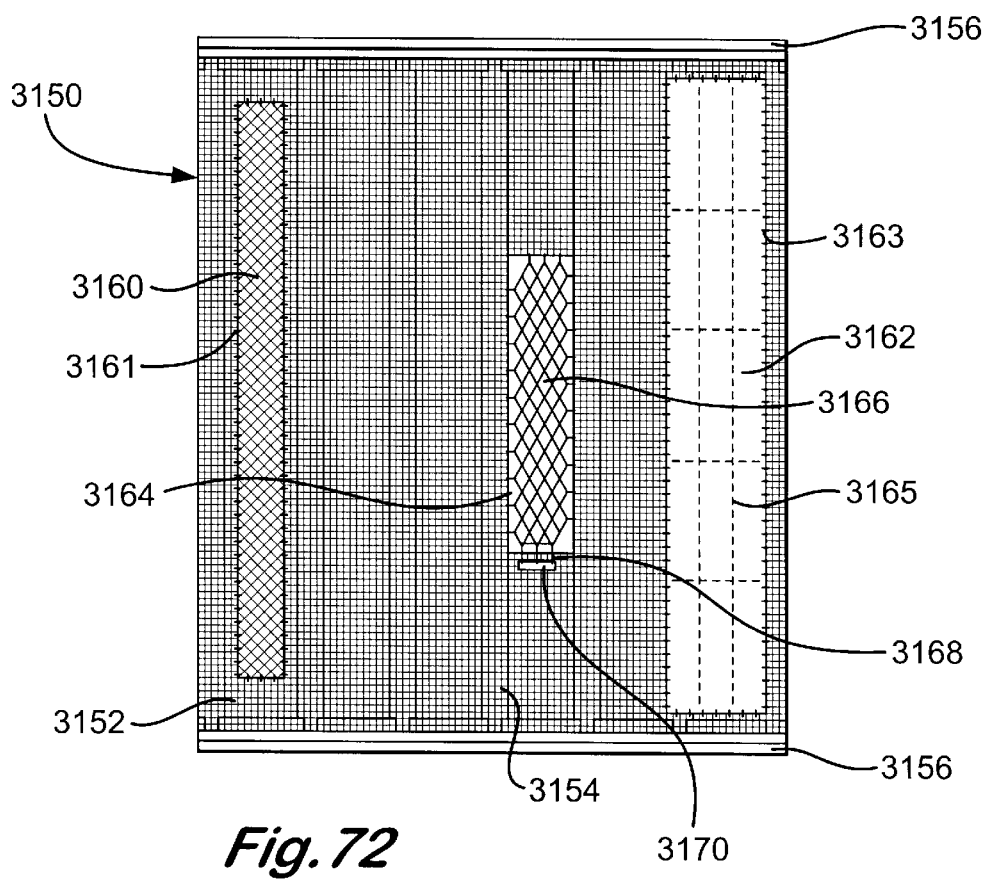
FIG. 72 is a top view of a screen assembly according to the present invention.

FIG. 72 shows a screen assembly 3150 according to the present invention which has a layer of screening material 3152 over a series of support strips 3154. Side hook strips 3156 provide for mounting of the screen assembly. Alternatively, a frame or perforated plate may be used (although there are not legal equivalents of a series of support strips and they are not the legal equivalent of a screen with layers sewn together and they are not the legal equivalent of a lower supporting coarse mesh). The screening material 3152 may be: any screening material or mesh disclosed herein or any combination of layers thereof disclosed herein or any suitable layer or layers of screening material.

A piece 3160 of screening material is sewn (or connected with rivets and/or staples) to the screening material 3152 with stitching 3161. A solid piece of material 3162 is sewn to the screening material 3152 with stitching 3163, 3165. A perforated piece of material 3164 with a plurality of perforations 3166 is sewn to the screening material 3152. Any one or two of the pieces 3160, 3162, 3164 may be deleted. Stitches 3168 sewing the piece 3164 are surrounded by an amount of glue 3170 that extends around stitch holes through the piece 3164 and around portions of stitches through the screening material 3152.

It is within the scope of this invention for any hole for any sewing material, rivet or staple to have such glue as glue 3170 around it or any other material that will contract around the sewing material, etc. upon removal of a needle and will contract around a part of a rivet or staple to help "heal" a hole and to seal around the material, etc.

It is within the scope of this invention to have a plurality of pieces like the piece 3160 (two, three, four, five, six or more) spaced-apart on the screening material 3152. Similarly there may be multiple pieces 3162 and/or 3164 in any position or desired combination with or without pieces 3160. In certain aspects a piece or pieces 3160, 3162, and/or 3164 are wed at locations of relatively high or excessive screen wear. Any such piece or pieces may be used on any two-dimensional or three-dimensional screen, either on top of or beneath (or both) screening material.

FIGS. 75A and 75B show a screen assembly 3200 according to the present invention which has a layer 3202 of coarse mesh and side hooks strips 3205. On the coarse mesh layer 3202 are sewn two offset series of ridges/valleys 3204, 3206.

Sewing material 3210 is sewn in a desired pattern across substantially all of the surface area (as viewed from above as in FIG. 75A) of the screen assembly.

A middle portion or strip 3212 of the screen assembly 3200 includes a layer 3214 of fine mesh (e.g. but not limited to 200 mesh) on a layer of less-fine mesh (e.g. but not limited to 19 mesh, not shown). These two layers extend for a length 3216. A similar strip (like the strip 3212) is used at each end 3218, 3219 of the screen assembly 3200 between the ridge/valley parts and the coarse layer 3202.

The sewing material 3210 may be used only in selected areas of the screen assembly instead of over substantially all of its area. Glue or other material may be used in the same pattern as the stitching to close off and/or "heal" or seal holes or the area around the outer surface of stitching material (or rivets or staples). In one aspect the sewing material is KEVLAR™ thread between 0.063 and 0.045 inches in diameter. Thread of circular, oval, or elliptical cross-section may be used. For any screen or screen assembly herein, the sewing material may be any thread, including but not limited to moisture-resistant or moisture-absorbing thread or may be any wire of circular, oval, or elliptical cross-section. In another aspect, ends of peaks and valleys, instead of being located at the end boundaries of the screen assembly as shown in FIG. 75A, are spaced-apart from their ends. In one particular aspect of such a screen assembly, the peaks and valleys ends are formed integrally of screening material that is pushed out from an initial relatively flat layer or layers so that there are never any open ends that need to be closed off or sealed (as for the example the open ends of the screen assemblies of U.S. Pat. Nos. 5,417,793; 5,417,858; 5,417,859).

In one particular embodiment of the screen 3200 the ridge/valley portions 3204, 3206 are made from multi-layer pieces of screening material sewn together with ridges with integral bulbous ends pushed out from the screening material. The ridge/valley portions 3204, 3206 are then placed on the strips 3212 and the end strips (like the strip 3212) and sewn thereto. The resulting structure is then sewn to the layer 3202. alternatively the structure may be produced by gluing or using epoxy to bond layers together (which is not the legal equivalent of mechanically connecting the layers together with sewing material, rivets, or staples). Alternatively the structure (sewn or bonded) may be connected to the coarse layer by gluing or using epoxy—or both methods may be used on a single screen assembly.

In any screen according to the present invention when sewing material (rivets, or staples) is used instead of glue, epoxy, or plastic and the surface area of the thread presented to material to be treated is less than that of the glue, epoxy, or plastic, then there is that much more increased open area of screening material for screening the material to be treated. Also with such a screen according to the present invention there is more relative movement between layers which tends to reduce or prevent screen blinding and plugging. Certain pipe dopes stick to plastic on a screen and inhibit the conveyance of solids—which is reduced by using non-plastic sewing material in certain screens according to the present invention. According to the present invention screens with different thread or other sewing material can be quickly changed in response to changes in conditions such as temperature changes, fluid changes, or chemical changes. Alternatively, or in addition to sewing the pieces of the strips 3212 and the end strips together, the pieces may be bonded together with epoxy 3213. Similarly epoxy may be used to bond the layer 3202 to the other parts. The ends of the ridge/valley portions 3204, 3206 (when there are initially open ends) may be closed off in any known manner with plugs, screening material, etc. In certain aspects this may be done with screening material of a mesh size like that of the ridge/valley portions. Sewing material, rivets, and staples are not the legal equivalent of each other. Any ramp disclosed herein may be attached to a lower support or lower layer by any sewing method disclosed herein (or by rivets and/or staples). Any end of any screen disclosed herein that is initially open may be closed off and/or sealed by connecting material over the open end by any sewing method and/or rivets, and/or staples disclosed herein.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112. The inventors may rely on the Doctrine of Equivalents to determine and assess the scope of their invention and of the claims that follow as they may pertain to apparatus not materially departing from, but outside of, the literal scope of the invention as set forth in the following claims.

What is claimed is:

1. A screen assembly for a vibratory separator apparatus, the screen assembly comprising
   at least two screening members,
   the at least two screen members connected by sewing material,
   the at least two screening members includes three-dimensional screening material with a plurality of alternating ridges and troughs,
   at least one series of stitches of sewing material ascending up a side of a ridge from a top to a bottom thereof, and
   the at least one series of stitches having stitch portions projecting out from an outer surface of the ridge for contact by solid particles flowing over the screen assembly to change direction of travel of the solid particles.

2. A screen assembly for a vibratory separator apparatus, the screen assembly comprising
   at least two screening members, each screening member having a surface area,
   the at least two screen members connected by sewing material, and
   the sewing material extending across substantially all of the surface area of the screening members,
   the at least two screening members including three-dimensional screening material with a plurality of alternating ridges and troughs,
   at least one series of stitches of sewing material ascending up a side of a ridge from a top to a bottom thereof, and
   the at least one series of stitches having stitch portions projecting out from an outer surface of the ridge for contact by solid particles flowing over the screen assembly to change direction of travel of the solid particles.

3. The screen assembly of claim 2 wherein
   the at least two screening members comprise a plurality of layers of screening material.

4. The screen assembly of claim 3 wherein
   the plurality of layers of screening material include at least a first fine screen layer and a second coarse screen layer.

5. The screen assembly of claim 2 wherein the sewing material comprises thread.

6. The screen assembly of claim 2 wherein the sewing material comprises a pattern of spaced-apart stitches over substantially all surface area of the at least two screen members.

7. The screen assembly of claim 2 wherein one of the at least two screen members is a perforated plate.

8. The screen assembly of claim 2 wherein the at least two screening members includes at least one three-dimensional screening member.

9. The screen assembly of claim 8 wherein the at least one three-dimensional screening member is made of screening material.

10. The screen assembly of claim 9 wherein the screening material comprises a plurality of layers of screening material.

11. The screen assembly of claim 10 further comprising
one of the at least two screening members comprising a base, and
the plurality of layers of screening material connected to the base.

12. The screen assembly of claim 11 wherein the base is a perforated plate.

13. The screen assembly of claim 12 wherein
the plurality of layers of screening material are connected to the base with sewing material.

14. The screen assembly of claim 2 wherein
the sewing material comprises a plurality of spaced-apart staples.

15. The screen assembly of claim 11 wherein the base is a layer of coarse mesh.

16. The screen assembly of claim 2 wherein
the at least two screening members comprise at least two layers of screening material and a perforated base, the at least two layers of screening material sewn together to form a combined screen, the combined screen sewn to the perforated base.

17. The screen assembly of claim 2 further comprising
the sewing material comprising thread in a stitch pattern across the at least two screening members,
a pattern of expandable material on and corresponding to the stitch pattern, and
the thread passing through holes in the pattern of expandable material, the expandable material expanded within the holes following extraction of a needle therefrom, the needle used to apply the sewing material, to inhibit tearing of either of the at least two screening members between holes.

18. The screen assembly of claim 2 further comprising multiple stitches of sewing material adjacent each other in areas of increased wear of the screen assembly.

19. A shale shaker for treating drilling fluid with solids therein, the shale shaker comprising
a basket for holding a screen assembly,
a vibratory device for vibrating the basket and the screen assembly,
a screen assembly mounted on the basket, the screen assembly having a top and comprising
at least two screening members, each screening member having a surface area,
the at least two screen members connected by sewing material,
a lower receptacle for receiving drilling fluid passing through the screen assembly,
the screen assembly mounted so that solids separated from the drilling fluid are moved off the top of the screen assembly by motion imparted to the screen assembly by the vibratory device.

20. A method for treating drilling fluid with solids therein, the method comprising
introducing the drilling fluid with solids therein to a shale shaker, the shale shaker comprising a basket for mounting a screen assembly therein suitable for separating solids from the drilling material, a vibratory device for vibrating the basket and the screen assembly, the screen assembly mounted so that solids separated from the drilling fluid are moved off the top of the screen assembly by motion imparted to the screen assembly by the vibratory device, a receptacle beneath the screen assembly for receiving drilling fluid passed through the screen assembly, a screen assembly mounted on the basket and comprising at least two screening members, and the at least two screen members connected by sewing material, the sewing material extending across the screening members,
screening the drilling fluid with solids therein with the at least two screening members to separate solids therefrom, the at least two screening members vibrated by the vibratory device,
moving solids separated from the drilling fluid off the top of the screen assembly by vibrating the screen assembly with the vibrator device, and
collecting drilling fluid passed through the screen assembly in the receptacle.

21. A screen assembly for a vibratory separator apparatus, the screen assembly comprising
at least two screening members, and
the at least two screen members connected by sewing material,
wherein the sewing material comprises thread,
the sewing material comprising thread in a stitch pattern across the at least two screening members,
a pattern of expandable material on and corresponding to the stitch pattern,
the thread passing through holes in the pattern of expandable material, the expandable material expanded within the holes following extraction of a needle therefrom, the needle used to apply the sewing material, to inhibit tearing of either of the at least two screening members between holes,
the at least two screening members including three-dimensional screening material with a plurality of alternating ridges and troughs,
at least one series of stitches of sewing material ascending up a side of a ridge from a top to a bottom thereof, and
the at least one series of stitches having stitch portions projecting out from an outer surface of the ridge for contact by solid particles flowing over the screen assembly to change direction of travel of the solid particles.

\* \* \* \* \*